US012409868B2

(12) United States Patent
Read et al.

(10) Patent No.: US 12,409,868 B2
(45) Date of Patent: Sep. 9, 2025

(54) SYSTEM AND METHOD OF TRANSPORTING OBJECTS

(71) Applicant: HOLMES SOLUTIONS LIMITED PARTNERSHIP, Wellington (NZ)

(72) Inventors: Connor Read, Wellington (NZ); Andrew Karl Diehl, Wellington (NZ); Jamin Caleb Vollebregt, Wellington (NZ); Peter John Scott, Wellington (NZ); Christopher James Allington, Wellington (NZ); Mark Harinui Thomson, Wellington (NZ); Andrew Michael Sarratt, Wellington (NZ); Mark Stewart Pritchard, Wellington (NZ); Benjamin Mark Glossop, Wellington (NZ); Emerson Patrick James Ryder, Wellington (NZ); Benjamin Poulter, Wellington (NZ)

(73) Assignee: WHOOSH HOLD LP, Wellington Central (NZ)

( * ) Notice: Subject to any disclaimer, the term of this patent is extended or adjusted under 35 U.S.C. 154(b) by 782 days.

(21) Appl. No.: 17/629,043

(22) PCT Filed: Jul. 24, 2020

(86) PCT No.: PCT/NZ2020/050076
§ 371 (c)(1),
(2) Date: Jan. 21, 2022

(87) PCT Pub. No.: WO2021/015630
PCT Pub. Date: Jan. 28, 2021

(65) Prior Publication Data
US 2022/0274632 A1    Sep. 1, 2022

(30) Foreign Application Priority Data
Jul. 25, 2019 (NZ) ......................... 750217
Sep. 30, 2019 (NZ) ......................... 757685

(51) Int. Cl.
B61B 3/02     (2006.01)
A63G 21/20    (2006.01)
(Continued)

(52) U.S. Cl.
CPC ................. *B61B 3/02* (2013.01); *B61B 7/06* (2013.01); *A63G 21/20* (2013.01); *B64U 10/14* (2023.01)

(58) Field of Classification Search
CPC .. B61B 3/02; B61B 7/06; B64U 10/14; A63G 21/20
See application file for complete search history.

(56) References Cited

U.S. PATENT DOCUMENTS 639,240 A   12/1899  Hutchinson
680,901 A    8/1901  Ward et al.
(Continued)

FOREIGN PATENT DOCUMENTS

CH        301326 A   8/1954
DE   102010034465 A1   2/2012
(Continued)

OTHER PUBLICATIONS

Aerial Ropeway Editorial Photograph; Image of Engineering, 2007.
Wallis-Tayler, A.J., "Aerial or Wire Rope-Ways : Their Construction and Management", C. Lockwood, 2011, 50-51.

*Primary Examiner* — Jason C Smith
(74) *Attorney, Agent, or Firm* — Holzer Patel Drennan

(57) ABSTRACT

Described herein is a transport system and method of transporting objects including people between locations. The description also relates to urban and public transport systems for moving large numbers of people and freight or objects between locations. The description also relates to transport systems based on cable and rail elements and
(Continued)

moving therebetween. Also described are junction mechanisms, switching and control systems.

21 Claims, 45 Drawing Sheets

(51) Int. Cl.
  *B61B 7/06* (2006.01)
  *B64U 10/14* (2023.01)

(56) References Cited

U.S. PATENT DOCUMENTS

| | | | |
|---|---|---|---|
| 1,206,581 | A | 11/1916 | Opsal |
| 2,198,536 | A | 4/1940 | Fredrik et al. |
| 2,547,935 | A | 4/1951 | Philip |
| 3,001,432 | A * | 9/1961 | Greif ............... G10H 1/383 84/715 |
| 3,353,503 | A | 11/1967 | Pettit |
| 3,858,518 | A * | 1/1975 | Nyman ............... E01D 19/14 104/18 |
| 4,615,273 | A * | 10/1986 | Osthus ............... B65G 37/02 198/465.4 |
| 5,094,171 | A | 3/1992 | Fujita |
| 6,223,886 | B1 * | 5/2001 | Bonora ............... B65G 13/04 414/940 |
| 6,308,818 | B1 * | 10/2001 | Bonora ............... B65G 37/02 198/465.1 |
| 6,564,721 | B2 * | 5/2003 | Stiles ............... E01B 25/00 104/243 |
| 8,302,537 | B2 | 11/2012 | Quattlebaum |
| 8,863,668 | B2 * | 10/2014 | Quattlebaum ......... E01B 25/00 104/123 |
| 9,555,335 | B1 * | 1/2017 | Wilson ............... A63G 21/22 |
| 9,688,289 | B2 * | 6/2017 | Luger ............... B61B 7/02 |
| 10,144,436 | B2 * | 12/2018 | Phadke ............... B61B 7/00 |
| 10,286,926 | B2 * | 5/2019 | Blengini ............... B61B 7/04 |
| 11,821,223 | B2 * | 11/2023 | Rakhmatulin ......... E04G 5/00 |
| 2003/0061960 | A1 * | 4/2003 | Kunczynski ......... B63B 27/18 104/87 |
| 2008/0011183 | A1 * | 1/2008 | Fischer ............... B61B 12/105 104/123 |
| 2009/0038499 | A1 * | 2/2009 | Morris ............... B61B 7/06 105/148 |
| 2011/0083577 | A1 | 4/2011 | Tilley |
| 2017/0313327 | A1 * | 11/2017 | Phadke ............... B61B 7/00 |
| 2018/0265098 | A1 | 9/2018 | Evans |
| 2022/0274632 | A1 * | 9/2022 | Read ............... B61B 3/02 |

FOREIGN PATENT DOCUMENTS

| | | |
|---|---|---|
| DE | 102017219219 A1 | 5/2019 |
| FR | 3001432 A1 | 8/2014 |
| KR | 101377692 B1 | 3/2014 |
| KR | 101497481 B1 | 3/2015 |
| TW | 1577590 B | 4/2017 |
| WO | 2008019665 A2 | 2/2008 |
| WO | 2018185653 A1 | 10/2018 |

* cited by examiner

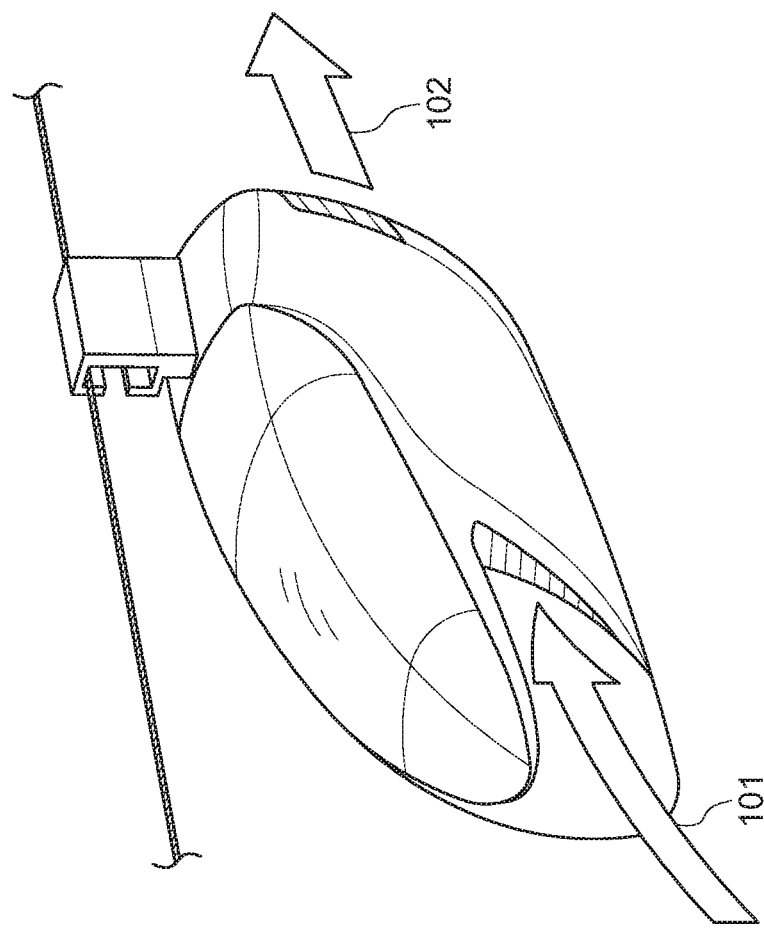
FIG. 30
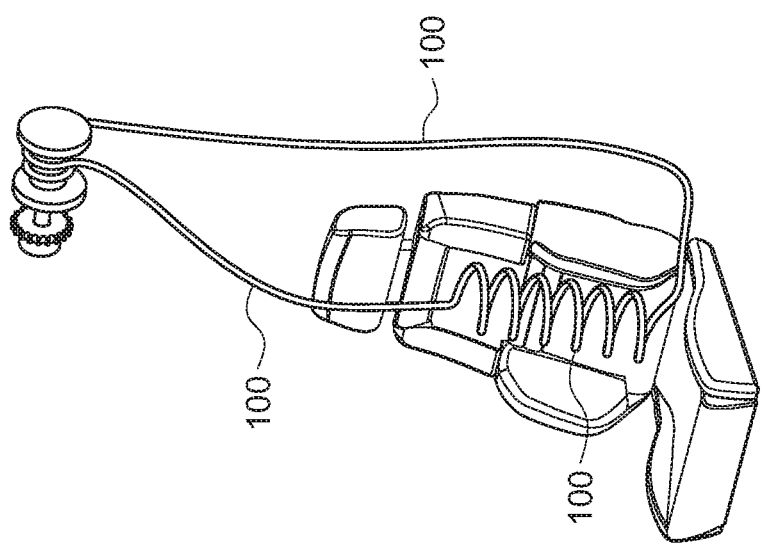

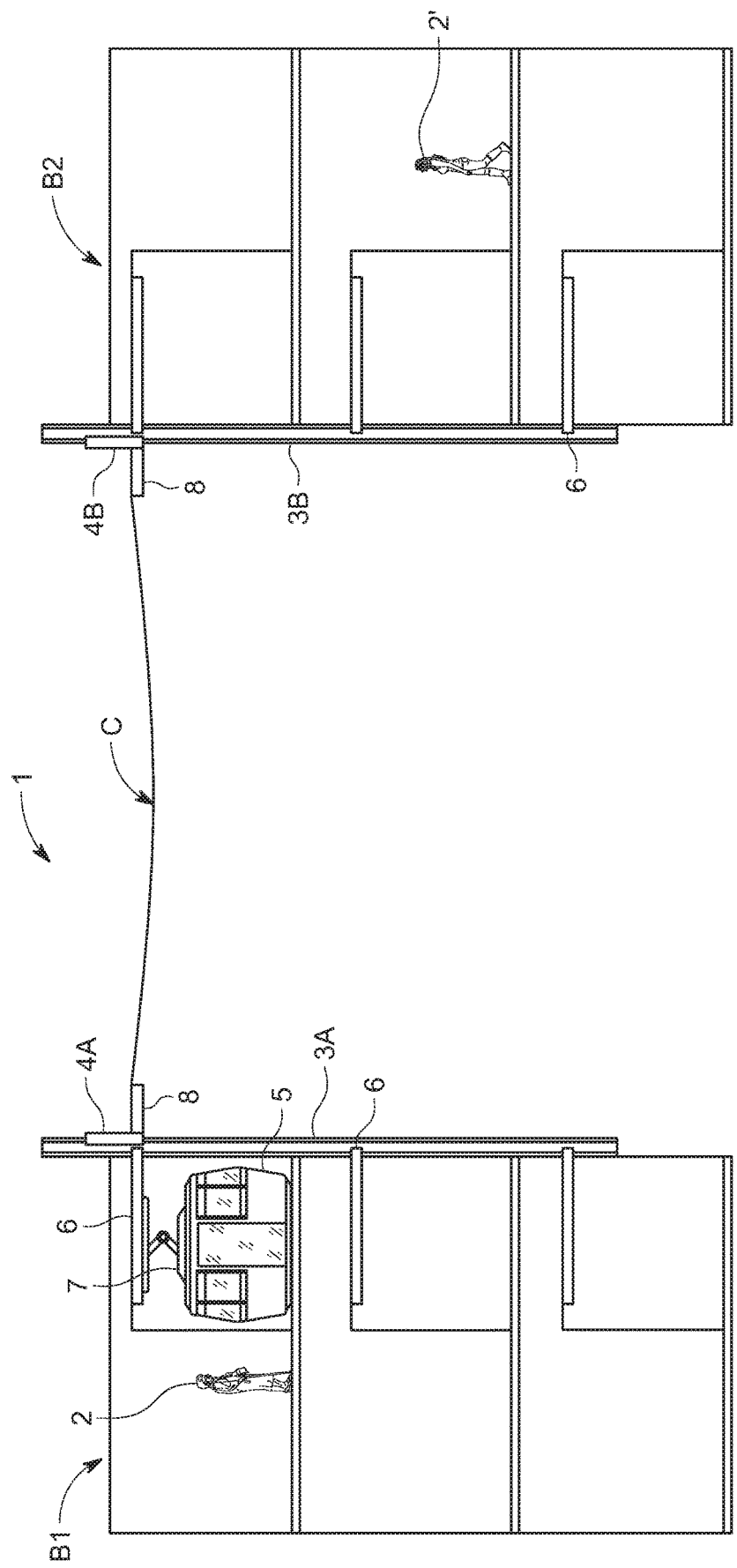

SYSTEM AND METHOD OF TRANSPORTING OBJECTS

RELATED APPLICATIONS

This application derives priority from New Zealand patent application number 750217 and New Zealand patent application number 757685 incorporated herein by reference.

TECHNICAL FIELD

Described herein is a transport system and method of transporting objects including people between locations. The description also relates to urban and public transport systems for moving large numbers of people and freight or objects between locations. The description also relates to transport systems based on cable and rail elements and moving therebetween. Also described are junction mechanisms, switching and control systems.

BACKGROUND ART

Throughout history and in a busier world, there is a need to provide transport of goods including people between locations. Speed of movement is important as is cost, safety, reliability and increasingly, offering transport options that minimise carbon footprint.

Existing transport systems such as personal pods, buses, trams, trains and ferries are expensive to construct, demand significant infrastructure investment and have many regulatory demands to be met.

Reducing construction, maintenance and associated costs is desirable for any transport solution. There are demands on improving the environmental impact of transport systems, particularly through reducing the number of personal pods on the roads. There are also limitations on adding carrying capacity of existing infrastructure such that an alternative transport solution is required to either supplement or entirely replace one or more existing transport solutions.

Elevated transport solutions may be useful so as to minimise disruption to existing infrastructure. Elevated transport systems add a further layer to existing transport infrastructure and offer additional transportation capacity and thereby reduce congestion of existing systems, or more preferably, replace certain aspects of existing systems. Elevated transport systems such as monorails and gondola systems can be relatively expensive to build and install. Monorail and gondola systems require relatively large fixed support members to be located along the route making them unsuitable for many inner-city or other similarly congested environments. Moreover, the fixed nature of the monorails makes them inflexible should unplanned changes be required following initial construction.

Existing elevated zipline systems are typically used for adventure recreation for moving a rider via a cable from point to point. Movement of the rider is by gravity along the cable and braking is via an external brake mounted on the cable.

Ziplines incorporating the ability to transfer a rider from a fixed cable section to a rail (or track) and vice versa are described in the applicant's co-pending patent application published as WO2019098859 which is incorporated herein by reference. The ability for a rider to transition substantially continuously between a cable and rail without having to detach from the cable or rail allows for vectoring or turning corners and remaining on the cable or rail and hence multiple cable runs may be completed on a single zipline run.

A newer development is that of being able to take advantage of powered trolleys moving on cable and rail transport systems. This leads to the ability to provide an alternative powered transport system solution to known transport systems and methods. A number of advantages of the alternative transport system and method may include improved cost effectiveness, design flexibility and providing a rapid means of moving objects between locations with minimal carbon footprint.

Further aspects and advantages of the transport system and method of transporting objects including people between locations will become apparent from the ensuing description that is given by way of example only.

SUMMARY

Described herein is a transport system and method of transporting objects, including people, between locations. The description also relates to urban and public transport systems for moving large numbers of people and freight or objects between locations. The description also relates to transport systems based on cable and rail elements and moving or transitioning therebetween. Also described are track junction mechanisms, switching and control systems.

In a first aspect, there is provided an object transport system comprising:
  a track, the track comprising cable and rail sections optionally linked together;
  at least one pod linked to the track, the pod(s) traversing the track;
  the pods comprising a trolley and a supported or pendant pod housing wherein the pod housing is formed and arranged to contain, support or provide an enclosure for the object to be transported.

In a second aspect, there is provided a suspended trolley and track system comprising:
  a track with at least one controllable junction between a first track section on a first side of the junction and two or more second track sections on a second side of the junction;
  a trolley having a body and wheels, the trolley being configured to ride on the track and to carry a suspended load;
  a junction controller configured to control the at least one controllable junction to connect the first track section with a selected one of the two or more second track sections, such that the trolley entering the junction will travel between the first track section and the selected second track section.

In a third aspect there is provided an object transport system comprising a support cable, or support cable and rail system, and an elevator means for selectively altering the vertical height of at least one part of the support cable or support cable and rail system; and/or a translation means for selectively altering the horizontal position of at least one part of the cable, or rail and cable system.

In a fourth aspect, there is provided an object transport system comprising a cable and trolley along with a cable management means to adjust the length of cable and/or the tension of the cable automatically.

In a fifth aspect there is provided an object transport system with a junction or hub which is configured to switch a vehicle from one track or cable onto another track or cable, and optionally the junction or hub is also configured to change the direction of motion of the vehicle.

In a sixth aspect, there is provided an object transport system comprising at least one station within the object transport system substantially as hereinbefore described, wherein the, or each, station is configured to be a point of transition for a pod or object conveyed by a pod or pods.

In a seventh aspect there is provided a method or methods of communicating with an object transport system user, coordinating scheduling of individual transport elements, data collection and analysis of motion of individual transport elements (including the item or person travelling), prediction of travel schedule and coordination based on user demand, historical data analysis, and real time data metrics; and a means of communicating navigation instructions (if any) to the system user or navigated object/person. This aspect also includes methods of collaborating, and coordinating with personal and public planning data sources, for example personal calendar and scheduling applications and data bases, and a means of providing adaptive planning based on travel forecasting and planned arrival time.

In an eighth aspect, there is provided a control system for an object transport system substantially as hereinbefore described, the control system comprising:

a central control station that receives all signal information from every pod on the transport system or a part thereof and which comprises a controller that receives and processes the sensed signals from the transport system and which actions pod movement or braking based on predetermined variables.

In a ninth aspect, there is provided a control system for an object transport system substantially as hereinbefore described, the control system comprising:

a distributed control station spread across all pods on the system or a system zone that receives signal information from the pod itself and optionally other pods or the transport system as a whole and which comprises a pod controller that receives and processes the sensed signals and which actions pod movement or braking based on predetermined variables.

In a tenth aspect, there is provided a method of transporting at least one object between locations, the method comprising the steps of:

providing an object transport system substantially as hereinbefore described;

accessing a pod for the object or objects;

conveying the object or objects in the pod to a desired location; and once at the desired location, exiting the object or objects from the pod.

Advantages of the above described transport system and methods of use are as noted above and more particularly may be one or more of the following:

The described transport system is useful for spanning difficult terrain without the need for large scale and expensive infrastructure development such as building of roads, highways or bridges.

Pods can be moved rapidly between locations

Personal transport with capacity to tailor the user experience to an individual's requests Elevated above existing infrastructure Comparatively low cost to manufacture and run Based on the inventor's experience, maintenance costs should be no more than art methods of transport (most likely considerably less).

Flexibility in design means the transport system may be adapted to many environments and adapted even during a build to cater for unexpected design issues.

BRIEF DESCRIPTION OF THE DRAWINGS

Further aspects of the transport system and method of transporting objects including people between locations will become apparent from the following description that is given by way of example only and with reference to the accompanying drawings in which:

FIG. 30 illustrates how the pods may incorporate temperature control;

FIG. 40A illustrates a transport system extending between two buildings;

DETAILED DESCRIPTION

As noted above, described herein is a transport system and method of transporting objects including people between locations. The description also relates to urban and public transport systems for moving large numbers of people rapidly between locations. The description also relates to transport systems based on cable and rail elements and moving or transitioning therebetween. Also described are track junction mechanisms, switching and control systems.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The terms 'pod', 'trolley' and 'vehicle' or grammatical variations thereof may be used interchangeably herein and reference to one term does not preclude the others.

Transport System Generally

In a first aspect, there is provided an object transport system comprising:
- a track, the track comprising cable and rail sections optionally linked together;
- at least one pod linked to the track, the pod(s) traversing the track;
- the pods comprising a trolley and a supported or pendant pod housing wherein the pod housing is formed and arranged to contain, support or provide an enclosure for the object to be transported.

Figure 1:
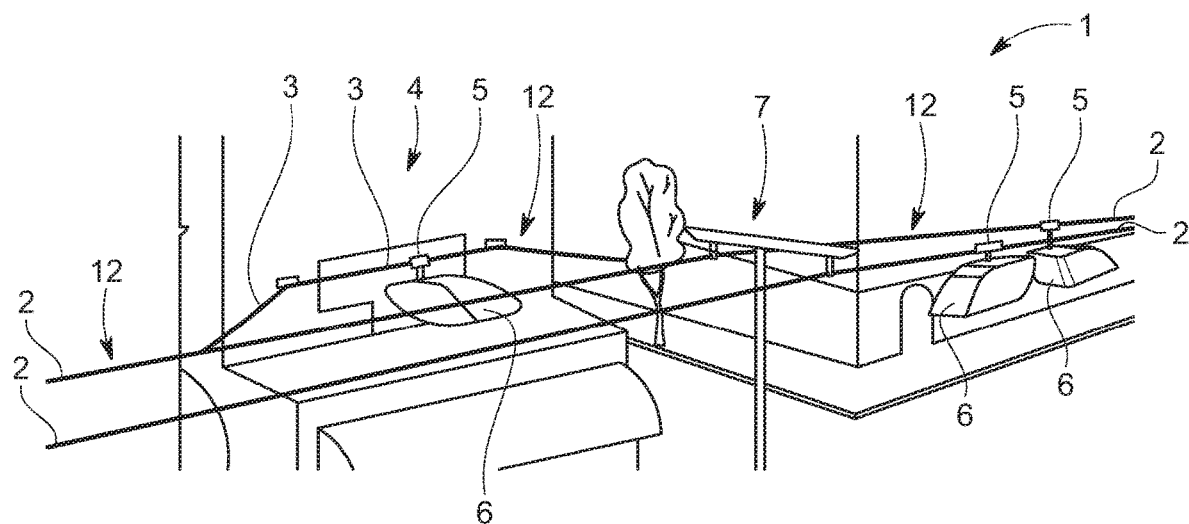
FIG. 1 illustrates a schematic of one possible embodiment of the transport system.

FIG. 1 shows a schematic of one possible embodiment of the transport system arrow 1 illustrating the tracks 12 in the form of a cable section 2, rail section 3, station 4, trolley 5, pods 6 and support member 7.

Objects

In one embodiment the object conveyed in the transport system may be one or more people. The object may alternatively be goods or cargo. Examples of goods/cargo may be items such as mail, packages, bicycles, scooters, wheel chairs, furniture and so on. Reference to objects, people or goods/cargo should not be seen as limiting unless otherwise noted as it should be appreciated that people may be equally transported in the context of this system as goods and/or both people and goods transported together.

Track Comprising Cable and Rail Sections Optionally Linked Together

Reference in this specification to the term 'track' refers to a directing means that a pod or trolley traverses, the track defining the general direction of motion of the pod or trolley. Use of the term track should not be seen as limiting since the track may be sections of cable or other elongated line such as rope and sections of track may be made up of rails, rails being formed shaped sections generally made of a rigid metal, metal alloy or composite material. The term track may also encompass transition means located between cable to rail or rail to cable connections that the trolley or pod traverses.

Track is Fixed Relative to the Trolley/Pod

The track may be fixed in position. That is, the track is for example a fixed length non-moving cable or rail. All transport system movement occurs through movement of the pod relative to the fixed track. Moving cables or rails are common with gondola systems for example, have inherent problems with wear and considerable over-design and expense in cable maintenance. This design constraint and cost may be avoided by the described transport system.

Cables

Reference as noted above is made to use of cables. Cables may be used generally for point-to-point transport. Typically, cables are used for example in zipline applications to traverse extended straight paths. Cornering is theoretically possible using cables however, not desirable or difficult to design for and avoid wear on the cable about the corner. This is because the cable catenary shape is disrupted about a corner and take up of slack or freedom of movement of the cable (e.g. due to pod weight or object weight on the cable) may be needed relative to a corner element.

Rails

Rail sections may generally be useful about transitions between cable sections, about load and unload points, to cause a change in pod direction, to cause a change in pod elevation, to control pod speed, to control pod braking, to cause the pod to receive a power charge, to discharge power from a pod, or to communicate aspects of the pod with other aspects of the transport system.

Rail sections of track may be curved laterally and/or vertically to cause changes in vertical displacement or direction of the pod when the pod traverses along a track.

Track Levels

The track as may be appreciated from the above need not be flat, that is, extend substantially horizontally. The track may be flat, have an upward gradient, or have a downward gradient. Changes in elevation of the pod may therefore be achieved by providing track (cable or rail) elements which are inclined or declined between two fixed points or ends of the cable or rail or combinations thereof. In one embodiment, an incline or decline may be created by altering the relative vertical displacement of two or more points of a cable or rail. Changing the relative heights of points along a cable or rail may be achieved by providing a displacement mechanism to move parts or the whole of cables or rails.

Rail Construction

Rail sections may be constructed through digitally generating rail sections and having a digital generation of a jig and fixture setup to correctly position preformed rail elements in their correct orientation. A physical jig or fixture may then be adjusted to the settings of the digitally generated settings to correctly support physical components and then the physical elements fabricated into a rail section.

Machining operations post fabrication may be informed or instructed by the digitally generated manufacturing data.

At Least One Pod Linked to the Track, the Pod(s) Traverses Along the Track

As noted above, traversing the tracks may be one or more pods.

Pods as described herein may generally comprise a trolley and supported from the trolley, a pendant pod housing wherein the pod housing is formed and arranged to contain or provide an enclosure for the object or objects to be transported.

Pods may have a capacity to transport at least 50 kg. Pods may be built to carry 100-500 kg e.g. 1-4 occupants. Pods may be built to convey considerably larger weight objects or loads and these figures are provided by way of illustration only.

A pod may have a first forward direction of travel relative to a track, which is the usual mode of travel between locations. Pods may move at speeds of at least 5 km/h. The upper limit of speeds possible may be in excess of 100 km/h the upper limit dependent on transport system design factors, object weight, motor power and so on. Reverse pod movement may also be possible.

Pod Traversing

The pod, in use, may move along the track traversing between cable and rail sections without needing to stop or unhook. That is, the pod may move along the catenary of a cable and transition to and move along a rail and vice versa from a rail to a cable section. Intermediate cable and rail sections may be transition elements that communicate with a pod trolley. Communication may be mechanical causing gate opening and closing.

Motor Powered Trolley or Pods

A pod or pods may use a trolley provided with a motor or motors to drive the trolley along the cable or track. The motor may be directly or indirectly attached or connected to a wheel, caster or other drive element which will move the vehicle along the cable or track. The motor, for example an electrical induction or brushless motor type, may be disposed within the hub of a wheel or drive element. Electrical power may be provided from any source, such as a battery, solar photo voltaic panel, or a power line located with the supporting cable. Other electrical storage and sources are possible.

Advantageously, this arrangement may limit the overall size of the vehicle, particularly where there is limited power requirement for the vehicle. This may be the case for example if an unloaded or lightly loaded vehicle is to be moved about the transport system to bring it to a desired location.

In a further embodiment, the motor of the trolley may be located outside of the wheel or drive element and directly or indirectly attached thereto by gearing, drive-belts or other mechanical linkages.

Alternative Motive Sources

Further motive sources are possible with the disclosed system. These may be used in isolation or combination, with or without the electrical motor. Known methods of providing energy supply to such elements are considered in this disclosure. Examples of these are human power, internal combustion engine, or flywheel systems. An example of a human power source is where a foot operated crank system is connected to the drive wheel of a trolley element. The crank system is operated by the rider of the trolley system in a similar manner the use of a bicycle. In an alternative system a flywheel may be acted upon to add kinetic energy to the flywheel element in the rotational sense. The rotation of the flywheel may then be connected to a drive wheel of a trolley such that the flywheel provides rotation and motive power to the trolley drive wheel. In the case of an internal combustion engine, connection could be made to the drive elements in a similar manner to that of an electric motor. In an alternative configuration a motor (electric or internal combustion for example) may drive a fan system, the fan system providing thrust that can be used to provide motive effort on the trolley.

A cable-rail transport system as disclosed in this specification may operate as a manually controlled system with human supervision and coordination of operational elements.

Figure 11:
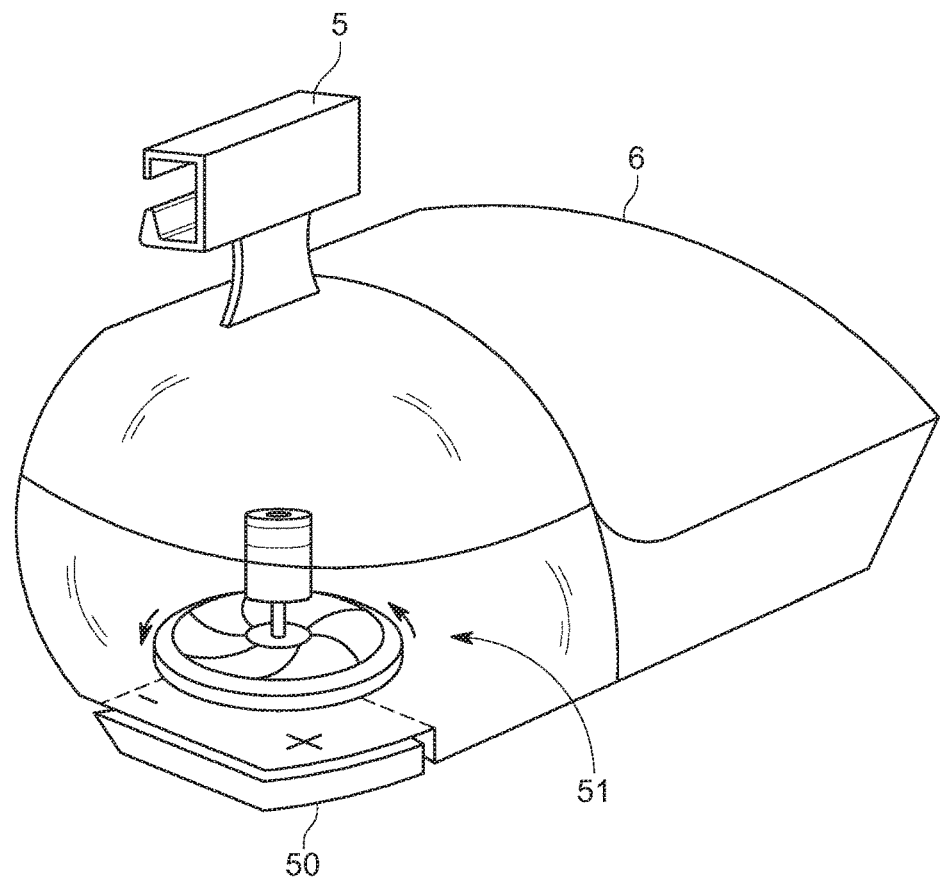
FIG. 11 illustrates a perspective cutaway schematic of a pod.

By way of example of the above, FIG. 11 illustrates a perspective cutaway schematic of a pod 6 and trolley 5 illustrating a battery 50 and flywheel 51.

Figure 21:
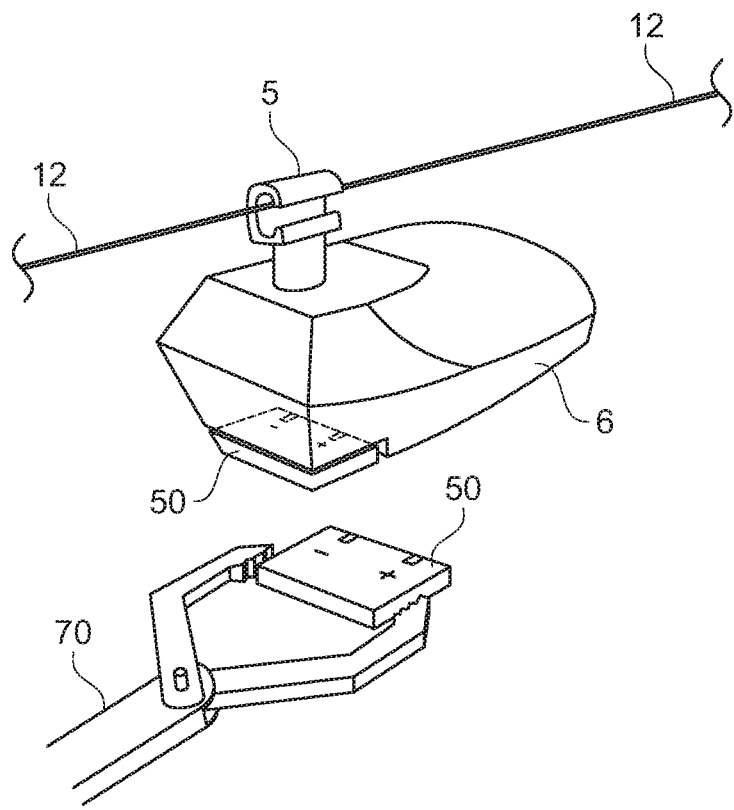
FIG. 21 illustrates a perspective schematic of a pod and trolley illustrating a battery and robotic arm supplying a fresh battery to the pod.

FIG. 21 illustrates a perspective schematic of a pod 6 and trolley 5 illustrating a battery 50 and robotic arm 70 supplying a fresh battery 50 to the pod 6.

Figure 22:
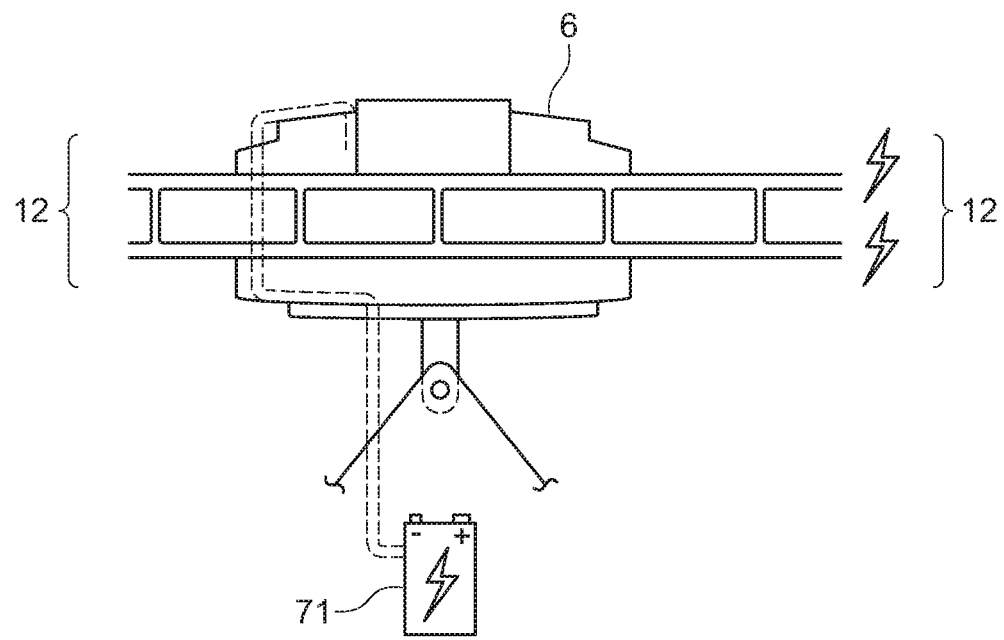
FIG. 22 illustrates a plan view of a pod being recharged via a track mounted power source.

FIG. 22 illustrates a plan view of a pod 6 being recharged via a track 12 mounted power source 71.

Recharging

Power cells such as batteries could be removed/swappable and recharged remotely or powered within the pod by a recharging connection. For example, pods may be repowered by connection to a recharging connection. Charging may be direct such as by direct connection to a power source, or indirect by inductive changing.

Remotely charged pods could be hot swappable, that is, recharging could occur when a pod is located in a station or on the move. Charging or charge source replacement may be achieved manually or robotically.

Solar Charging

Electrically powered systems may be charged with photovoltaic/solar generation. For example, pods/the motor may be charged by use of solar panels located about or on the transport system or at a more remote or independent location. In one embodiment, the pod housing has solar panels, for example, the pod roof, walls or other surface of the pod may comprise solar panels. Various components of the wider transport system may also be fitted with solar panels e.g. stations. Electricity generated by the solar panels may be stored for later use such as at night when there is no sun to act on the solar panels, or the power may be used to power the trolley or pod housing.

Regenerative Braking

The pod may employ regenerative braking. Regenerative braking may provide power to a rechargeable power source. For example, braking of the trolley on inclined or corners of the transport system may be used to generate energy for storage in a rechargeable power source.

Pod and Motor Power Sources

The pod and motor may be powered by the same source or different sources. For example, a powered track system may be used to energise a pod trolley. The powered track system may provide no on-board power storage and all power is delivered via tracks (rails or cables), or the track system may be used to charge the pod or trolley whilst the pod or trolley are moving/connected to the track system. As should be appreciated, it is envisaged that there may be embodiments of the transport system where there pod/pod trolley is not provided with any on-board power source as all power requirements are met by power supplied from external sources. For example, via charged rails or cables (such as those that the trolley travels along), or separate rails or cable provided for the purpose of providing power.

Other Power Sources

Despite reference above to use of electricity to power the pod/pod trolley, other power sources may also be used e.g. compressed air, steam and so on.

Motor Power

The motor may be configured to drive a pod along a track, the pod containing an object load and the motor sufficiently powered to negotiate track inclines and declines of 1-30 degrees, or 5-25 degrees, or 7.5 to 20 degrees.

Braking

The pod itself may comprise a brake mechanism integral with the motor that brakes pod movement along the track. The brake may be a part of the trolley mechanism. As should be appreciated, braking is pod specific and may generally be governed by the pod itself and not some external input. External inputs such as a signal from a network controller may however be used as well to activate a pod brake for example, in the event of an emergency braking scenario.

Multi Pod Groups or Trains

Multiple pods may be linked to travel in groups or trains. For example, one user may call on multiple pods, one to ride in and others to carry cargo in. All pods may then traverse the track as a group. In one embodiment, pods may ride together linked via a magnet or magnets. The magnet or magnets may be electromagnets. The magnets may be switched on to link or couple pods together or switched off to decouple pods.

Pod Configuration

The pod configuration may be designed to be adaptable to suit the object(s) transported e.g. people, goods, wheelchairs, bikes, scooters, food, rubbish, mail and parcels and so on. The configuration may be internally adaptable or instead pods of different configurations may exist. People carrying pods for example may have adjustable seating arrangements e.g. to allow users to move or rotate seats to face towards one another or away or other configurations.

Figure 27:
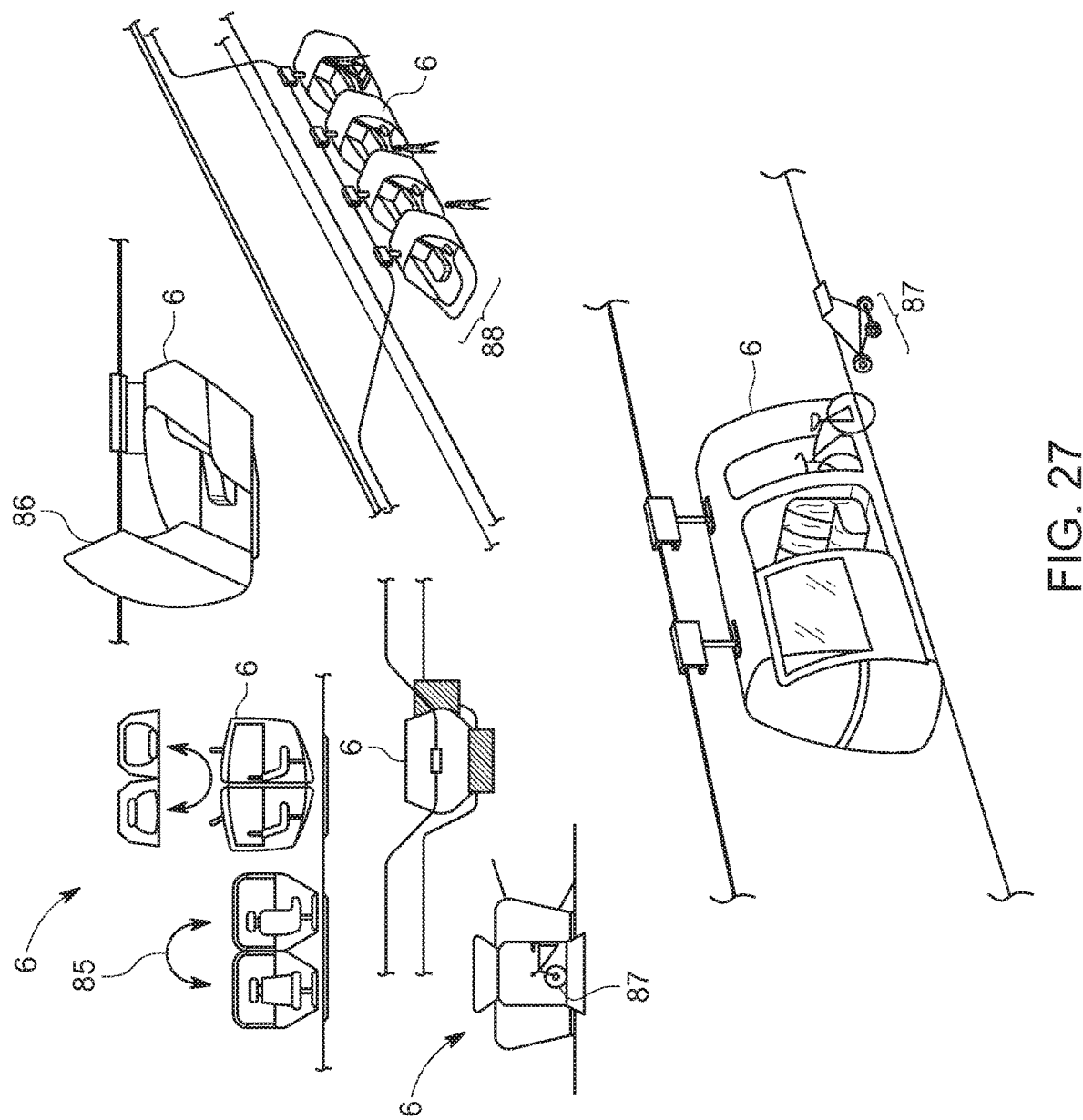
FIG. 27 illustrates a series of schematic images illustrating different pod configurations, for example illustrating reconfigurable seating, door opening, and cargo storage such as storage of bikes. Pod stacking is also illustrated.

FIG. 27 illustrates a series of schematic images illustrating different pod 6 configurations, for example illustrating reconfigurable seating 85, door opening 86, cargo storage 87 such as storage of bikes. Pod 6 stacking 88 is also illustrated.

Figure 28:
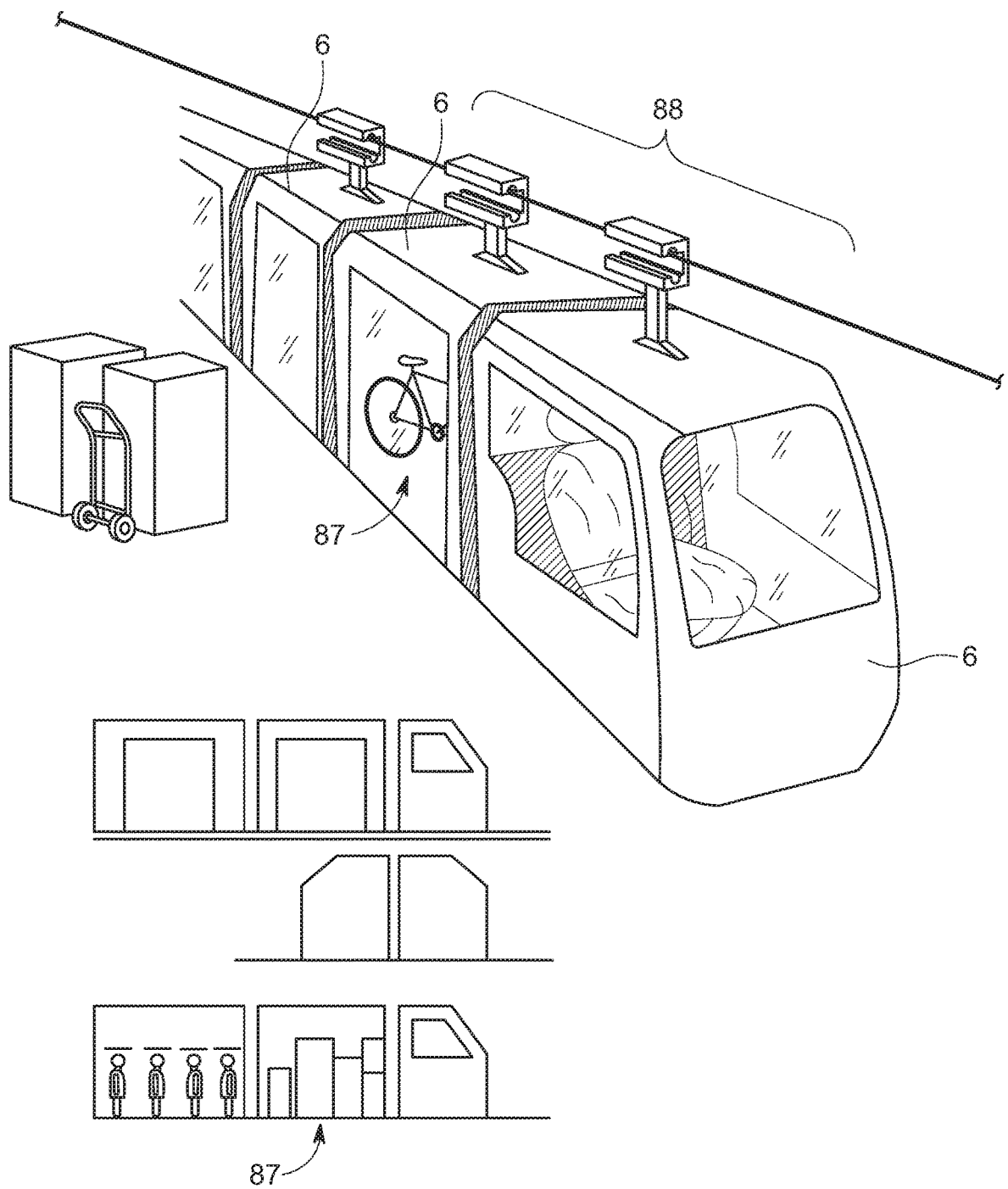
FIG. 28 illustrates another example of pod grouping, in this example linking cargo and personnel pods.

FIG. 28 illustrates another example of pod grouping, in this example linking cargo 87 and personnel pods 6

Figure 29:
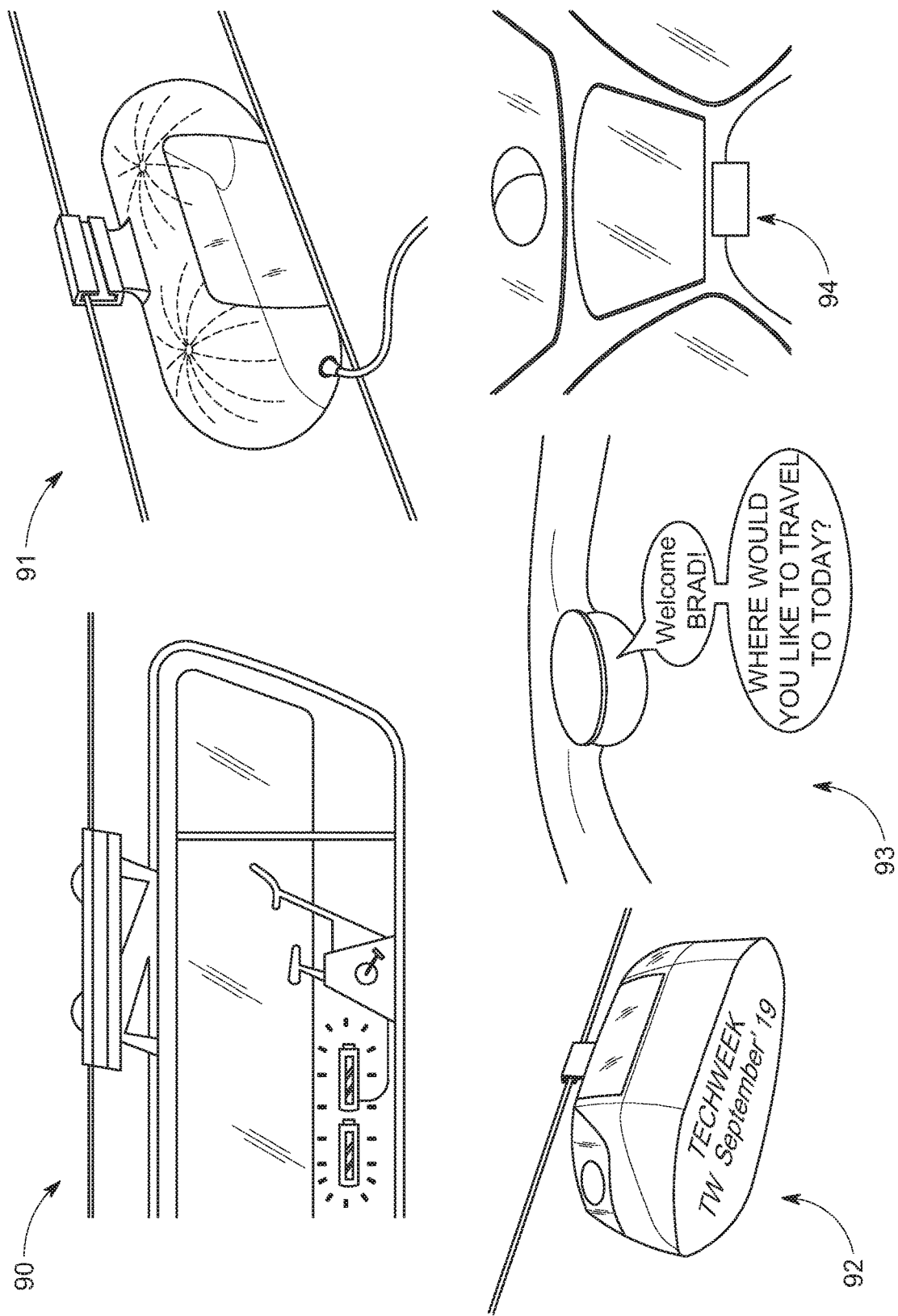
FIG. 29 illustrates schematically some possible features of pods.

FIG. 29 illustrates schematically some possible features of pods 6 such as an exercise pod 90 where energy generated by the exerciser is used to charge a pod battery; integrated cleaning system 91 may be included in pod 6 design, the underside of a pod 6 may be used for dynamic advertising 92, pods may have voice operated controls 93, optional opaque or image projected glass pods 94 may be used to entertainment and to assist passengers sensitive to heights and/or to provide privacy for the rider.

FIG. 30 illustrates how the pods 6 may incorporate temperature control, for example by use of a heat transfer system moving heat generated by the motor to a seat warmer or coil 100 in the passenger seat. Cooling may be provided by use of an inlet vent 101 and outlet 102 in the pod housing to cause airflow through the pod during movement.

Pod Connectivity

Pods may be designed to send and receive external signals. Pods may for example have connectivity to a wider network via the internet, Wi-Fi™, Bluetooth™, charging ports and so on.

Pods Release and Attachment

The pods may releasably attach and detach from the transport system. For example, pods may detach from a section of track about a station area, be moved away from the transportation system and serviced and then reattached to a section of track.

Pods may be configured to detach and integrate with other transport means e.g. pod detaches onto a vehicle bogey and the pod and vehicle bogey can then be driven away. In another embodiment, the pod detaches from the transport system and a quadcopter configuration is attached to the pod roof for air transport. In a further embodiment, the pod detaches onto a boat base for sea/water transport.

Figure 5:
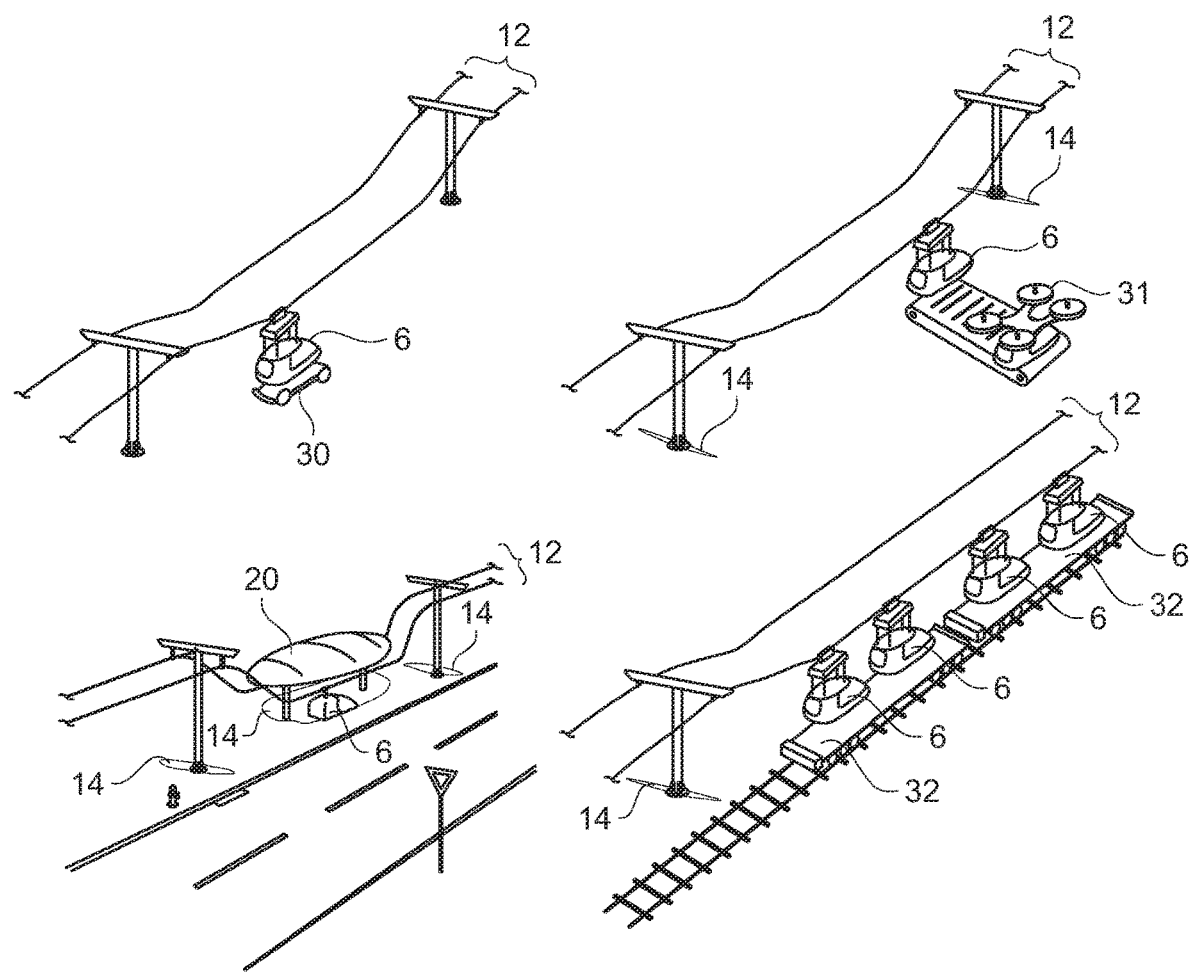
FIG. 5 illustrates schematics of the pod entering a shelter at ground level.

FIG. 5 provides schematics of the pod 6 entering a shelter 20 at ground level 14; the pod 6 being detached from the track 12 and fitted to a road vehicle bogey 30; the pod 6 being detached from the track 12 and fitted to a quadcopter base/air lift device 31; the pod 6 being detached from the track 12 and fitted to a railway train bogey 32.

Figure 6:
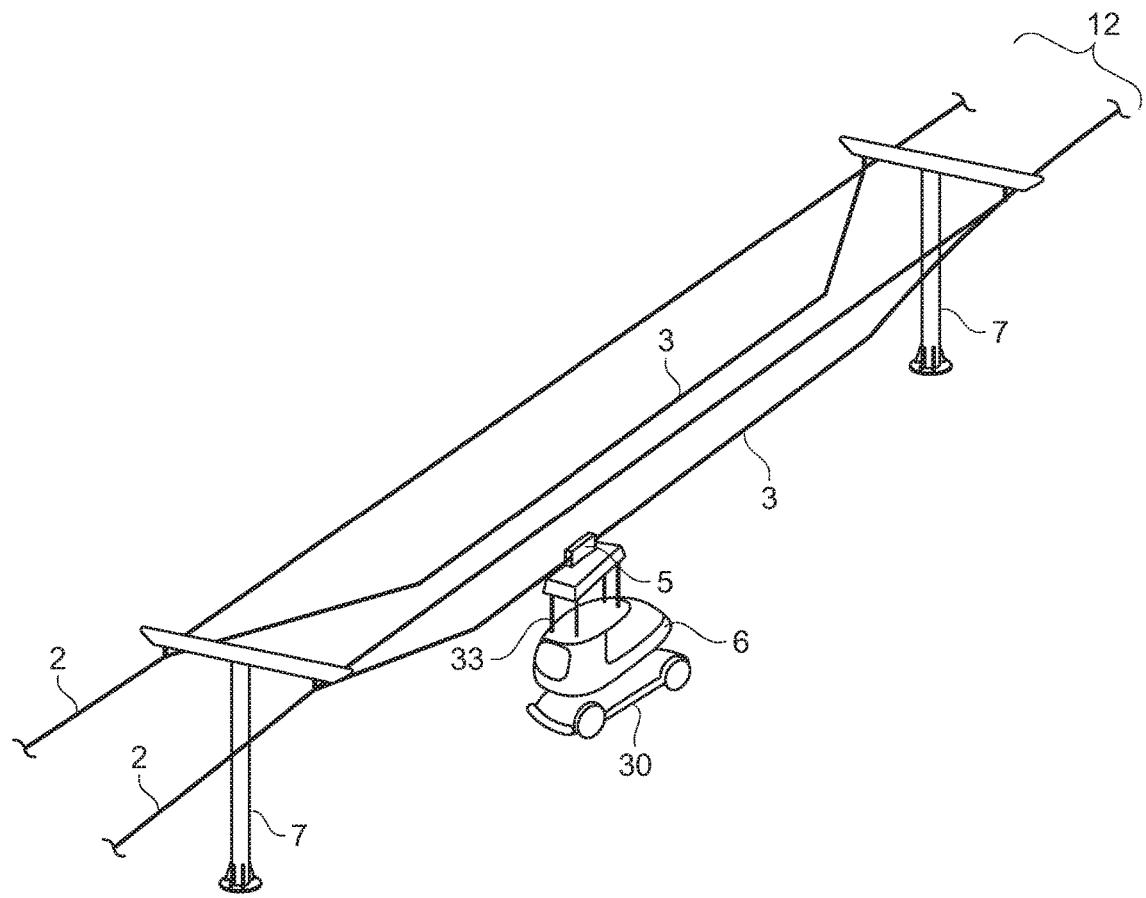
FIG. 6 illustrates a detail view of the pod being detached onto a road vehicle bogey.

FIG. 6 illustrates a detail view of the pod 6 being detached onto a road vehicle bogey 30, in this case being lowered to the road bogey 30 via a winching mechanism 33.

Figure 10:
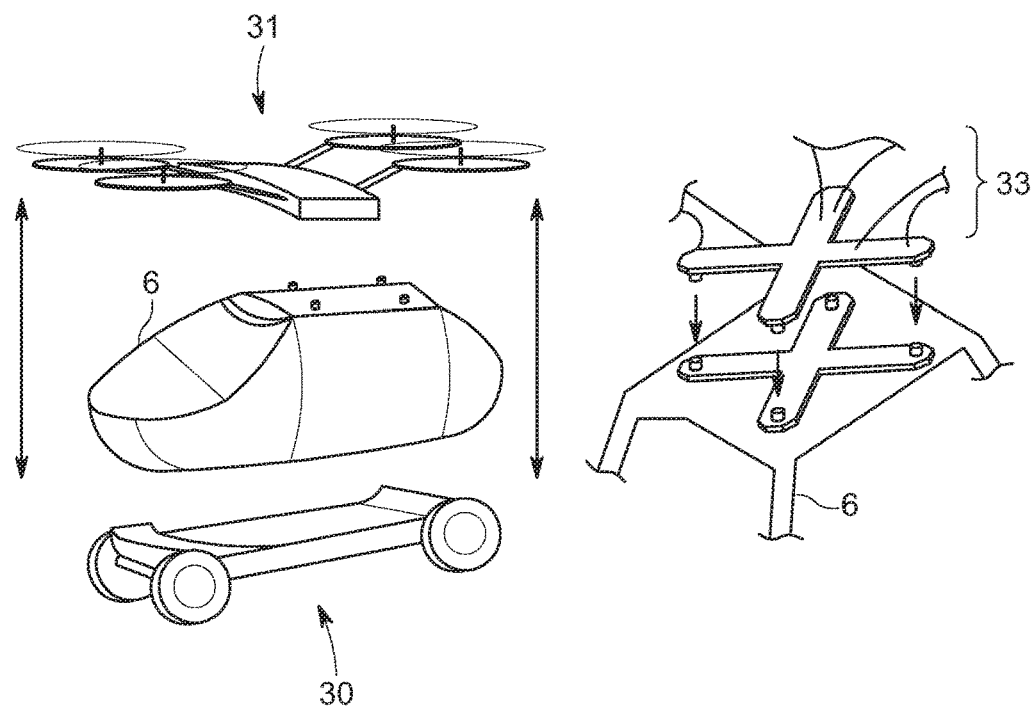
FIG. 10 illustrates a further schematic of a pod and how it may link to other transport options.

FIG. 10 illustrates a further schematic of a pod 6 and how it may link to other transport options like a road vehicle bogey 30, a quadcopter 31 and additional illustration of a winch mechanism 33.

Figure 32:
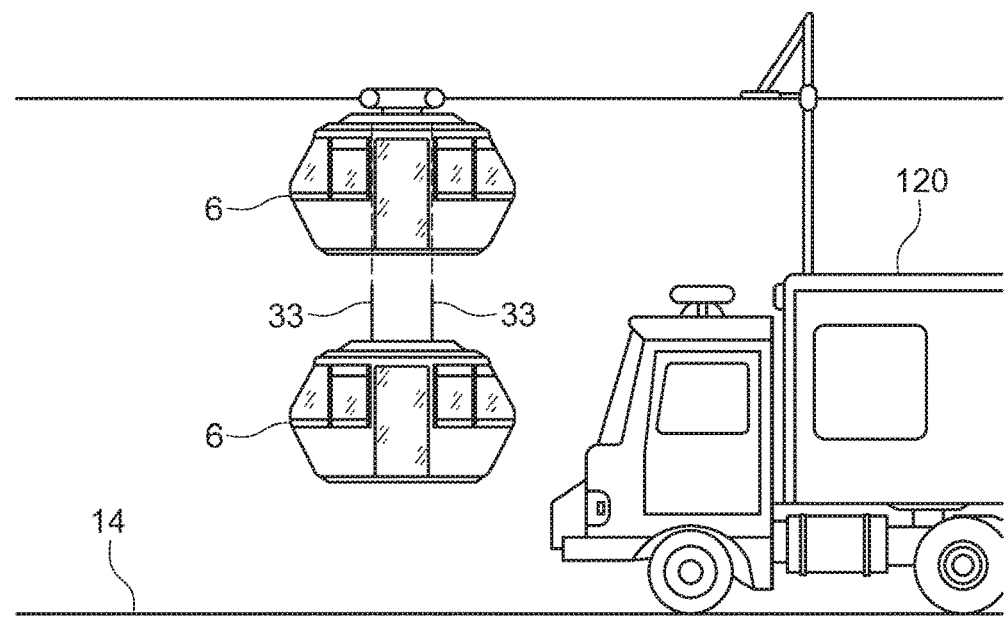
FIG. 32 illustrates how the winch mechanism may also be used in a rescue scenario to lower a pod to the ground in the event of a faulty pod.

FIG. 32 illustrates how the winch mechanism may also be used in a rescue scenario to lower a pod 6 to the ground 14 in the event of a faulty pod. A truck 120 may be used to remotely power the pod or pod winch and/or to support the track 12 during a rescue.

Navigation

A navigation system and control may be located within the pod that instructs the different transportation means (e.g. pods, junctions, station adaptation etc.) as to what to do and where to go.

Pod Access

Access to a pod may be via a door or doors. The doors or doors may be manually operated or electronically operated. In one embodiment, door opening may be controlled via an automated electronic actuator. Access to the pod may only be granted once a unique identifier is scanned to ensure the correct patron is boarding (QR code, barcode etc.).

Pod doors may have a force feedback mechanism to ensure that no injuries can occur if a user or object becomes trapped between the doors.

Pod doors may open upon arriving at a station and completing a successful docking procedure.

In the event of an electronic failure the user may be able to use a mechanical override to open or close the pod door(s). Manual override may however only be available to the users under certain conditions to safeguard against mis-use.

Pod to Track Link

As noted, the pod(s) are linked to a track (cable, rail, and transition sections for example). The pod trolley is typically the direct connection point between the pod and track.

The pod and pod trolley may comprise a resilient and flexible connection such as a rubber connection to dampen pod rocking relative to the track. The rubber connection may also be used to provide yaw rotation flexibility and yaw damping. An aim of the resilient and flexible connection may be to reduce working stresses and increase ride quality.

The yaw axis of the pod-trolley connection may be set on a bearing system that has a rotational degree of freedom and the relative rotation between the pod and the trolley may be controlled by an active damper or actuation means. The rotational degree of freedom of movement may be configured to allow the pod to rotate about this axis of rotation to facilitate loading/unloading in a station, or to reduce aerodynamic load on a mobile pod by aligning the pod with the apparent wind direction.

Figure 31:
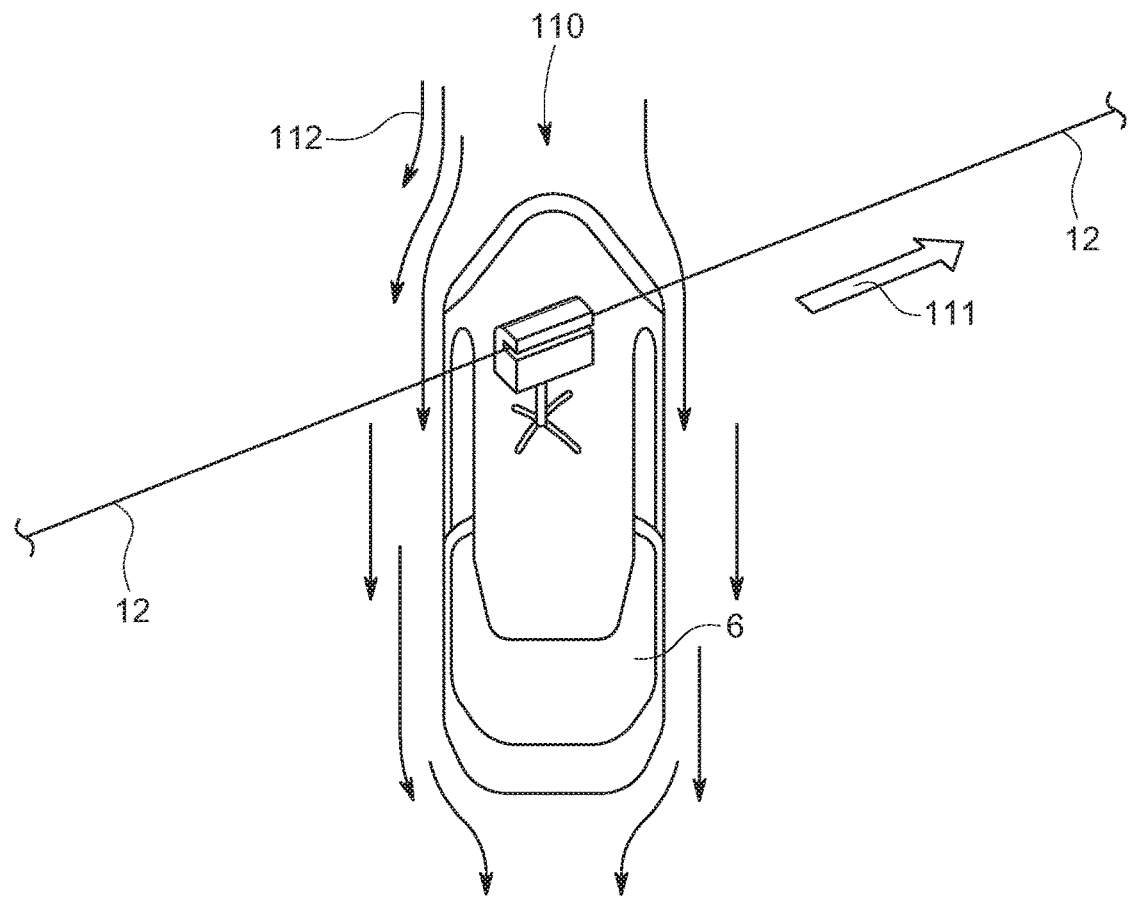
FIG. 31 illustrates an example of a pod travelling in direction on a track however the pod is nose on into a cross wind.

FIG. 31 illustrates an example of a pod 6 travelling in direction 111 on a track 12 however the pod 6 is nose 110 on into a cross wind 112 so as to minimise drag and swing of the pod 6 on the track 12.

The pod may be configured to mitigate pod roll and pitch through cornering and acceleration forces in the direction of travel.

The pod may be configured to incorporate a system to damp oscillation of roll or pitch. This system may be a passive means or active means. In one example, the system may be a gyro-stabilised pod. Fore-aft stabilising could be through active control of trolley motion to damp roll swing.

Tracks Linked to Support Members

Support members may be required to support cable or rail elements in an elevated position, they may also support junctions or switching apparatus to facilitate pods moving from one cable or rail to another cable or rail and/or to change direction.

As may be appreciated from the Figures, particularly those following below (see for example FIGS. 2 to 6, 12 to 20), the support member(s) may be fixed ground bearing points. Fixed ground bearing points may be towers, pylons, junctions (suspended or fixed).

Figure 12:
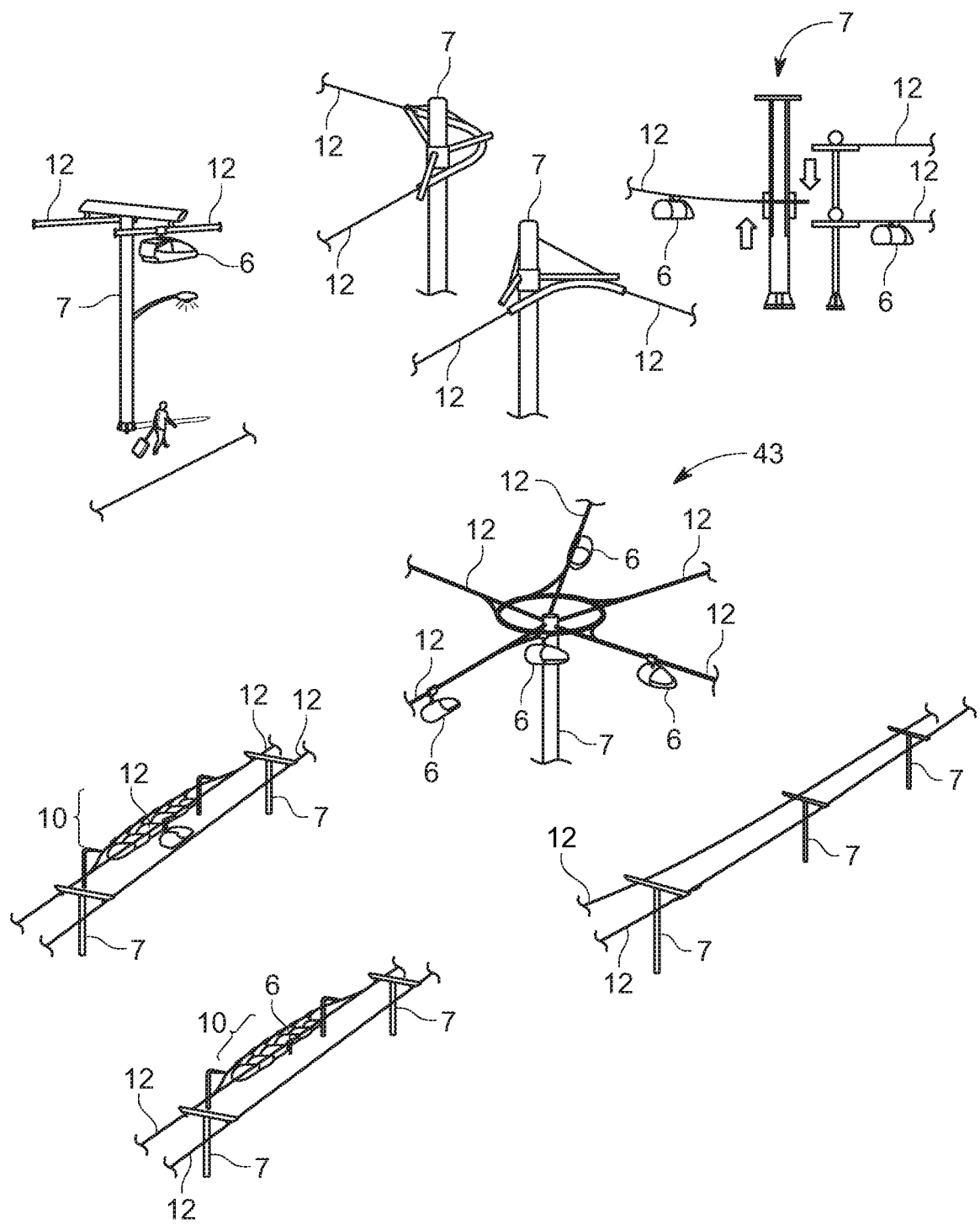
FIG. 12 illustrates various schematic options for support members.
Figure 14:
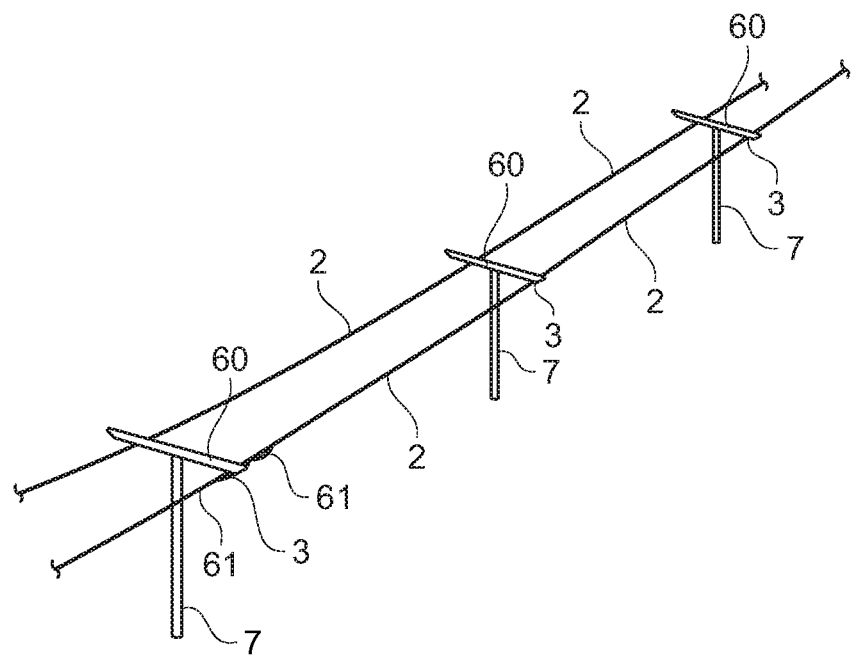
FIG. 14 illustrates a detail view of a pylon support structure that supports a dual track spanned system.

Support members may be connection points to existing infrastructure e.g. light poles, electricity pylons, and buildings (FIGS. 12 and 14).

Support members may be visually unobtrusive and may readily form part of or are formed from typical infrastructure elements of towns or cities such as light supports, solar panel supports, poles or posts.

Track Junctions

A pod and/or trolley may be able to switch from one track to another track via junctions. Switching may occur about a rail section of track. The pod trolley may be configured to switch the pod from one track to another track e.g. between two parallel sections of cable or rail. Towers or vertical support members described further below may be provided with a translation rail or cable translation mechanism which may provide for vertical displacement of cable and or rails. In one embodiment, the translation rail or cable may move horizontally, vertically, or rotationally with respect to a fixed support member. The translation element may be integral to or attached to a length of rail.

General Track Junction Example

Figure 2:
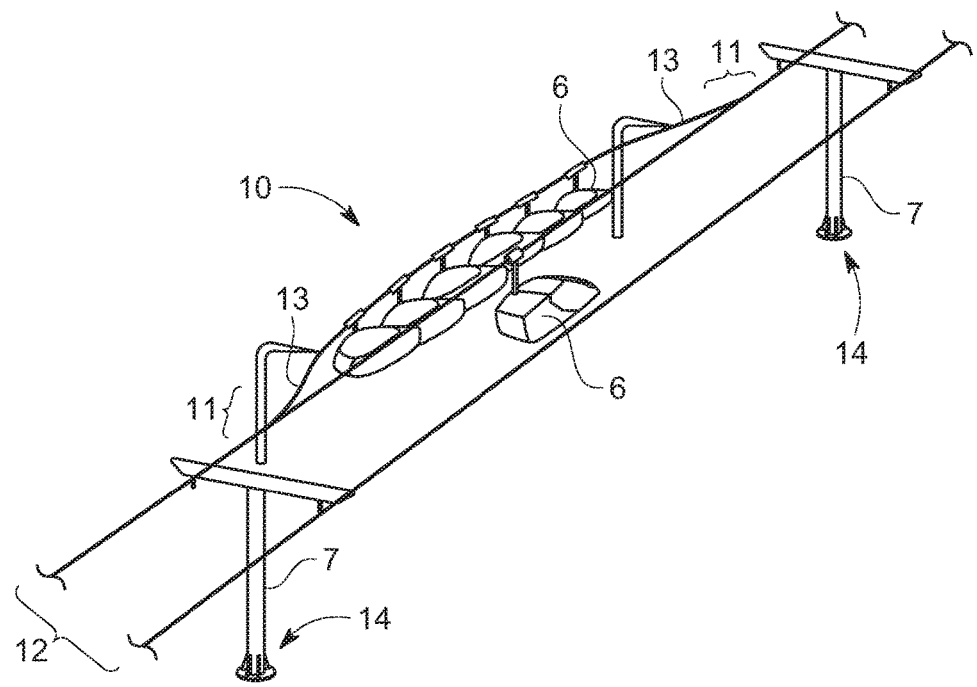
FIG. 2 illustrates a simple example of a siding and junctions where the siding is used to store pods awaiting users.

FIG. 2 illustrates a simple example of a siding 10 and junctions 11 where the siding 10 is used to store pods 6 awaiting users. The pods 6 are located in the siding 10 offset or distant to a main track 12 (cable or rail section). The siding 10 is offset about a horizontal plane from the main track 12. The siding 10 may be a rail section. The transition/junction may be rail to rail marked by arrow 13. The track 12 and siding 10 track section are held in an elevated position above a ground surface 14 by support members 7.

Trolley Directed Track Switching

One means of selectively transferring the pod between adjacent tracks may be to have supplementary support wheels located on the pod or pod trolley that are temporally engageable with the tracks. These support wheels may be configured to be engaged with the tracks at a time when transfer of the pod to an alternative track is commanded. A sequence of removing and realigning the primary guidance wheels with the adjacent tracks would occur prior to the wheels engaging. The primary wheels can then be engaged and the secondary support means disengage from the tracks before the adjacent tracks diverge beyond the reach of the transfer elements located with the pod. It will be appreciated that the sequence may be rearranged while still achieving the same outcome.

Figure 36:
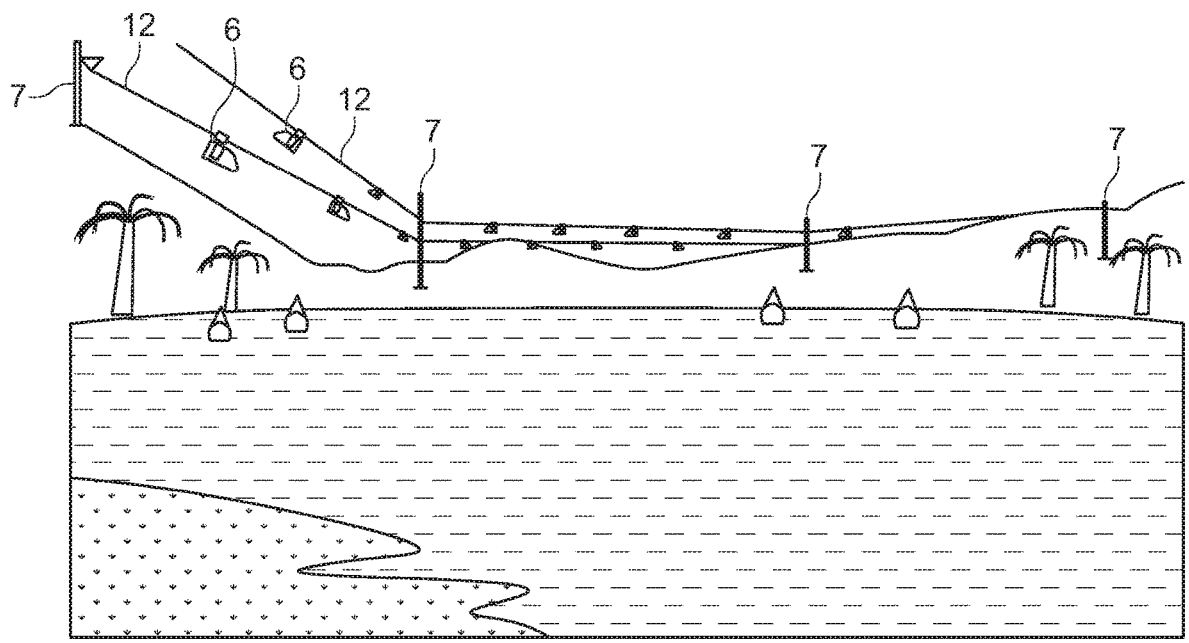
FIG. 36 illustrates how the pods may move over waterways and are not restricted in use necessarily to land like that of rail lines.
Figure 37:
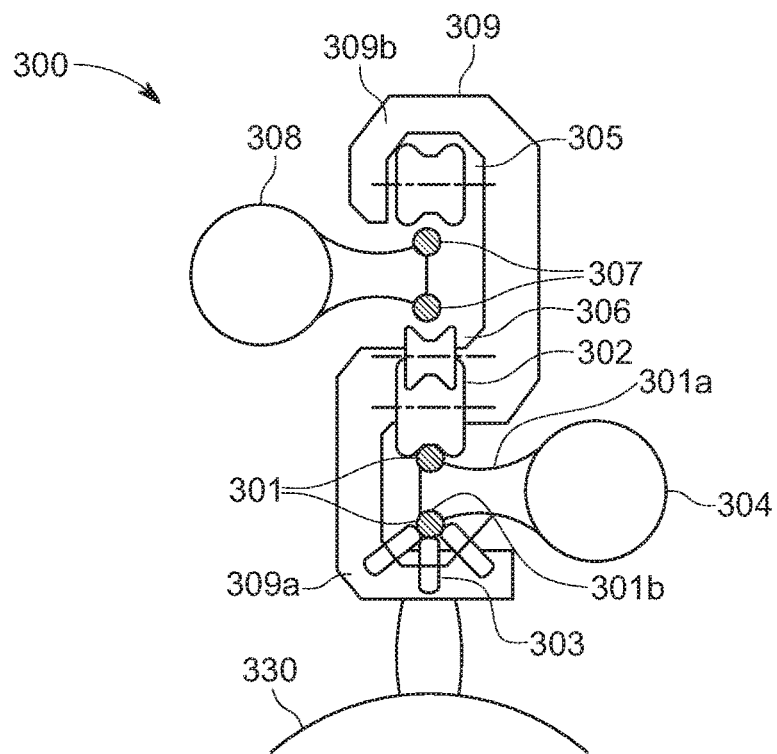
FIG. 37 illustrates an end on schematic view of a trolley cross-section about a junction transition in a normal mode.
Figure 38:
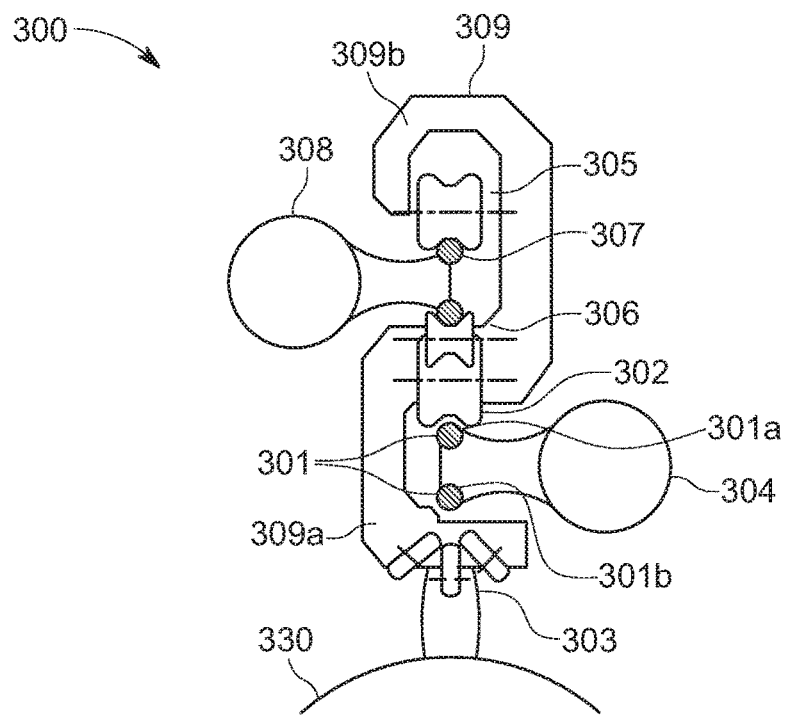
FIG. 38 illustrates an end on schematic view of a trolley cross-section about a junction transition in a switching mode.
Figure 39:
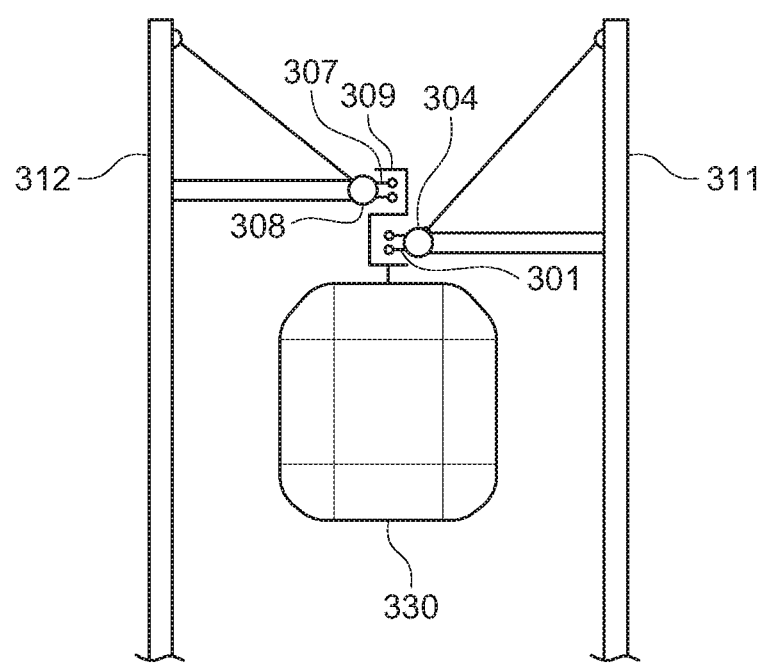
FIG. 39 illustrates an end on schematic view of a trolley cross-section about a junction transition illustrating a wider support structure.

FIG. 37, FIG. 38 and FIG. 39 show this switching embodiment in more detail. FIG. 36 shows a pod 330 trolley 300 supported by a main rail 301 on the transport system. The trolley 300 has a main wheel 302, and a set of jockey wheels 303, which support the trolley 300 on the main track 301. There is a second set of wheels termed hereafter as switching wheels, comprising a carrier wheel 305 and a guide wheel 306. When the trolley 300 is not undergoing any switching, the trolley 300 is supported by the main wheel 302 and the jockey wheels 303 connecting to the main rail(s) 301 comprising an upper rail 301a and a lower rail 301b. This arrangement is shown in FIG. 37. The main wheel 302 runs on the upper rail 301b and the jockey wheels 303 are guided by the lower rail 301b. There is a second set of rails 307 directly above the main rails 301 which are the switching rails 307. When the trolley 300 is not switching, the switching wheels 305, 306 have no contact to the switching track 307.

The trolley chassis 309 in the above embodiment may comprises two C shapes, the lower C-shape 309a open to the right, and the upper C-shape 309b directly above the lower C-shape 312 opens to the left. The main track 301 support 304 for the main rails 301 is to the right, and connects to the main rails 301 through the open section of the lower chassis C-shape 309a. The switching rail 307 support 308 for the switching rails 307 is to the left and connects to the switching rails 307 through the open section of the upper chassis 309b.

The main wheel 302 and the guide wheel 306 are fixed to the chassis 309. The carrier wheel 305 is able to move down, and the jockey wheel 303 assembly is also able to move down. FIG. 38 shows the switching state for the wheels. For switching to occur, the guide wheel 306 is driven down to contact the upper rail of the switching rails 307. Once contact has occurred it is driven further down, while simultaneously moving the jockey wheel 303 assembly down. This lifts the trolley chassis 309 relative to the track assemblies 301, 307, thus lifting the main wheel 302 clear of the upper rail 301a in the main rail assembly 301, and bringing the guide wheel 306 into contact with the lower rail in the switching rail assembly 307. A sensor (not shown) is activated when the wheels 305, 306, 302, 303 have moved to the switched state, thus informing a controller that it is safe for the pod 330 to continue through the switch.

The switch rails 307 start with a free end above the main track rails 301, and initially run parallel to the main track 301 rails. This allows the trolley 300 to transfer from one set of rails to the other with no change in direction. Additionally, because the switching wheels 305 and 306 are vertically in line with the main wheel 302 there is no change in the location of the track support relative to the centre of gravity of the pod 330 during switching and no tendency for the pod 330 to swing. With the trolley 300 established on the switching rails 307 (FIG. 38), and the main 302 and jockey wheels 303 now clear of the main rails 301 the trolley 300 then follows the switching rails 307 as they diverge from the main rails 301 to enter a station, or transfer to another rail network. If there is no switching to occur then the carrier wheel 305 does not move, and the trolley remains on the main rails 301. The carrier wheel 305 and the guide wheel 306 are both clear of the switching rail 307, and pass over them as the switching rail 307 diverges from the main track 301.

The main track support 304 and the switching track support 308 may themselves be supported by some structure 311, 312 which is far enough away from the track to allow the pod 330 to fit between the structures 311, 312 (FIG. 39)

Track Movement Causing Switching

In a second aspect, there is provided a suspended trolley and track system comprising:

a track with at least one controllable junction between a first track section on a first side of the junction and two or more second track sections on a second side of the junction;

a trolley having a body and wheels, the trolley being configured to ride on the track and to carry a suspended load;

a junction controller configured to control the at least one controllable junction to connect the first track section with a selected one of the two or more second track sections, such that the trolley entering the junction will travel between the first track section and the selected second track section.

The system may include two or more first track sections, the junction controller further configured to control the at least one controllable junction either of the first track sections with either of the second track sections.

The at least one controllable junction may include a movable rigid track section.

The at least one controllable junction may include a plurality of movable rigid track sections.

The at least one controllable junction may include a rigid junction body including a plurality of rigid track sections, the rigid junction body being moveable between a plurality of positions in each of which one of the rigid track sections connects the entry track section to a different one of the two or more exit track sections.

The rigid junction body may be mounted for linear movement between the plurality of positions.

The rigid junction body may be mounted for rotational movement between the plurality of positions.

The at least one controllable junction may include a rigid track section that is moveable between a plurality of positions in each of which the rigid track section connects the entry track section to a different one of the two or more exit track sections.

The rigid track section may be mounted for rotational movement between the plurality of positions.

Each end of the rigid track section may include a first element that is configured to engage with a cooperating second element on an end of the entry track section or one of the exit track sections. The first and second elements may cooperate to support the rigid track section. The first and second elements may cooperate to align the rigid track section.

The system may include a latch mechanism configured to lock the controllable junction.

Figure 23:
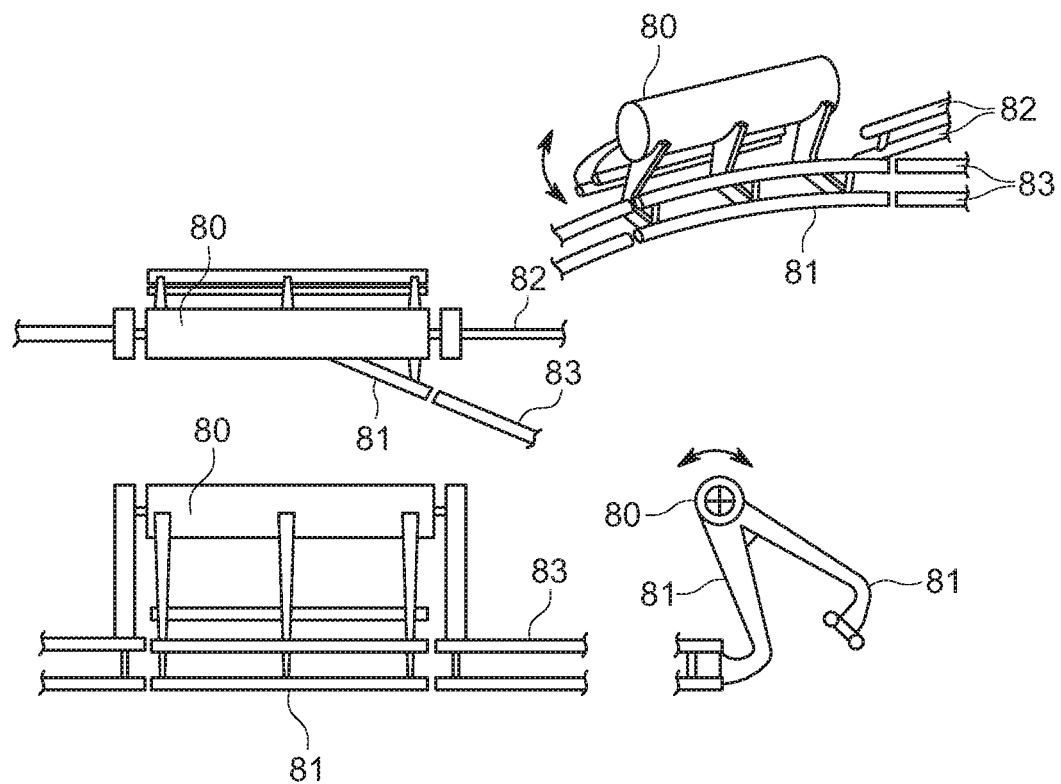
FIG. 23 illustrates a rotating rail section that moves a trolley (not shown) directing portion of the rail between further rail section or another rail section.
Figure 24:
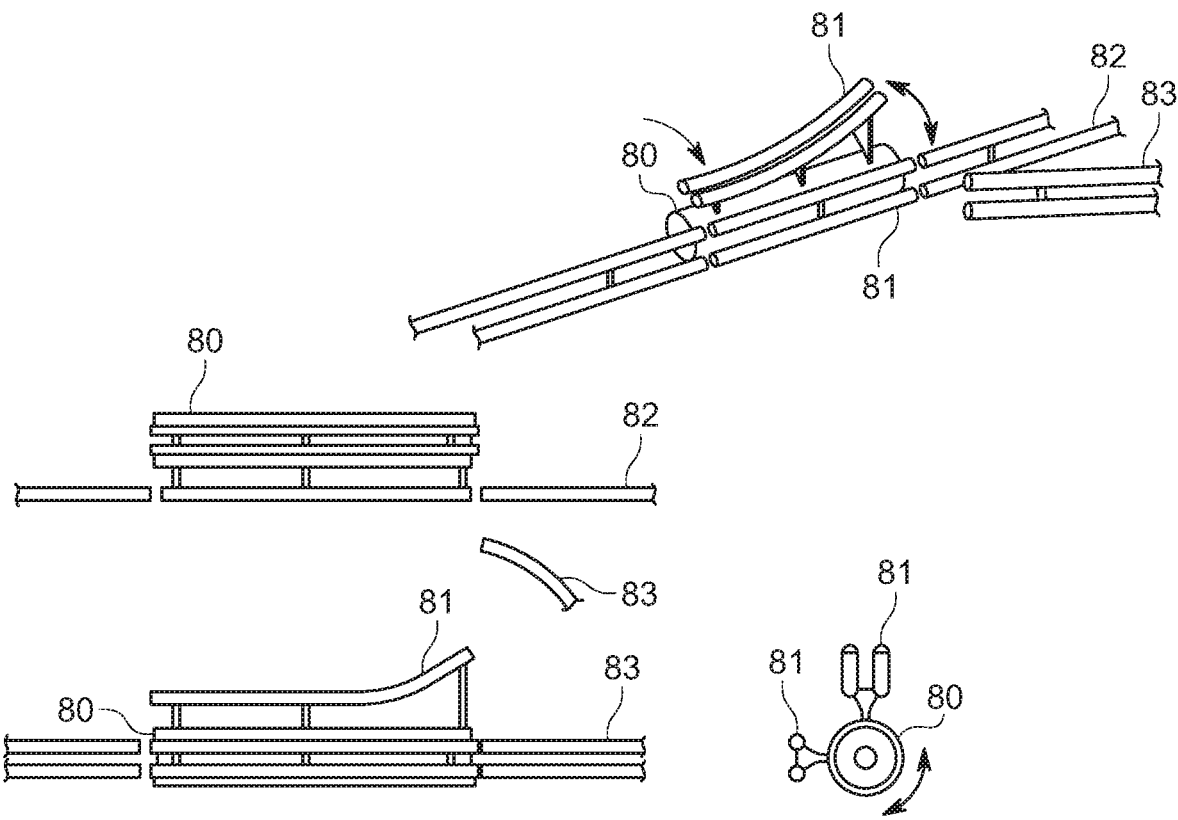
FIG. 24 illustrates a 90-degree rotating rail section that moves a trolley-directing portion of the rail between further rail section or another rail section.
Figure 25:
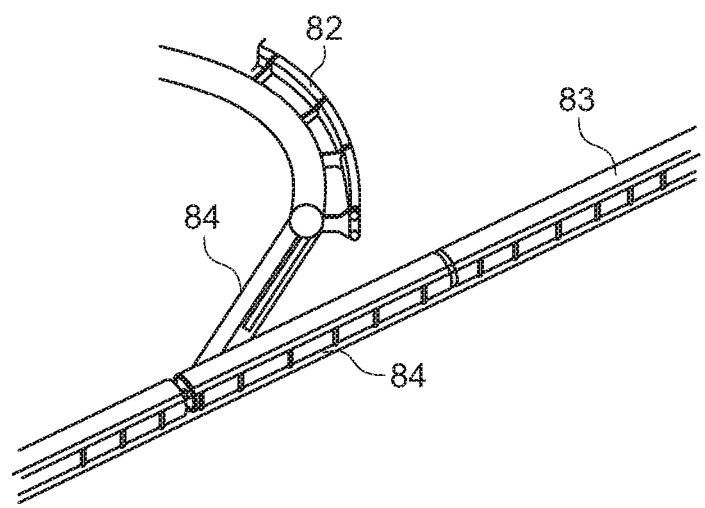
FIG. 25 illustrates a perspective view of a pivoting rail section that moves a trolley between one further rail section and another rail section.
Figure 26:
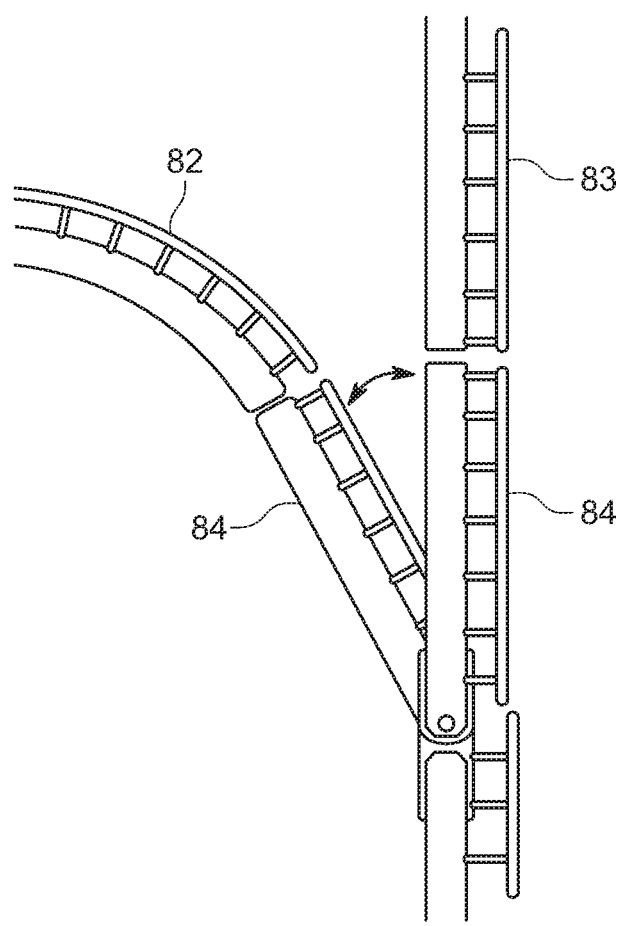
FIG. 26 illustrates a plan view of a pivoting rail section that moves a trolley between one further rail section and another rail section.

FIGS. 23, 24, 25 and 26 schematically illustrate track switching embodiments. FIG. 23 illustrates a rotating rail section 80 that moves a trolley (not shown) directing portion of the rail 81 between further rail section 82 or another rail section 83. FIG. 24 illustrates a 90-degree rotating rail section 80 that moves a trolley (not shown) directing portion of the rail 81 between further rail section 82 or another rail section 83. FIG. 25 and FIG. 26 shows a pivoting rail section 84 that moves a trolley (not shown) between further rail section 82 and another rail section 83.

FIGS. 46 to 55 show a specific track switching system 1 arranged for use with a suspended trolley.

Figure 46:
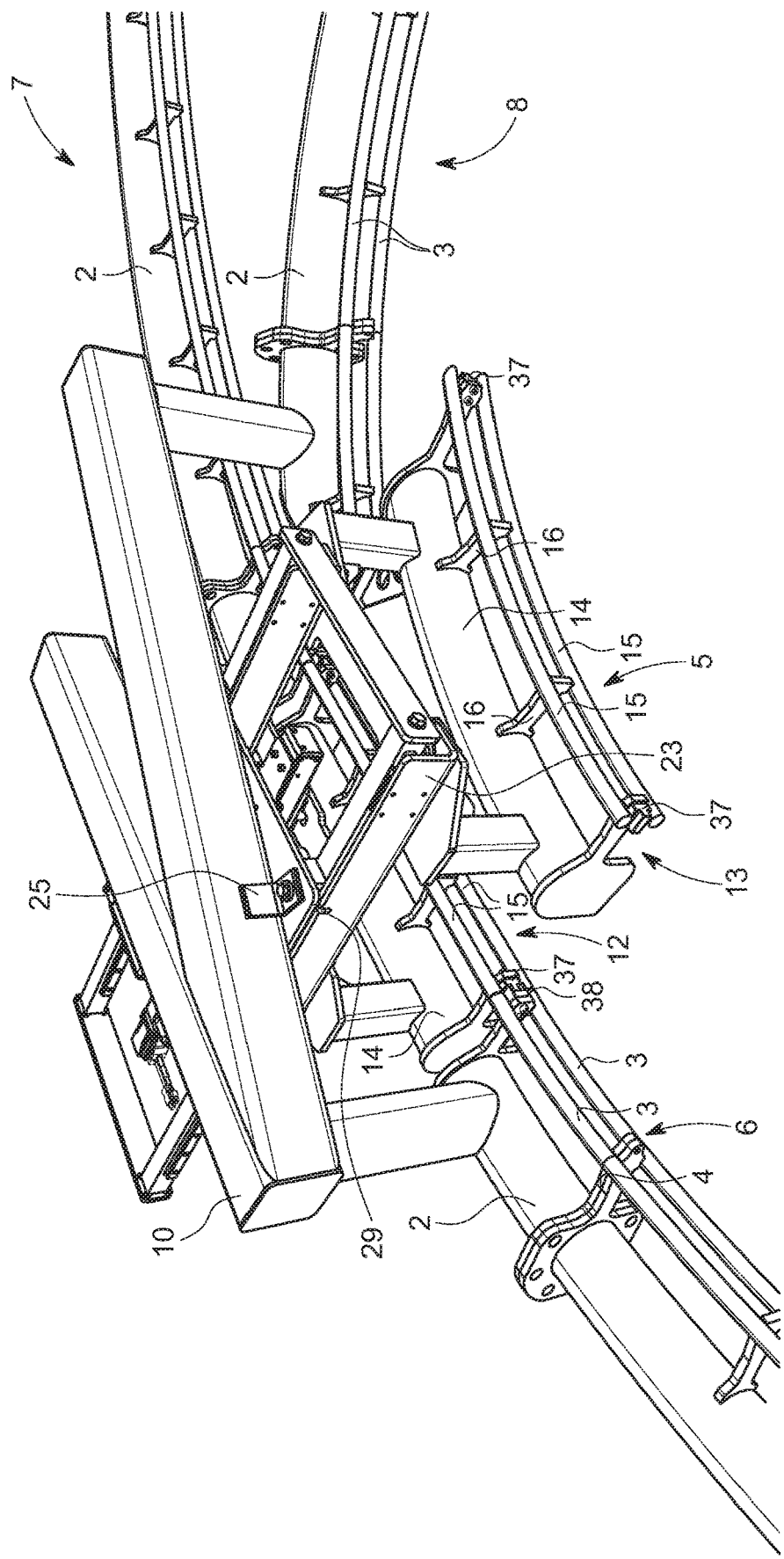
FIG. 46 illustrates a junction according to one embodiment, in a first position.
Figure 47:
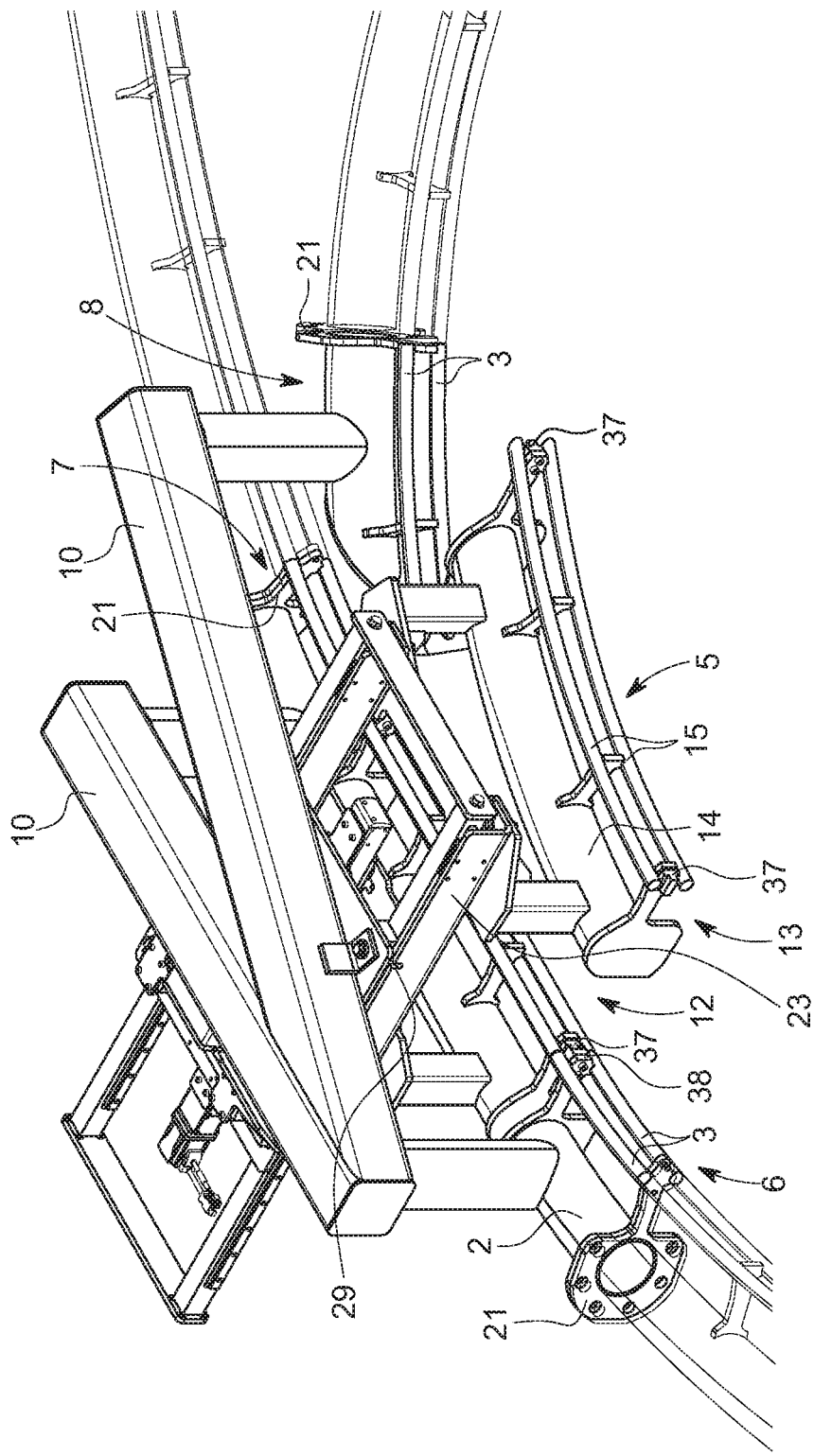
FIG. 47 is a further view of the junction of FIG. 46.
Figure 48:
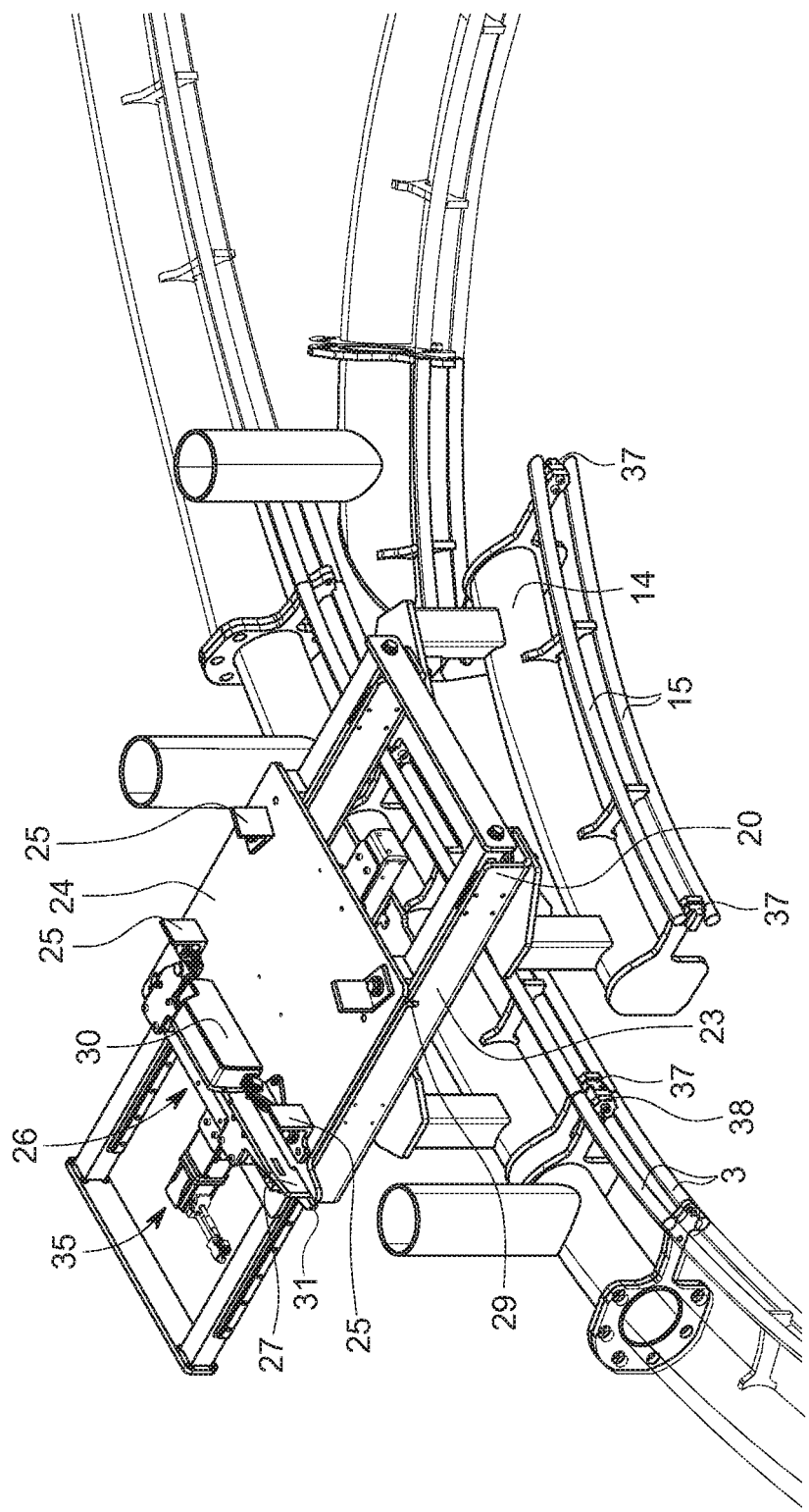
FIG. 48 is a further view of the junction of FIG. 46, excluding the junction support to show further features of the junction.
Figure 49:
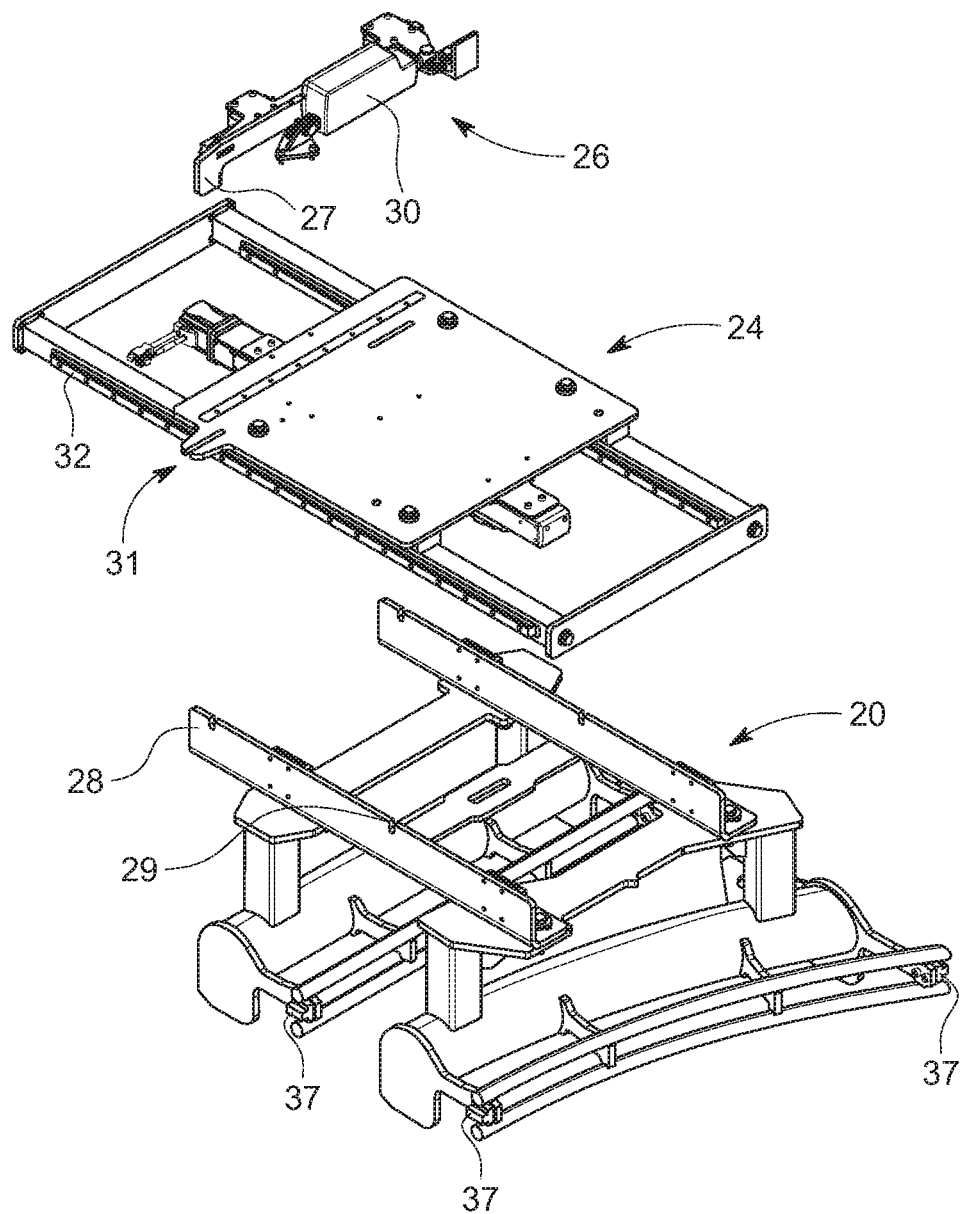
FIG. 49 is an exploded view of some components of the junction of FIG. 46.
Figure 50:
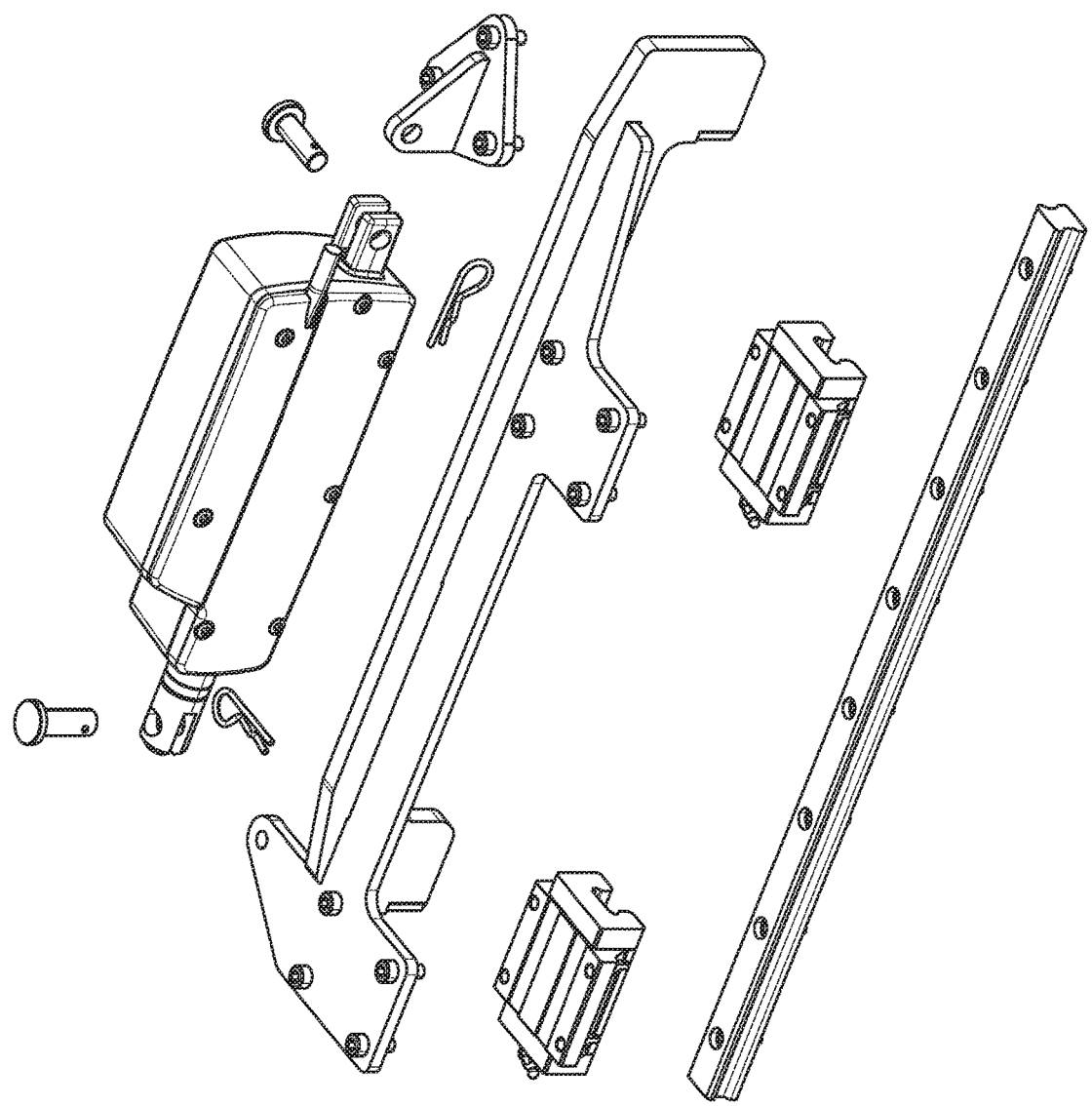
FIG. 50 is an exploded view of further components of the junction of FIG. 46.
Figure 51:
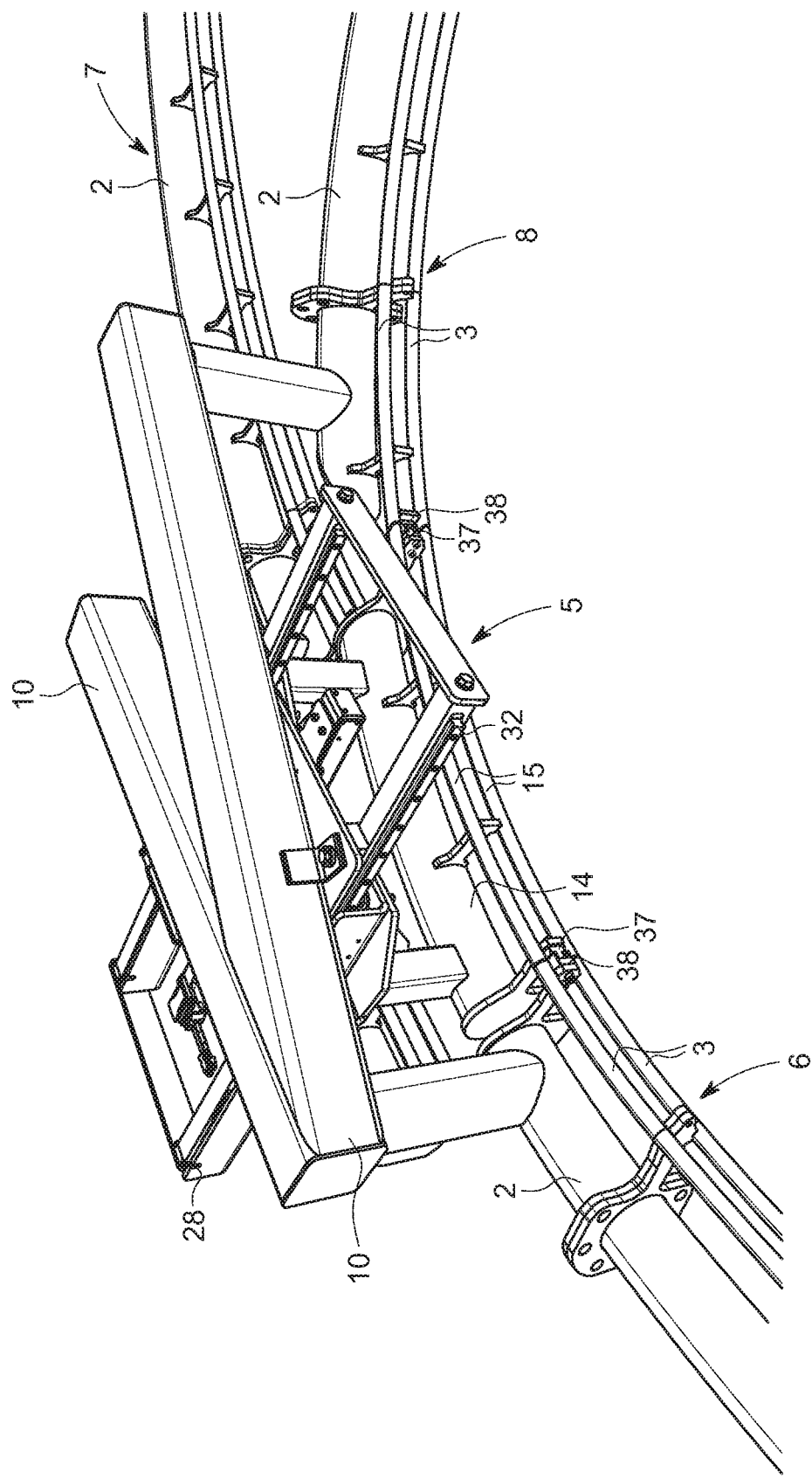
FIG. 51 illustrates the junction of FIG. 46, in a second position.
Figure 52:
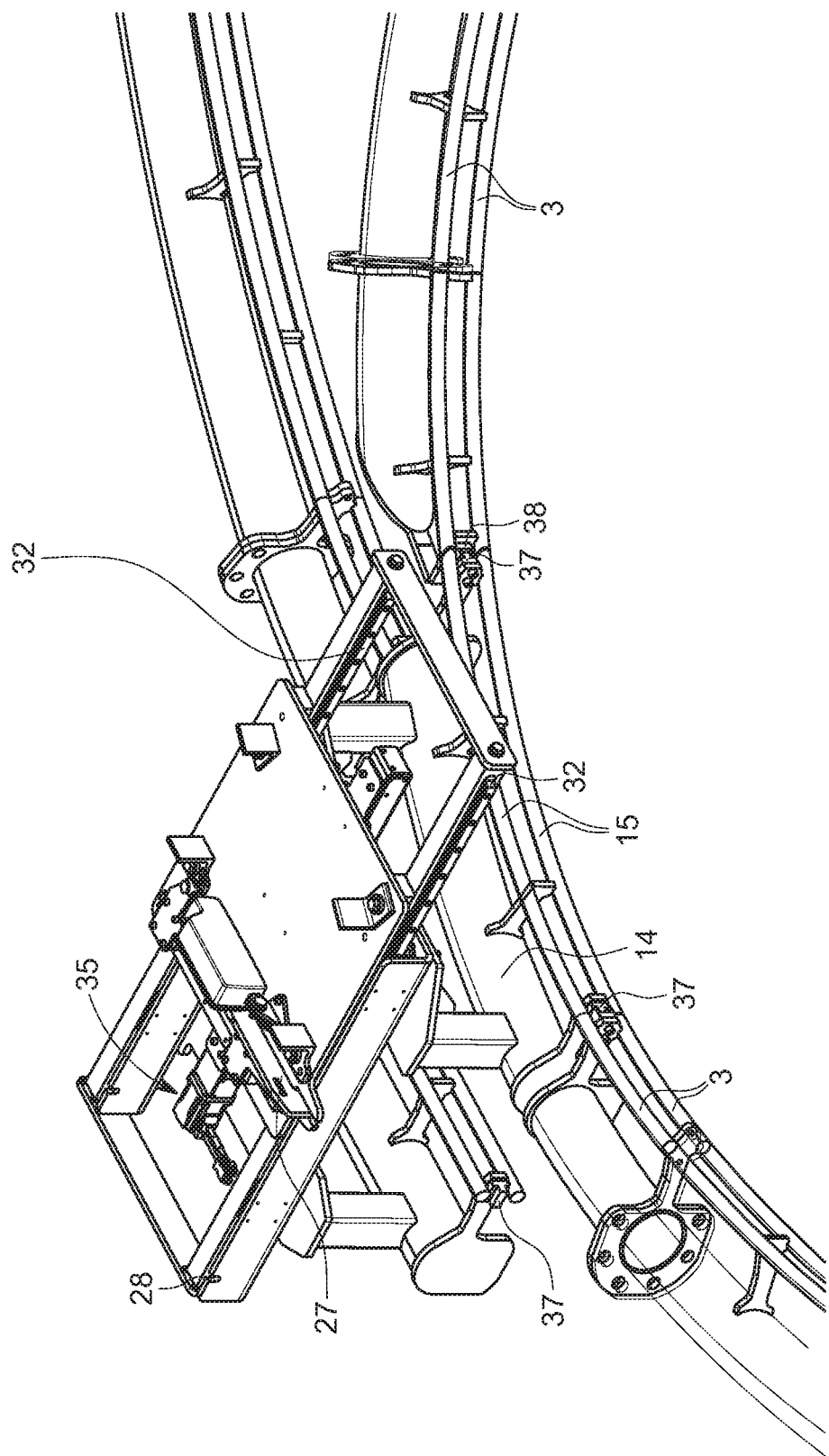
FIG. 52 is a similar view to FIG. 51, excluding the junction support to show further features of the junction.

FIGS. 46 to 48 show the junction in a first position in which an entry track is connected to a first exit track. FIGS. 51 to 52 show the junction in a second position in which the entry track is connected to a second exit track. FIGS. 49 and 50 are exploded views of certain components of the junction.

The track system may generally include a support rail 2 and one or more tracks 3. In the embodiment shown the track system may include a pair of tracks 3 positioned one above the other, to engage rollers or wheels on a suitable trolley. However, the skilled reader will understand that various other configurations of track may be possible.

The tracks 3 may be mounted to the support rail 2 by suitable mounting brackets 4.

FIG. 46 shows a junction 5 connecting an entry track section 6 to first and second exit track sections 7, 8. The entry and exit tracks are described in this way for ease of reference. However, the skilled reader will understand that the junction could equally function as connecting two entry sections 7, 8 to a common exit section 6. Such variations are intended to fall within the claim language. Further, variations may be possible in which two or more entry sections are selectably connected by a junction to two or more exit sections.

A junction support 10 may be attached to support rails 2 of the track sections 6, 7, 8 and may support the junction 5, which is moveable relative to the junction support 10 and track sections 6, 7, 8 as will become clear.

In the embodiment shown, the junction 5 may include a first junction section 12 and a second junction section 13. In the position of FIG. 46, the first junction section 12 is positioned between the entry track section 6 and one 7 of the exit track sections. A trolley arriving at the junction 5 on the entry track section 6 will travel through the junction and continue on the exit track section 7 that is selected by the junction position.

The junction sections 12, 13 may each include a support rail 14 supporting junction track sections 15 via mounting elements or brackets 16. The junction sections may be mounted on a junction body 20 which is arranged to move so as to bring the selected junction section into position. The junction sections and junction body may be rigid.

FIG. 47 shows how the junction may be arranged for connection into the track system. The entry and exit tracks 6, 7, 8 may each be fitted with a connector 21 that is configured to connect to the ends of further track sections. The connector 21 may be a suitable flange arranged to receive bolts or other fasteners, or any other suitable connectors may be used. As the entry and exit track sections 6, 7, 8 and the junction section 5 are all mounted to the junction support 10, the junction shown in FIG. 47 may be conveniently pre-assembled and installed as a single unit.

FIG. 48 is a view similar to that of FIG. 47, from which the junction support 10 has been excluded in order to show the detail of the junction body and junction movement. The junction sections 12, 13 are mounted to a frame or carriage 23, which is mounted for sliding movement relative to a fixed junction frame 24 that is attached to the junction support 10 (e.g. by brackets 25).

A latching mechanism 26 may be mounted on the junction frame 24 (FIGS. 48 to 51). The latching mechanism 26 may include a latch member or arm 27 that is moveable between the latched position shown in FIG. 48 (in which the latch member 27 engages with a latch engagement feature such as a notch or slot 28) an unengaged, unlatched or retracted position in which the junction body 20 is able to move relative to the junction frame 24 and a further latched position shown in FIG. 51 (in which the latch member 27 engages with a further latch engagement feature such as a notch or slot 29). The latching mechanism therefore acts to restrict movement of the junction body in positions where one of the junction track sections 12, 13 is aligned with the entry and exit track sections. The latching mechanism may be actuated by an actuator 30. The latching member 27 may be further supported by a suitable slot 31 and/or other support features on the junction frame. Other latching mechanisms may occur to the skilled reader.

FIGS. 51 and 52 show the junction body 20 having moved such that the second junction track section 13 is now in line with the entry track section 6 and the second exit track section 8. Comparison between FIGS. 48 and 52 shows the movement of the carriage body 20 relative to the carriage frame 24. This comparison also shows the engagement of the latching member 27 in the different slots 28, 29. The carriage body may move along suitable rails 32 on the carriage frame 24.

Movement of the carriage body may be driven by any suitable actuator.

The junction track sections 12, 13 and the entry and exit track sections 6, 7, 8, may also include cooperating elements configured to assist in accurate alignment of the track through the junction and support of the moving junction track sections. FIG. 46 shows a first cooperating element 37 (such as a support element, engagement element or alignment element) at each end of each junction track section 12, 13. These first cooperating elements 37 engage with second cooperating elements 38 on the entry and/or exit track sections 6, 7, 8. In the embodiment shown the first cooperating elements 37 have a generally T-shaped profile to slide into a slotted second cooperating element 38.

Figure 53:
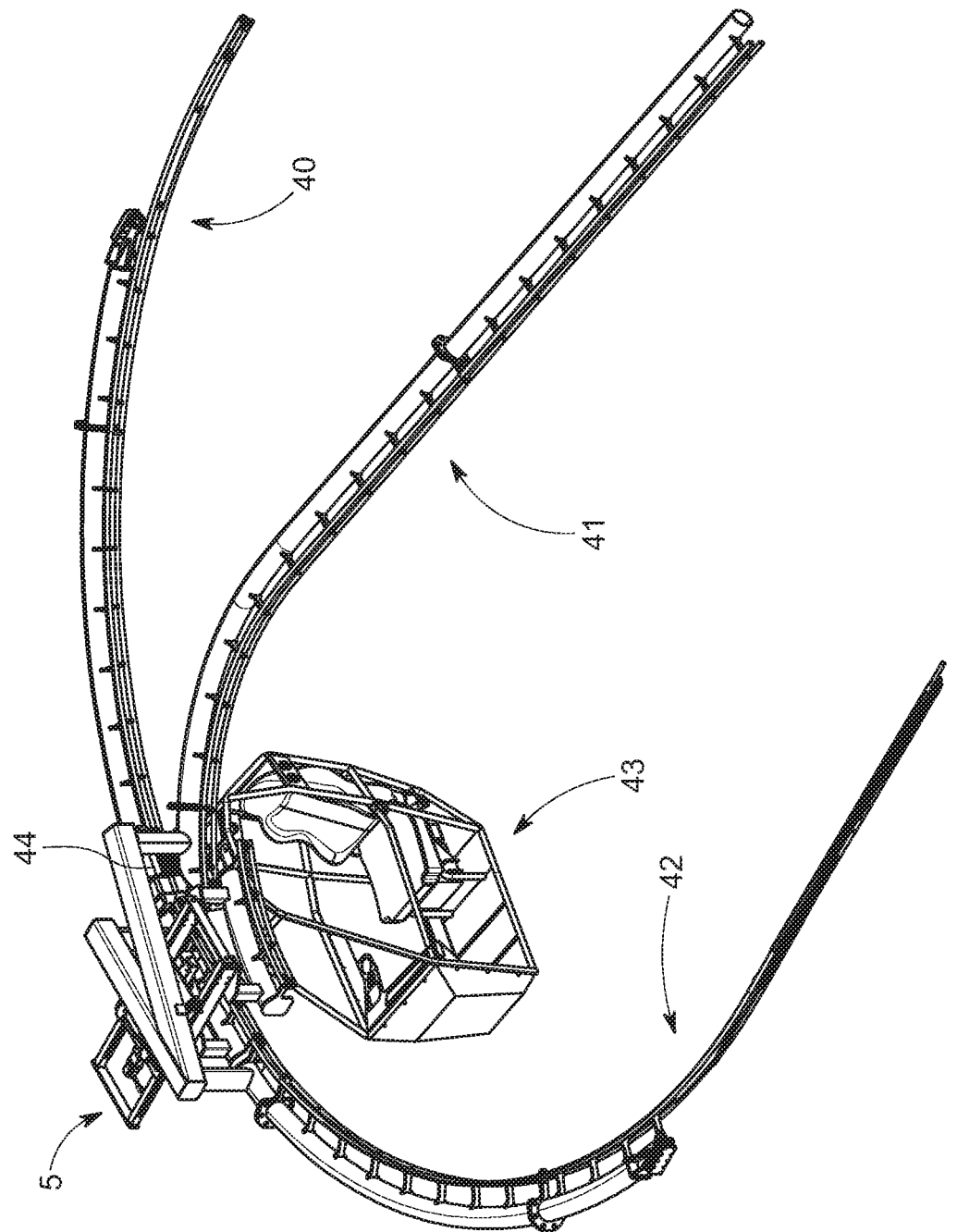
FIG. 53 illustrates part of an amusement ride system according to one embodiment, as a trolley enters a junction.
Figure 54:
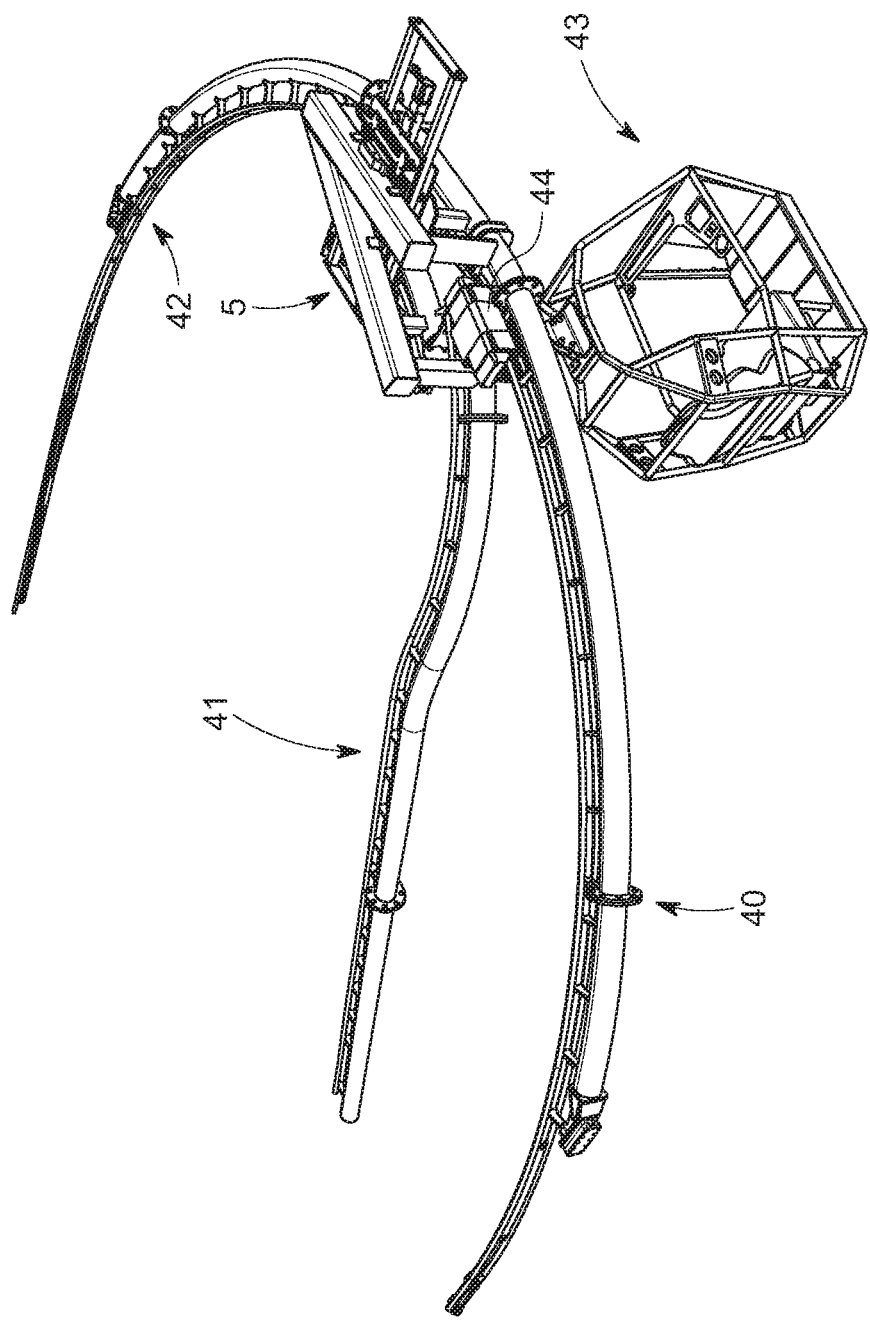
FIG. 54 is a further view of the system of FIG. 53.
Figure 55:
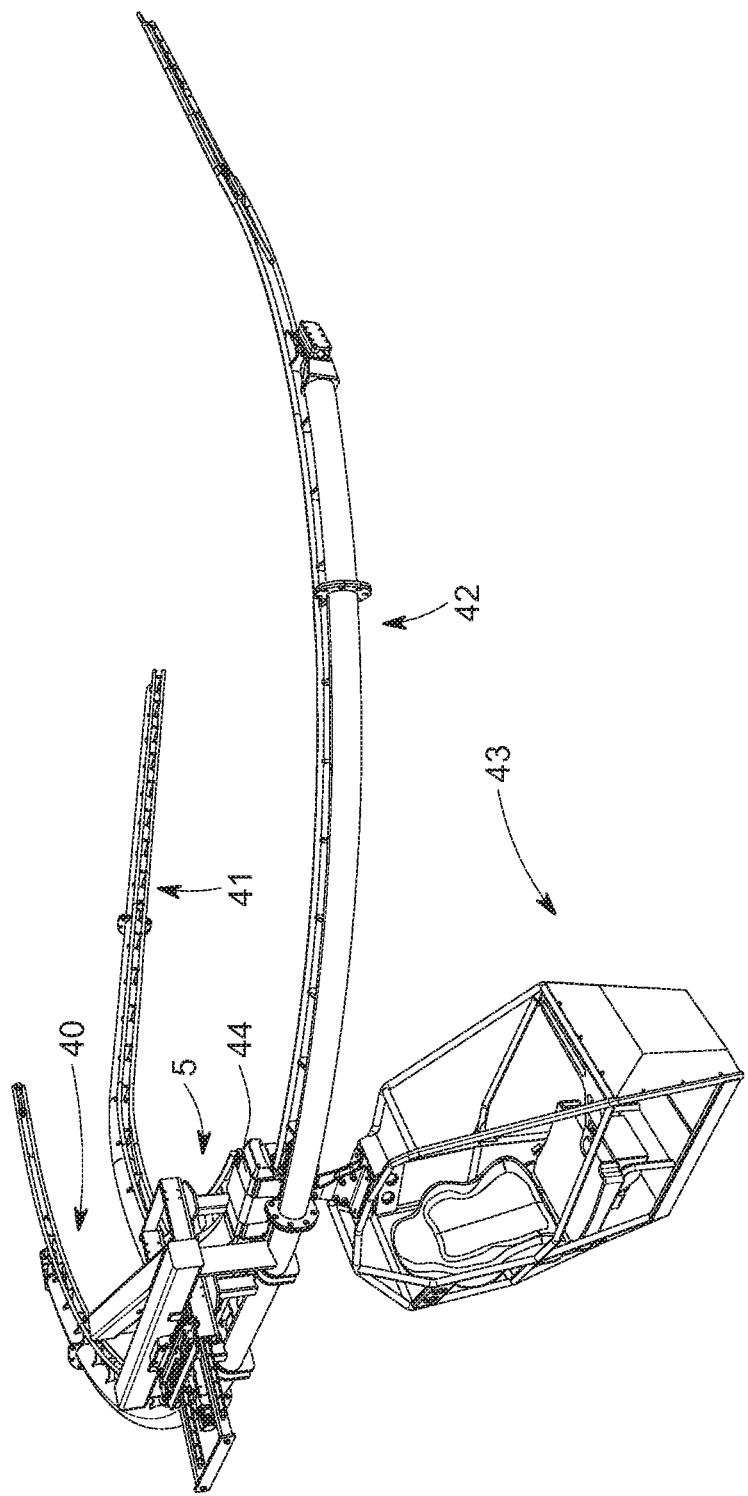
FIG. 55 is a further view of the system of FIG. 53, showing the trolley exiting the junction.

FIGS. 53 to 55 shows an amusement ride system, in which a junction 5 is positioned between two tracks 40, 41 on one side of the junction 5 and a single track 42 on the other side of the junction 5. A trolley carrying a suspended chair or buggy 43 in which a rider may sit rides on the tracks. The trolley may for example be one of the trolleys described in the Applicant's patent application published as WO2019/098859.

FIGS. 53 and 54 show the trolley and buggy approaching the junction 5 along the track 40. The junction is adjusted to connect the track 40 to track 42. The trolley and buggy therefore pass through the junction and exit along track 42, as shown in FIG. 55. The junction 5 may be controlled to connect track 41 to track 42. Further, trolleys may travel in either direction through the junction. That is, trolleys may travel from track 40 or 41 to track 42, or from track 42 to track 40 or 41.

The junction may be incorporated in a wider transport system. The system may include sections of track, cable, rail etc, as disclosed in the Applicant's patent application published as WO2019/098859.

The junction may be used in transport systems for amusement rides. The junction may also be used in transport systems for transport of goods or people. The trolleys may move through the junction solely under gravity, or may be powered or forced in any other suitable manner.

Although described above with reference to a carriage body that is mounted for linear movement to bring one of the junction track sections into alignment with the entry and exit tracks, the junction may be varied. For example, the junction may use a rotating track section that is always attached to an entry track section and rotates to connect that track section to a selected exit track. A plurality of junction track sections may be mounted on a rotating carousel or other rotating junction body.

Figure 58:
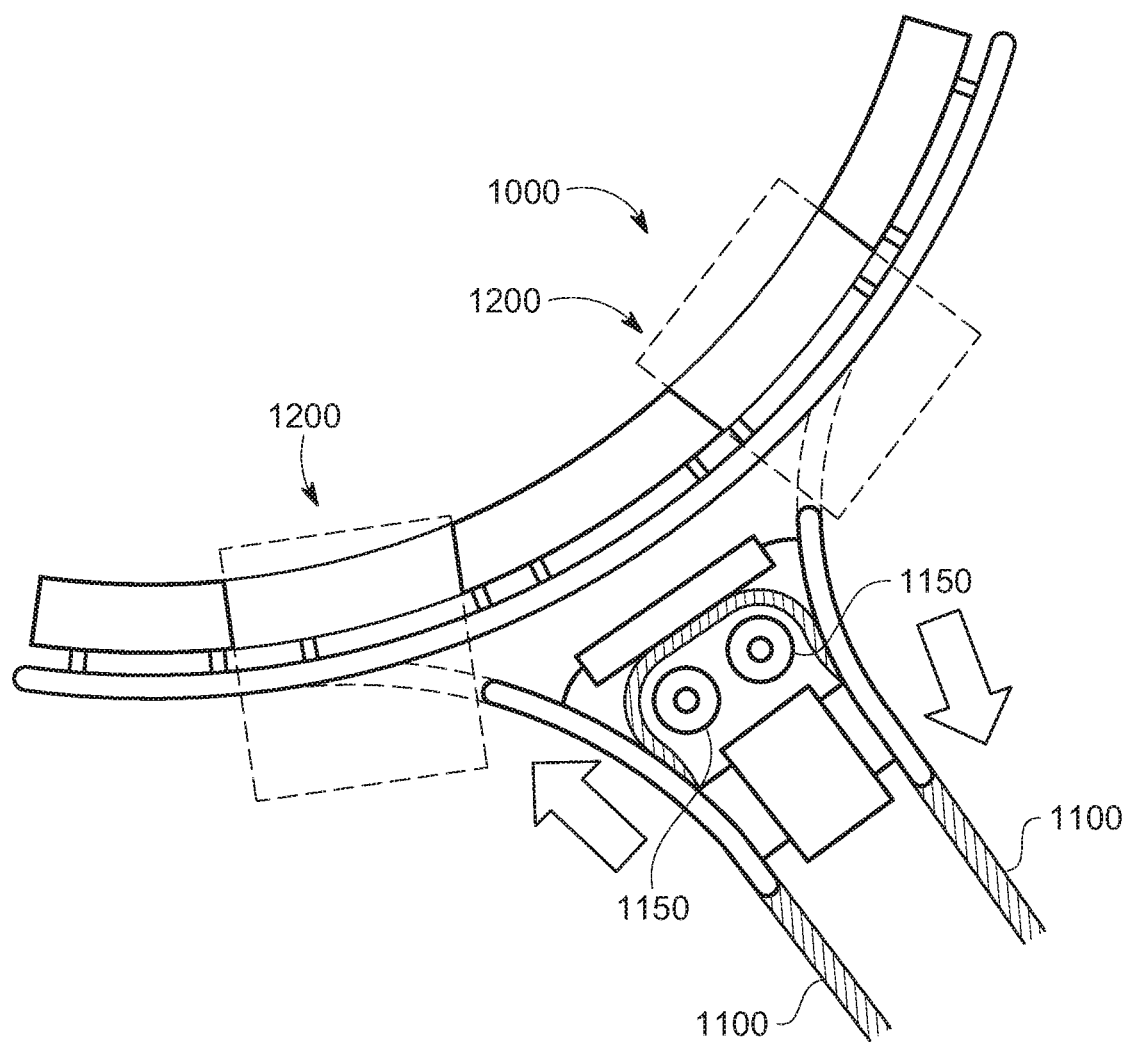
FIG. 58 illustrates a detail view of further embodiment of a rail to cable or cable to rail junction.

FIG. 58 illustrates a yet further rail and cable junction or transition. In this embodiment, the junction comprises a curved rail section 1000 and a cable 1100, the cable 1100 looped about pulleys 1150 into a U-shape when viewed in FIG. 58 from above or below. The pulleys 1150 provide a degree of movement in the cable tension. Sections of rail 1200 on either side of the cable 1100 ends may move to switch the movement path of a pod on the track 1000 from the rail 1000 to a cable 1100 or cable 1100 to rail 1000 about the sections of rail 1200 that move to direct the pod (not shown). In the Figure, the solid lines indicate a first rail position for the sections of rail 1200 and the dashed line portions indicate the sections of rail 1200 moved to a cable 1100 directing position. The moving rail sections 1200 may also stay in place in which case a pod or trolley on the rail 1000 would be directed around the rail 1000 curve and not transition to the cable 1100.

Vertical and Horizontal Plane Track Switching

In a third aspect there is provided an object transport system comprising a support cable, or support cable and rail system, and an elevator means for selectively altering the vertical height of at least one part of the support cable or support cable and rail system; and/or, a translation means for selectively altering the horizontal position of at least one part of the cable, or rail and cable system.

As noted above, the object transport system may provide for one or more ends of a support cable or rail or both to be moved or displaced vertically and/or horizontally. This may be useful where there are several departure or alighting/landing locations which are to be serviced by the transport system. For example, the transport system may be used to move people or goods between buildings or other locations. More particularly, the start and/or end points may be changes to provide flexibility in use of the transport system.

In one embodiment the transport system provides elevator and translation systems that in combination provide the ability to change the position or location of a cable attachment point vertically and/or horizontally.

Further disclosed is a transport system comprising a cable and trolley, wherein a cable is attached to at each end to a corresponding elevator or translator means to allow for the heights of each end of the cable to be adjusted. In one embodiment, the end of the cable closest to the position of the trolley can be lifted higher that the end of the cable furthest from the trolley to allow the trolley to move towards the lower end of the cable under the influence of gravity. Lifting or lowering of the cable may be performed when a vehicle is traversing the cable or track, or to move a vehicle up or down, or side to side when a vehicle is stationary at an end of the cable or track. For example, in the manner of an elevator moving between floors, or to move laterally across a space without the vehicle moving along the cable or track.

Disclosed is a transport system comprising a cable and trolley, wherein the cable is attached at least one end to an elevator or translator means which is movable vertically and horizontally respectively. The elevator or translator means may each comprises a means of altering the length of the cable between the mounting points according to the embodiment employed.

In one embodiment an elevator system is provided where only vertical movement of the cable end(s) is required wherein the elevator system comprises a cable attachment means and a guide means to guide the cable attachment means substantially vertically. Specifically, the elevator moves the cable end or ends in a vertical plane. For example, the end of the cable may be raised or lowered to ensure that the longitudinal extent of the cable is sloped to allow a trolley to move along the cable under the influence of gravity.

The guide means may be for example a track, rail or cable or other support member to allow adjustment of the position of the elevator means.

In a further embodiment, the elevator system is provided with a drive means to move the cable attachment means along the guide means. The drive means is not intended to be limited to any particular form, however, electric motors and manually driven mechanisms are contemplated by the applicant.

The drive means may be an electric motor which could be attached directly to the cable attachment means. In other embodiments, the drive means may be indirectly attached to the cable attachment means via for example a cable or chain or some other mechanical linkage.

In a further embodiment, the location of the end point of the cable is moved laterally by the translation means where horizontal movement of the cable end(s) is required and wherein the translation means comprises a cable attachment means and a guide means to guide the cable attachment means substantially horizontally. For example, the end of the cable may be moved laterally from one position to another to relocate an entry or exit point of the transport system for a user.

In a further embodiment, the translation means may extend across the face of a structure.

In a further embodiment, the translation means may extend across and around (partially or entirely) the circumference or outer face(s) of a structure. For example, a structure such as a building, a tree, a rock face, a mountain, the inner structure of a commercial warehouse, or any structure where this transport system may be applied.

The guide means may be for example a track, rail or cable or other support member to allow adjustment of the position of the translator means.

In a further embodiment, the translator system is provided with a drive means to move the cable attachment means along the guide means. The drive means is not intended to be limited to any particular form, however, electric motors and manually driven mechanisms are contemplated by the applicant.

The drive means may be an electric motor which could be attached directly to the cable attachment means. In other embodiments, the drive means may be indirectly attached to the cable attachment means via for example a cable or chain or some other mechanical linkage. Other drive means may include a wheel element directly or indirectly connected to a motive power source. Transmission of drive in this case is achieved by a friction contact between the wheel and cable or rail. Other mechanical linkages may include gear systems, crank and rod elements, turbine systems, hydraulic fluid power systems, and friction drive systems.

Auto Tensioning and Cable Length Adjustment

In a fourth aspect, there is provided an object transport system comprising a cable and trolley along with a cable management means to adjust the length of cable and/or the tension of the cable automatically.

The cable management means may use input from sensors to identify the tension, slope, and vibration of the cable and system in use thereof. The cable management means may provide a control over the cable length (via a cable winding means for example) in response to inputs derived from the sensor systems.

In one embodiment the cable management means may be a cable winding means to adjust the length and/or tension of the cable. Adjustment may be between two cable attachment points. Adjustment may be automatic. This may be completed to maintain enough tension in a cable catenary to support and control the trajectory of the vehicle traversing the length of the cable. The cable winding means may provide for control of cable catenary while providing freedom to the move the location of at least one end of the cable. That is, that the at least one cable end could be moved to different locations that result in an increase or decrease in the spacing between these points, and change in height between start and end locations, and the cable winding means adjusts the cable length in response to provide a desirable catenary behaviour.

In another embodiment a cable management means optionally includes a cable receiving drum. The cable management means may further comprise a winding motor to control rotation of the cable receiving drum. Note that it may be possible to tension cable without using a drum to act as the cable reservoir, particularly where there may be no need to spool many metres of cable on and off of a drum to adjust the cable tension and/or catenary. For example, this may be the case where the cable spans are relatively short and tensioning may be achieved by displacing the cable end or cable anchor-point by a few metres. Non-drum options may include a pulley system or linear rail and moving mount on the rail that draws cable back and forth along the rail to change the cable tension.

Figure 56:
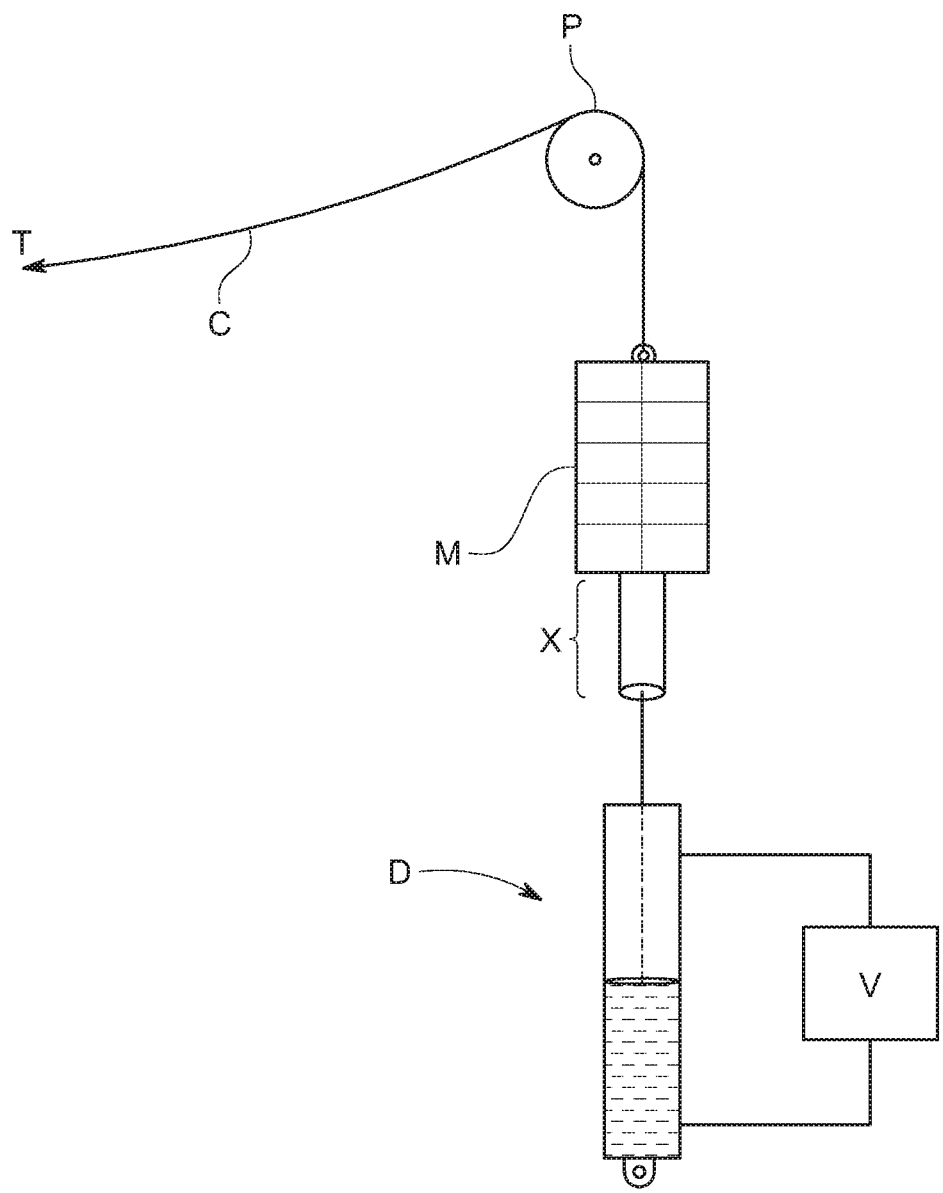
FIG. 56 illustrates a schematic view of a counter weight cable management means.

One further embodiment of a cable management means uses auto-tensioning and is shown in FIG. 56. In this embodiment, the auto-tensioning is provided by a counterweight labelled "M" in the example, on a vertical guide rail, the cable C moving over a pulley P that acts to maintain tension in the cable C at tension "T" where T=Mg where g=gravity. If the cable C heats up and expands, mass M lowers and vice versa when the cable C cools. This may avoid under or over tension due to ambient temperatures.

When a vehicle such as a pod (not shown) drives onto the cable C, the catenary of the cable C may adjust automatically to maintain tension T by movement of the counterweight M until an equilibrium tension is reached.

To prevent a resonant "bouncing" effect when a vehicle/pod moves onto the auto-tensioned cable from a neighbouring track section, at least one damping device (D in FIG. 56) may be added to the cable C management means to dampen to rate of change in cable C tension. The damping device D may be a hydraulic cylinder and this may be included about the counterweight (or winding means or motor or drum noted above) to stabilise cable tension. In the embodiment shown in FIG. 56, these dampers D may be rotary dampers fitted into a spool of cable that maintain a retraction tension but present a resistance when extended that is proportional to the extension speed. A control valve V may be included for passive or active damping options. Use of the cable C allows the counterweight M to move a significant distance up and down a support tower (not shown) if used. The length of cable marked by arrow X between the counterweight M and the damper D may be adjustable in length to optimise the set up.

Damping may also be achieved by movement of hydraulic oil, electromagnetic, eddy current or friction braking for example. Electronic control of the damping could further enhance performance by sensing real-time performance of the cables in various states of use or when not in use.

The auto-tensioning system may have several benefits including:

A reduction in the number of towers or support structures per unit distance; and A reduction in the distance of the towers or support structures from the ground.

For example, a reduced allowance may be required for temperature variations which can affect cable length and performance and thereby provides cost savings in manufacture and installation of the tower and support infrastructure.

Further:

Support towers and cables may not be exposed to large fluctuation in tension in use of the system which may reduce the causes of fatigue failures;

The stiffness of the cable at the point of transition to the structure may be maximised, and The corresponding local deflection may be minimised and more consistent (allowing for the transition to be designed to flex and accommodate the entry angle)

The introduction of auto-tensioning and cable management in the above embodiments allows the ability for the cable to extend during an overload event, and as a result, reduces the likelihood of cable or tower damage and hence the wider network is protected.

The cable could be locally pushed sideways or down to ground level without causing increased cable tensions or large side loads on the towers;

The addition of damping to the tensioning system may reduce bounce of the vehicle on the cable. "Smart" damping could be achieved with a hydraulic system to better match the system damping to the input frequency.

Addition of a driven tension adjustment system (e.g. hydraulic) could allow for the target tension to be adjusted to avoid resonant frequencies that may be caused by wind conditions.

Junctions and Hubs

In a fifth aspect there is provided a junction or hub means which provides means for switching the vehicle from one track or cable onto another track or cable, and optionally allows for changes in direction of the vehicle.

In a further embodiment there is provided a transition means to provide transition of cable to rails where the cable end or ends are relocatable. Further to this, where a cable end is relocatable, it may be desired to have a means of connecting a cable or cable end to different rail elements by positioning the cable end in the proximity of a selected rail and providing a means of transitioning from the cable to the selected rail.

Disclosed is a switching means (or junction or hub) which provides for a vehicle to transition between a cable or cable end and an individual rail element, while allowing for the cable end to be relocated to connect with other rail elements (independent of each other and the first rail element) without the need to reconstruct or disassemble the system elements and relocate the cable end and/or rail element. The switching means or hub allow preferably provides a trolley through the hub without stopping and for the trolley to change direction of travel. More preferably to allow for repositioning of the cable end from a first rail element to a second rail element on the switching means or hub.

In other words, the switching means provides a means for a vehicle to move between cable and rail and for the choice of rail direction to be changed, and further or optionally provide the ability to move the cable end from one transition element to another.

The transition element may be attached to the cable, be located about the cable, or be located adjacent to the cable, the particular embodiment of which is specific the overall design of a cable and cable-rail layout.

In one embodiment, the cable is located within the elongate body of the transition element for substantially the entire duration that a vehicle or trolley transitions between a cable and rail. The transition element being constrained by the cable maintains approximately axial alignment with the cable at all times. The translation element is approximately fixed relative to the end position of the cable such that when the cable end is relocated, the transition element moves in synchronisation with the overall motion of cable end. That is, the transition element moves around with the cable end such that they are fixed relative to each other. Means of relocating cable ends is disclosed elsewhere in this specification.

In a further embodiment there may be provided a length or section of rigid rail located adjacent to and movable with the transition element such that a trolley may be moved clear of the transition element and cable by rolling onto and optionally slowing or stopping on the length or section of rail. The rigid rail section could then be configured, for example by rotating, to align with a further rail such that the alignment of the two rail elements provides an uninhibited path for the trolley to move from one to the other rail elements.

It will be appreciated that the translatable cable/transition element/rail section may be moved such that it can be aligned to any one rail or separate rail systems in an array of separate rail systems. The configuration of the junction described above allows movement of a trolley between a plurality of separate rail systems while providing the option of minimising the number of connected cables. That is, it is contemplated that a single cable could transition to a plurality of separate rail sections each of which extends in a different direction from the other and thus providing a multi-vector junction. Each rail may optionally reconnect to a separate cable and/or continue as a rail. Further, a rail may be used to change the direction horizontally and/or vertically of a vehicle traversing the rail.

It will also be appreciated that the junction may provide the desired re-direction function without being constrained to use of a rail element. Other types of elements may be used in conjunction with the junction with the same functional outcome.

In an alternative embodiment, a transition element may be provided for each of the separate rail systems. In such a configuration there may be a means of bringing the cable and transition element into alignment to provide guidance for a trolley between cable and rail systems. Such a system may allow for a more compact layout or a lighter weight system with fewer discrete elements on the translating assembly. For example, a separate rail system may be terminated such that the rail end is configured with an extension element that is a transition element. In this example the transition element may be configured such that a cable may be offered up to the transition element from the underside. Upon contact of the cable with the underside of the transition element, a pathway for a trolley to traverse from the cable to rail exists via the transition element. In this example any number of rigid rail sections may exist, each with their own unique transition elements. Upon deciding to connect the cable with a specific rigid rail the cable position may be controlled to approach the fixed transition element from the underside. Once offered up to the transition element, the cable provides the desired path from the cable to the rail. It can be seen from this example that having the transition element located with the rigid rail may allow for a simplified cable movement system, free from the need to maintain support of a cable constrained extension element.

To explain the above in more detail, some examples are now described.

Figure 40B:
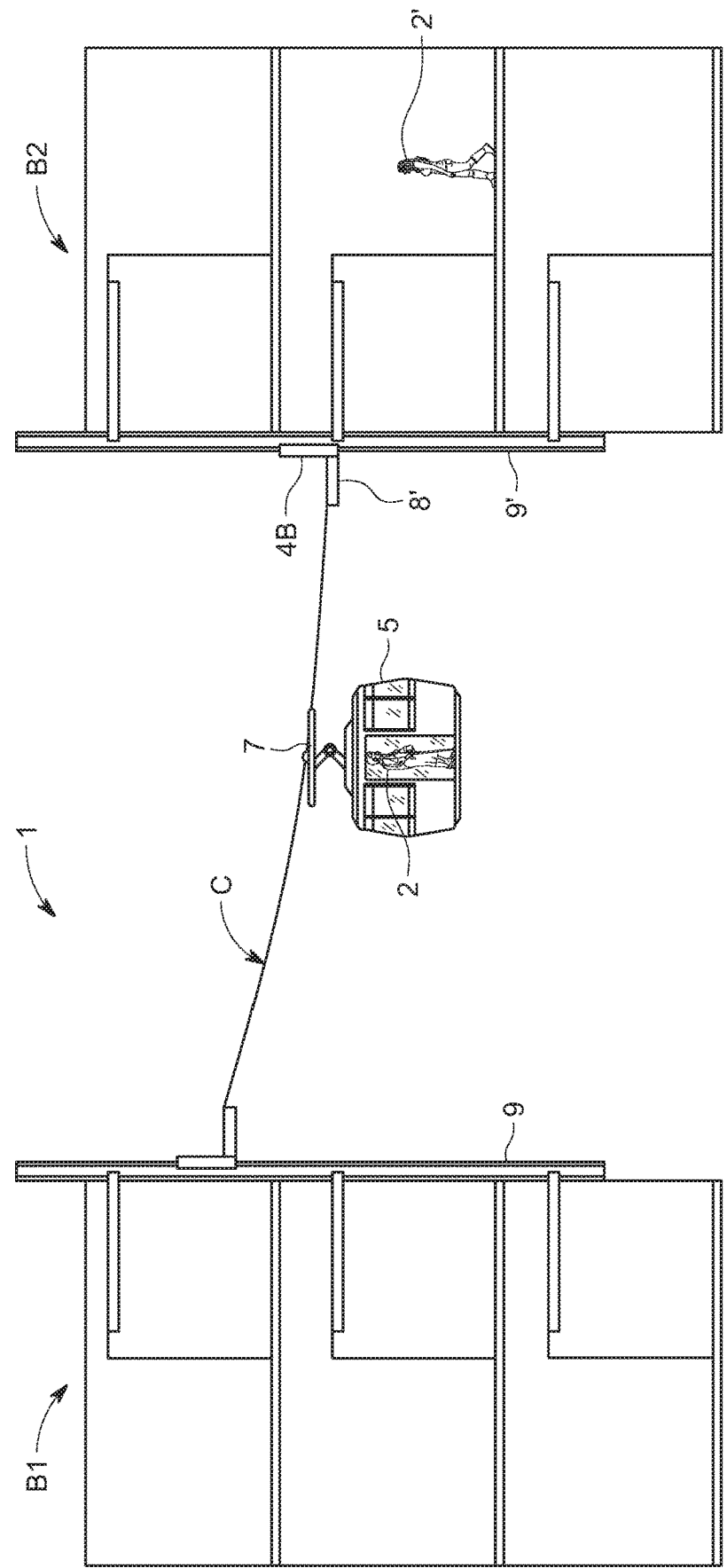
FIG. 40B illustrates a vehicle traversing a cable in a first direction between two buildings.
Figure 40C:
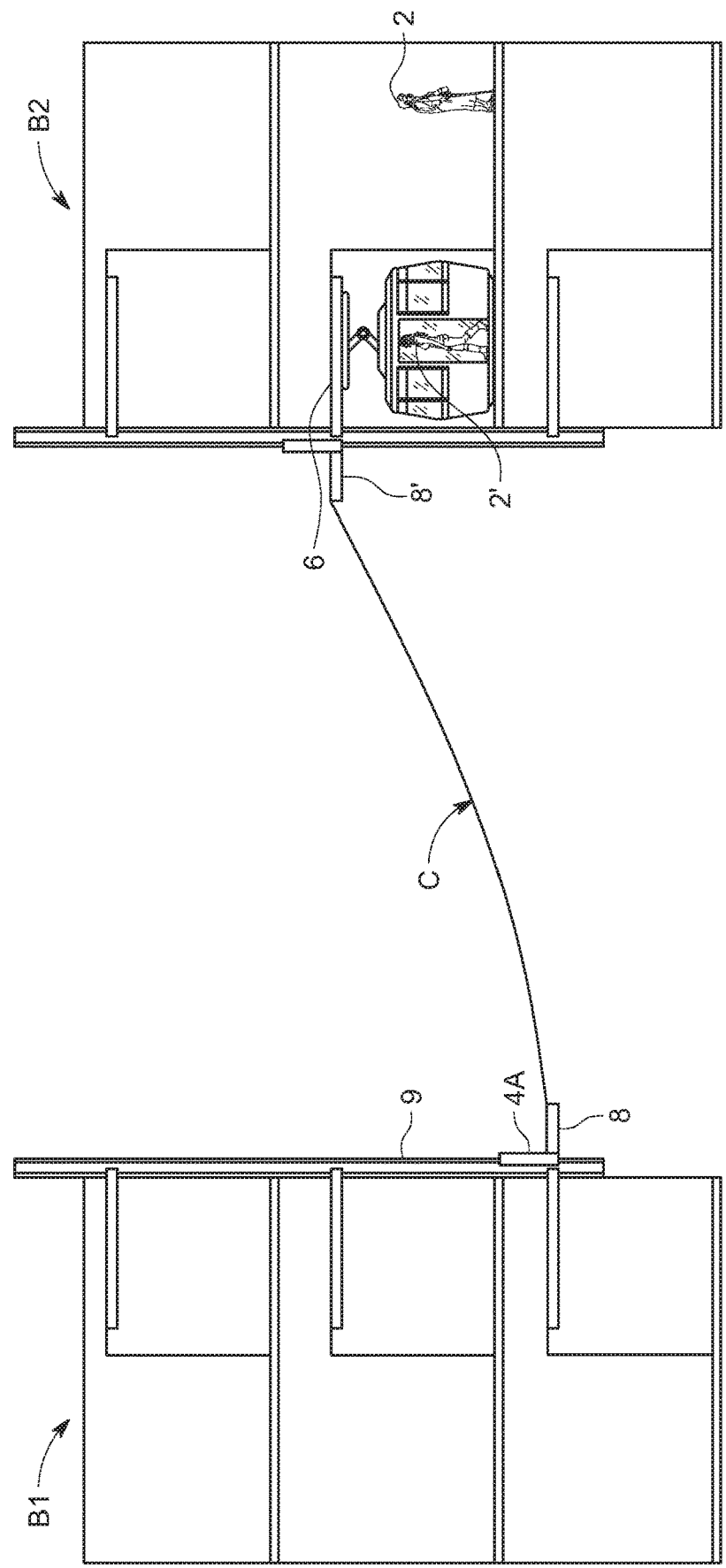
FIG. 40C illustrates a vehicle traversing a cable in a second direction between two buildings.

FIGS. 40A to 40C illustrate one embodiment of an object transport system 1 for conveying users 2, 2' between a first building B1 and a second building B2.

A vertical elevator 3A is provided on the first building B1 and a second elevator 3B is provided on building B2. A cable C extends substantially horizontally between the elevators 3A and 3B which are both at the same relative height as one another. The cable C is held in tension by cable management systems 4, 4' located on each of the respective elevators 3A, 3B.

A carriage 5 is attached to a rail 6 by a trolley 7 which in use is moved along the rail 6 to the transition member 8 which allows the trolley 7 to move from the rail 6 to the cable C.

As the trolley 7 and carriage 5 move onto the transition member 8, the transition members 8, 8' and cable management systems 4A, 4B descend along rails 9, 9' attached to the exterior faces of buildings B1 and B2 respectively (see FIG. 40B). As the transition members 8, 8' and cable management systems 4A, 4B descend, the length and tension of the cable C is adjusted. Transition member 8' descends further than transition member 8 to provide sufficient gradient for the trolley 7 and carriage 5 to traverse the cable C under the influence of gravity.

Where the gradient would be too great, then a suitable cable gradient can be achieved and maintained prior to the trolley being moved onto the cable C, and then both transition members 8, 8' and cable management systems 4A, 4B can begin a controlled descend or ascent as the trolley traverses the cable C. Of course, both descend/ascent and managing the gradient adjustment can occur simultaneously should this be required.

Where the trolley 7 and carriage 5 reach the desired destination (see FIG. 40C), the trolley 7 moves onto a transition member 8' to position the carriage 5 to allow for the passenger 2 to disembark, and a new passenger 2' to board the carriage 7.

Transition member 8 and cable management system 4A are shown is a further lowered position to allow user 2' to move to a different destination in building B1 then the starting point for user 2 in the same building.

Figure 41:
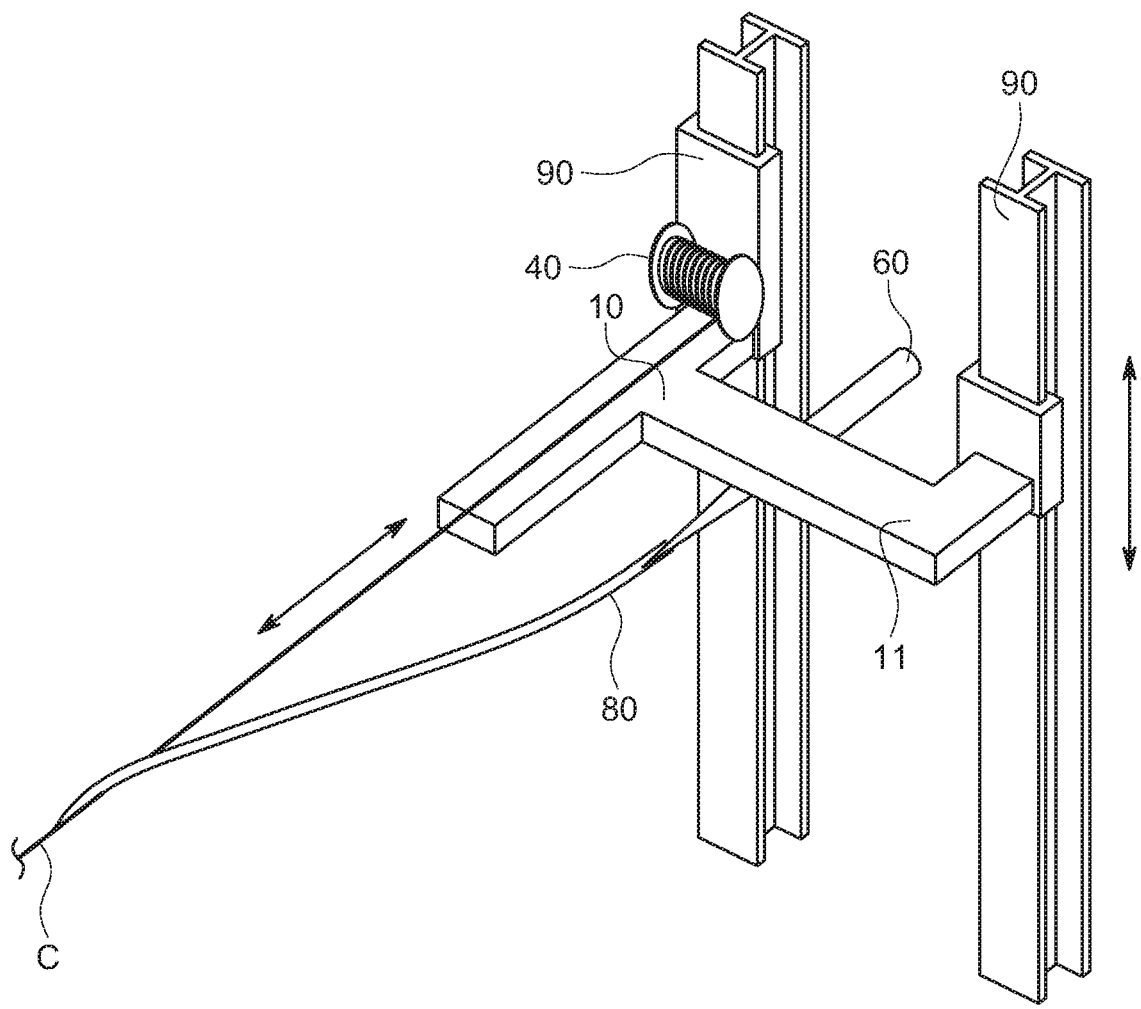
FIG. 41 illustrates an embodiment of an elevator and cable management means.

FIG. 41 shows an embodiment of a cable dolly 10 which is attached to a pair of parallel guide beams 90 such that the cable dolly can be displaced up and down the beams 90.

A cable management system 40 is attached and supported by the cable dolly 10, and the length and tension of cable C can be adjusted in response to movement of the dolly up and down the beams 90.

A cable-rail transition member 80 is connected to a rail 60 connected beneath a supporting cross member 11. The transition member is in the generally elongated s-shape and allows horizontal translation of a trolley (not shown) from a cable C onto rail 60 and then pass between the guide beans 90.

Figure 42:
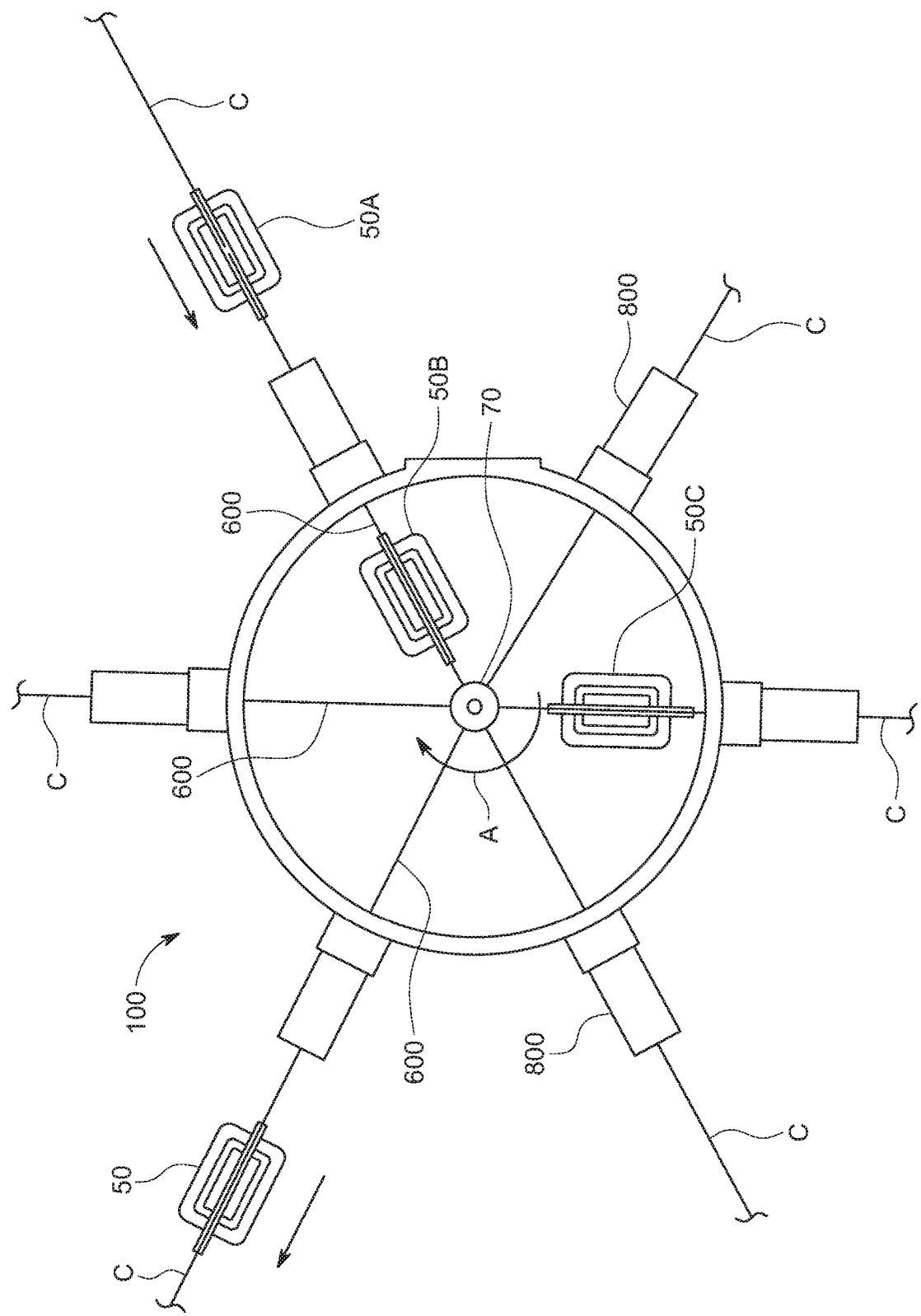
FIG. 42 illustrates an embodiment of a junction with multiple transition means and rotatable rails.

A multi-vector rail junction 100 is shown in FIG. 42. The junction 100 is shown with six cables C attached to six corresponding transition members 800 which are radially displaced around the circumference of the junction 100. Within the junction 100 are six corresponding radially arranged rails 600 all mounted upon a rotatable hub 70. Each of the rails 600 is aligned with a corresponding cable C to receive a trolley 50, which in this embodiment is a powered trolley, thereon.

In use a trolley 50A traverses the cable C towards a transition member 800 and then is moved onto a rail 600 located within the junction 100. The trolley now indicated as 50B and the hub 70 are rotated in a first direction A to bring the rail 600 and trolley into alignment with another cable and the trolley now 50C may exit the junction in a different direction.

As may be appreciated, the use of a rotating junction may require realignment of the load (not shown) to face the direction of travel when exiting the junction 100. The trolley 50 may be provided with a pivoting attachment or similar arrangement for the load for this purpose.

Figure 43:
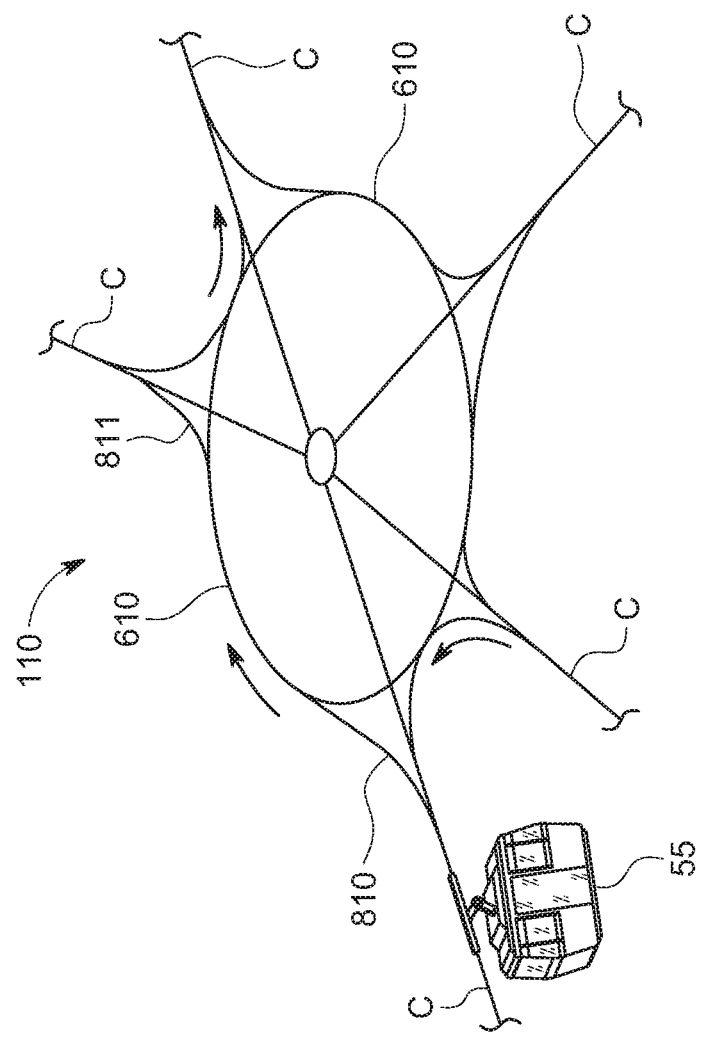
FIG. 43 illustrates an embodiment of a junction with tangential transition means.

In a further embodiment of the junction concept, FIG. 43 shown a tangential junction or hub 110. In this embodiment, a trolley 55 may enter the junction 110 via a cable to rail transition member 810 and continue along a rail section 610 which extends along part the circumference of the junction 110, until it meets a second rail transition member 811 and exits the junction in a new direction. Similarly, a trolley can enter and exit the circumferential junction 110 from any direction.

Figure 57:
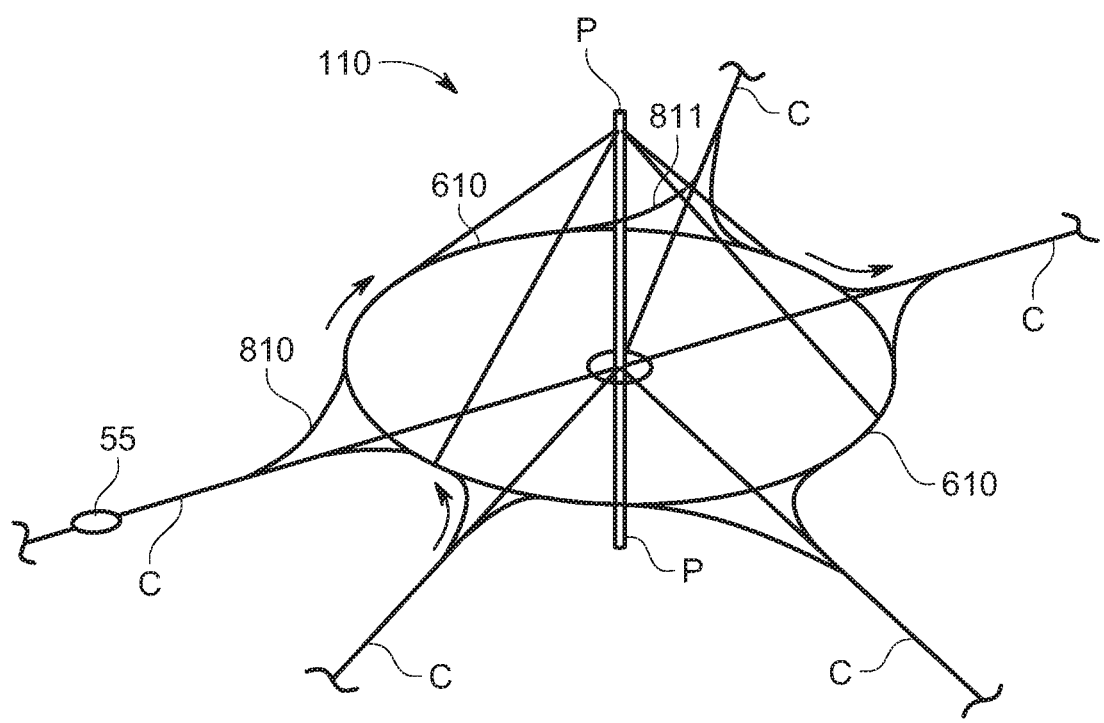
FIG. 57 illustrates a further embodiment of a junction with tangential transition means and central post.

FIG. 57 shows a similar tangential hub to FIG. 43 however in this example the hub is supported by a central post P with the hub cables C extending out like spokes of a wheel from the central post P. This example shows how the hub may be suspended using structural items like posts and pylons.

The tangential junction concept offers the ability one or more trolleys to enter and leave with the need to stop to change direction. It will also be readily appreciated that the shape and pay out of the tangential junction is not limited to circular or elliptical embodiments. However, it will also be appreciated that for user comfort and safety that certain turning radii and speeds may be more favourable than others.

Figure 44:
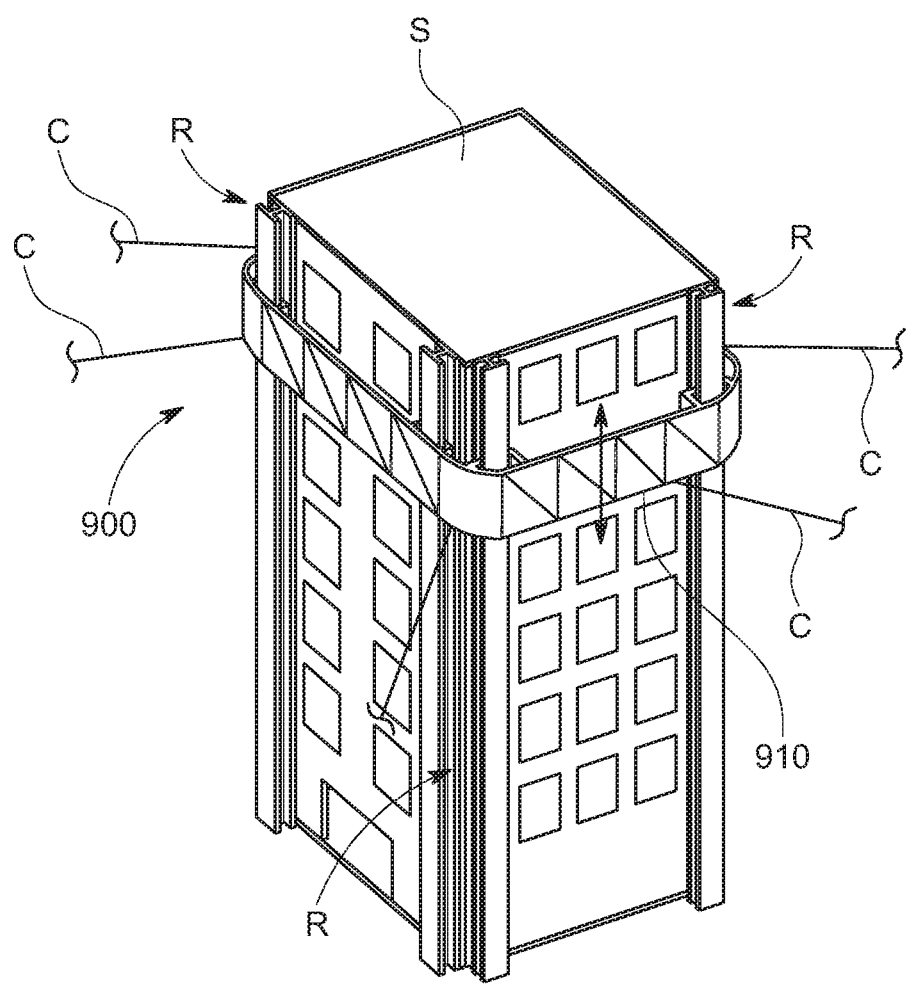
FIG. 44 illustrates an embodiment of a combined translation and elevator system attached to a structure.

In a further embodiment, FIG. 44 shows a simplified combined translation and elevator system 900 in place around a structure S, which could be a building or a support tower, or some other structure. The combined system 900 a framework 910 which extends around the structure S, and is supported and attached thereto by a series of substantially vertical rails R located at the corners of the structure S. The framework 910 may be raised or lowered along the rails R. A cable dolly (not shown) such as that of FIG. 41 may be reconfigured to be attached and move laterally along the framework 910.

Figure 45:
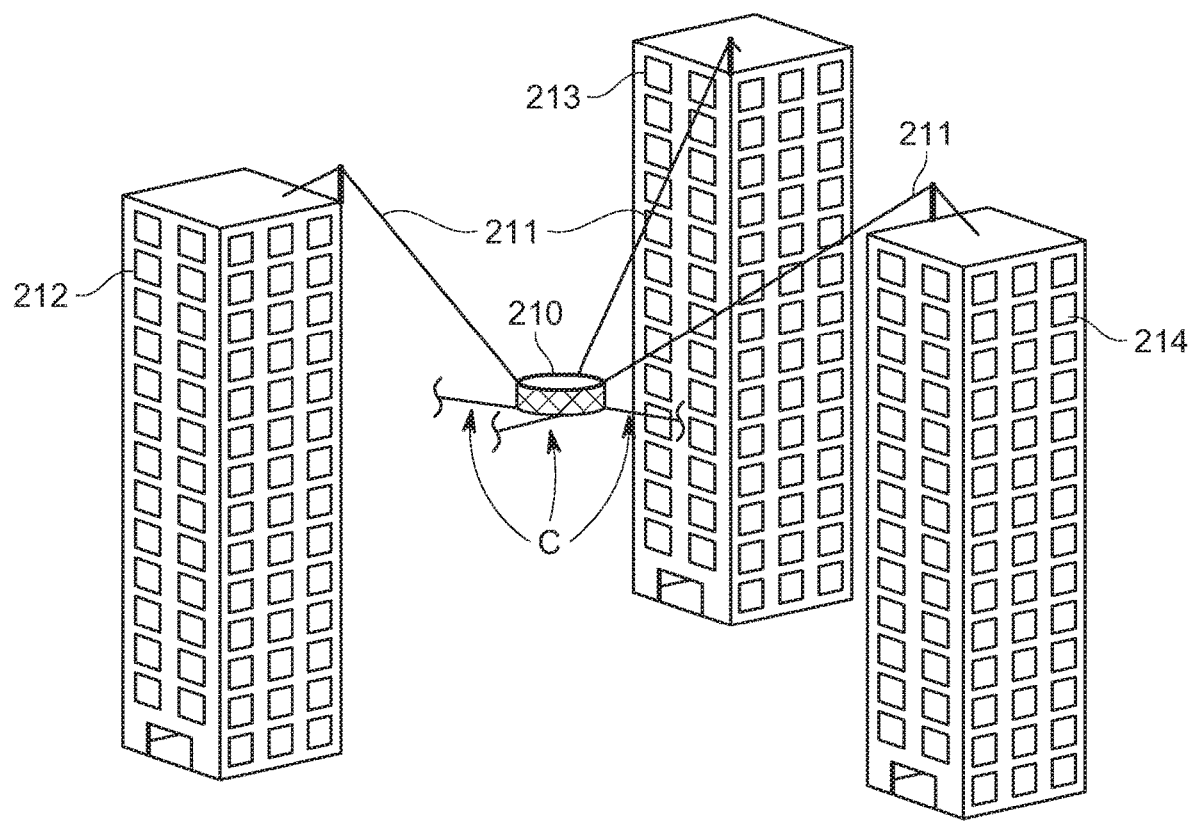
FIG. 45 illustrates an embodiment of a suspended junction.

A further embodiment of a junction is shown in FIG. 45, wherein the junction 210 is suspended from support cables 211 attached to adjacent structures 212, 213, 214 (again these may be buildings, support towers, trees, rock faces, etc). Cables C enter and leave the junction 210 as they would for the earlier described embodiments of junctions. A further option is for the junction 210 to be partially or fully supported by cables C in addition to or instead of support cables 212, 213, 214.

Figure 16:
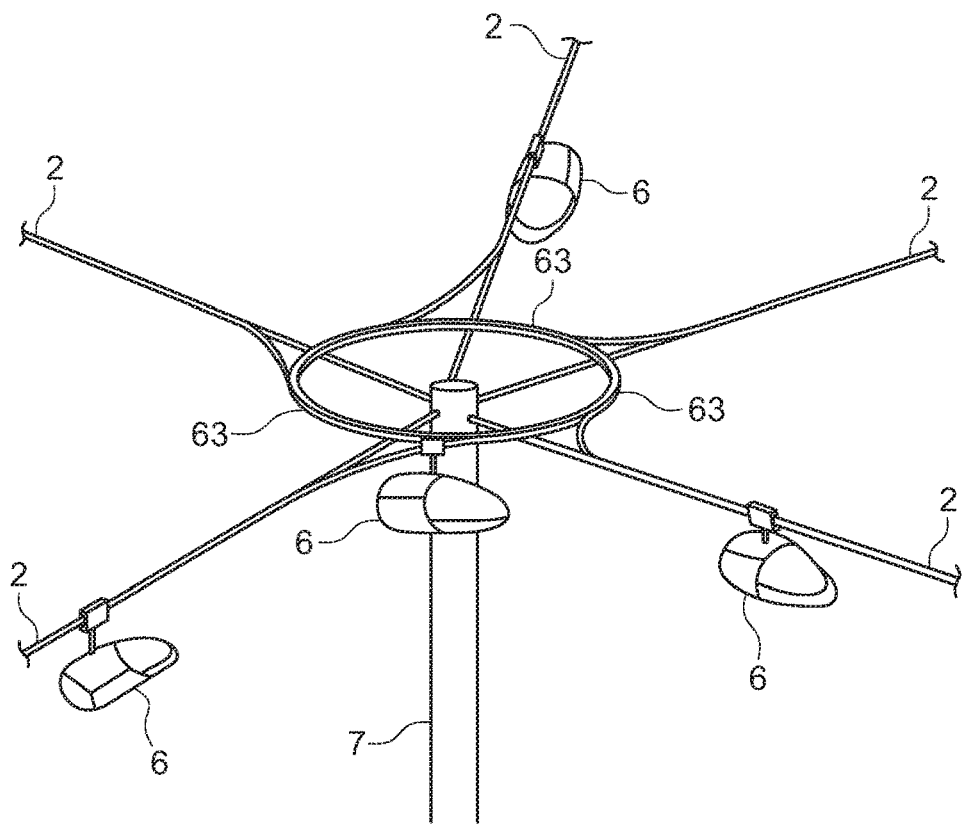
FIG. 16 illustrates a junction mounted on a support member.

FIG. 16 illustrates a further hub junction 43 embodiment mounted on a support member 7, in this example, the support member 7 acting as a central axis and cables 2 extending from the support member 7 in a pattern akin to spokes on a wheel. About a circumference is a ring rail 63 that pods 6 traverse as they transition from one cable 2 to the next cable 2.

Figure 17:
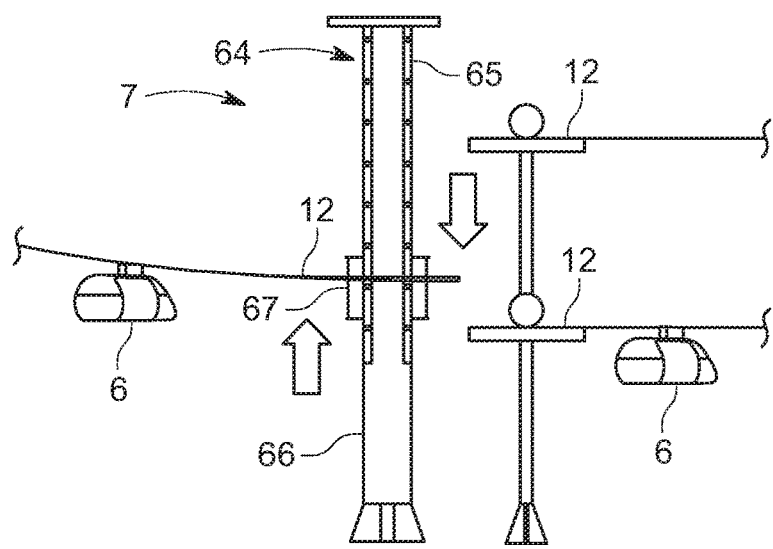
FIG. 17 illustrates a detail schematic side elevation view of an elevating junction support member.

FIG. 17 illustrates a further elevator embodiment as a detail schematic side elevation view of an elevating junction support member 64. The extending support member 64 has a support section 65 that in one embodiment can be raised or lowered relative to a base section 66. Instead, and as shown in the Figure, an elevator 67 linked to a fixed support section 65 climbs and declines the support section 65 to raise or lower the track 12. Raising or lowering may be completed to form a vertical junction, one section of track being linked to alternate sections of track by the raising and lowering action.

Figure 18:
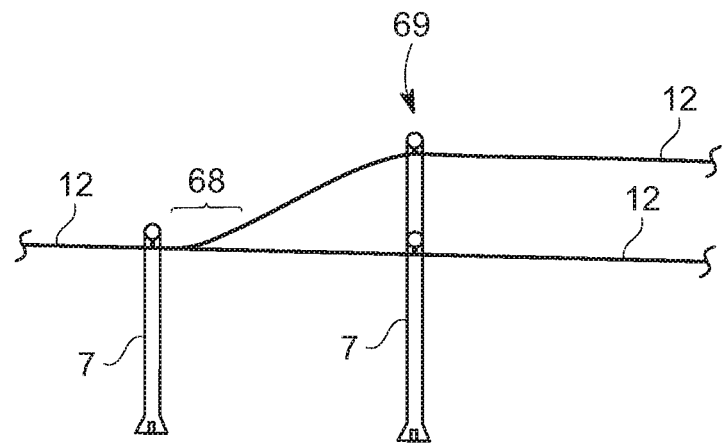
FIG. 18 illustrates a front elevation view of an alternate vertical junction design where two support members are used, one being taller than the other.
Figure 19:
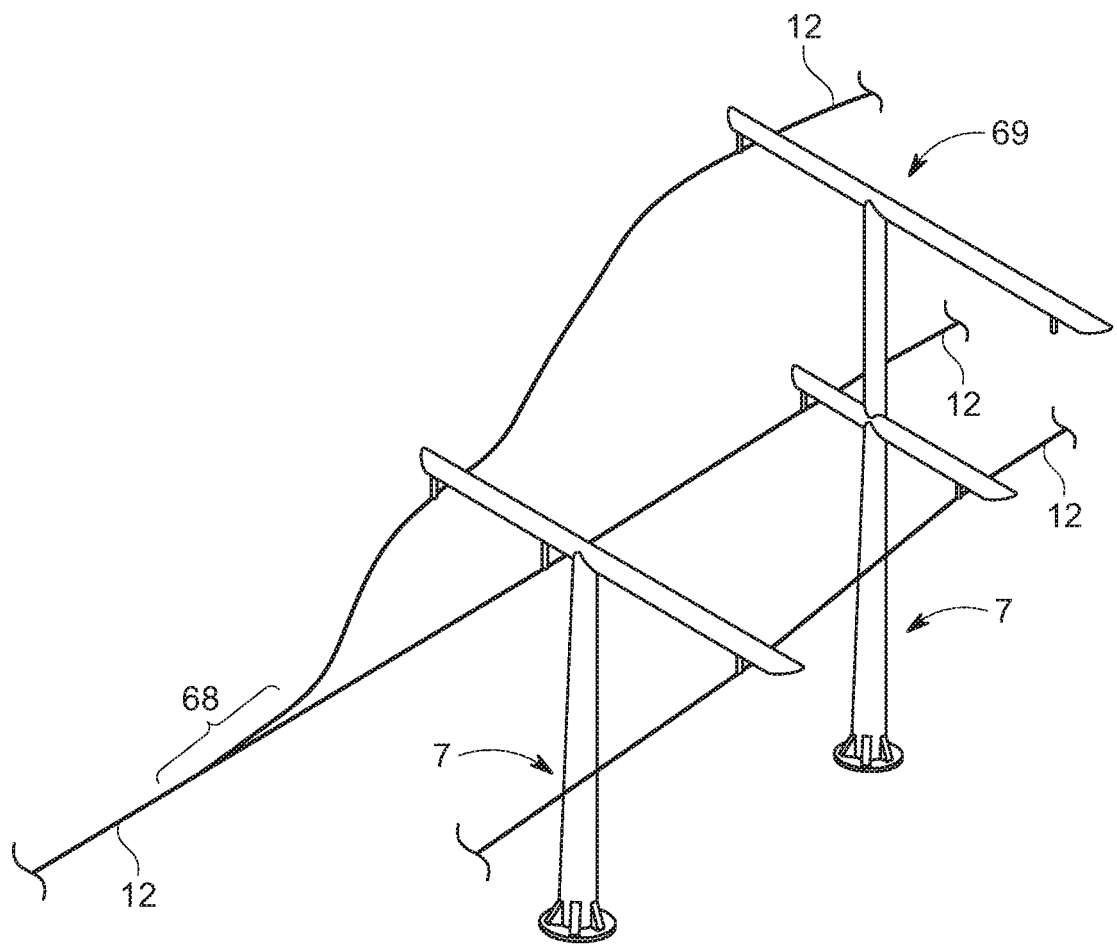
FIG. 19 illustrates a perspective view of an alternate vertical junction design where two support members are used, one being taller than the other.

FIG. 18 and FIG. 19 illustrate an alternate vertical junction designs where two support members 7 are used, one being taller than the other. The taller support member 69 comprises two connection points for a track 12. The track 12 splits after passing the first support member 7, the split illustrated by item 68. The pod 6 either travels in a level plane or may be directed at the split to travel up an incline to join the higher mounted track 12.

Track Positioning

Tracks may be elevated above ground level and existing infrastructure (foot traffic, roads, cars). Tracks may also be located at or about ground level or underground. Tracks may also pass over waterways.

Figure 34:
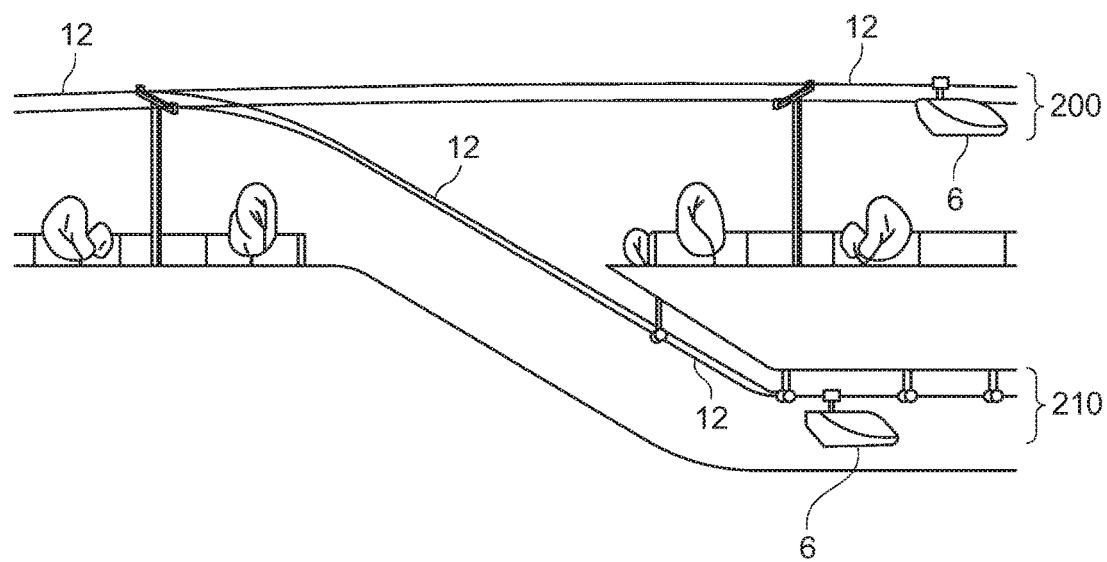
FIG. 34 illustrates schematically pods moving along tracks elevated above the ground and moving to an underground position.
Figure 35:
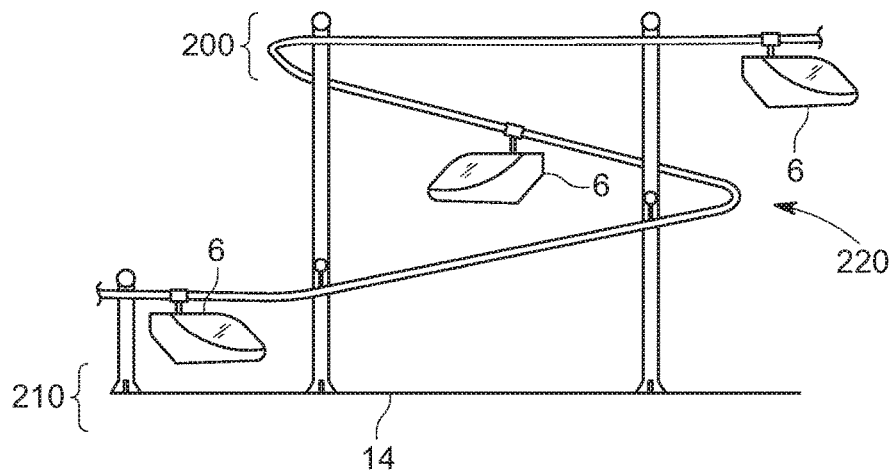
FIG. 35 illustrates schematically pods moving along tracks upwards about a spiral incline.

FIG. 34 and FIG. 35 illustrate schematically pods 6 moving along tracks 12 elevated above the ground 200, moving to an underground position 210 and moving upwards about a spiral incline 220.

FIG. 36 illustrates the way the transport system may traverse a waterway.

FIG. 12 illustrates various schematic options for support members 7 showing the use of existing infrastructure like lamp posts to suspend an elevated transport system, pylons that support cornering track sections, elevating pylons or towers that lift or lower a transport system track structure thereon, sidings 10, junctions 43 and dual track spanned systems.

Figure 13:
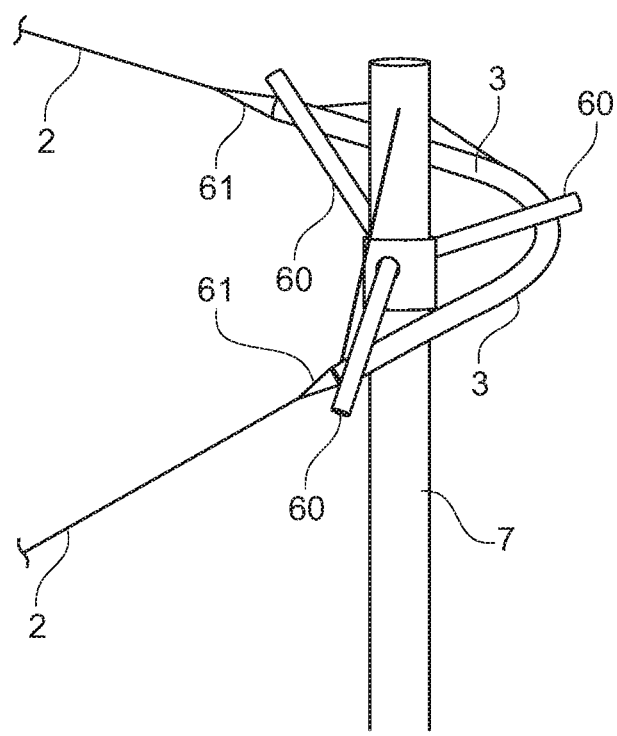
FIG. 13 illustrates a detail view of a pylon support structure that supports a cornering track section.

FIG. 13 illustrates a detail view of a pylon support structure 7 that supports a cornering track section. The support member 7 is a pylon with support spars or horizontal supports 60 extending form the pylon 7. The spars 60 link to a curved rail 3 section and the rail 3 section is linked to a cable 2 at either end. A pod 6 (not shown) moves along a cable, over a transition 61 and onto the rail 3, rotates about the rail 3 curve and runs off a second transition 61 back onto a new cable 2.

FIG. 14 illustrates a detail view of a pylon support structure 7 that supports a dual track spanned system. The support member 7 in this case as a T-shape with a horizontal spar 60 across the top (or part way up) a pylon height. About each spar 60 is a rail section 3, transitions 61 either side and cable sections 2 between support members 7.

Figure 15:
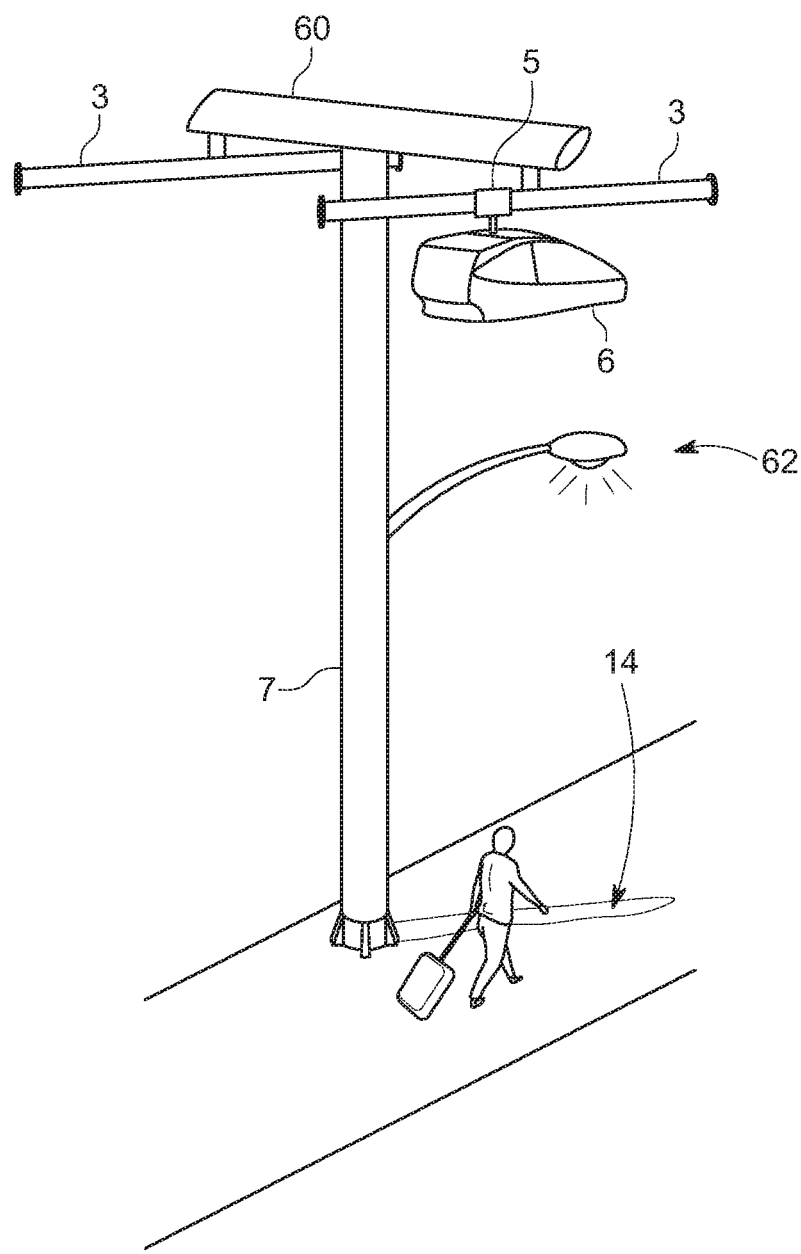
FIG. 15 illustrates a detail view of a pylon support member that is integrated with an existing infrastructure member.

FIG. 15 illustrates a detail view of a pylon support member 7 that is integrated with an existing infrastructure member, in this example being a street lamp 62.

Tracks or Sections Thereof Comprise at Least One Sensor to Detect Track Condition At least one sensor may act to monitor the tracks and identify recue or wear from cyclic use, extreme events, and wilful damage. Damage to the track may for example manifest itself in notches/indentations. The sensor may be at least one camera that detects damage to lateral/gating wheels as trolleys come into stations, identifying the section of track where damage is occurring. A selection of pod trolleys on the transport system for example could have a camera(s) attached to view the rail/cable as the trolley passes over it. Imaging software could be used to detect imperfections/changes during operation.

As noted, the transport system may have specific monitoring pods and/or trolleys. Besides visual camera detection, these specific monitoring pods/trolleys may be fitted with ultra-sound monitoring to detect defects in rail splices, a cable tension measuring device, and cameras for remote inspection.

Monitoring of trolley current on cable sections may be completed. A loss of tension in a cable will result in larger sag therefore an increased driving force requirement (current required). Mapping the current draw over time may indicate a degradation.

Trolleys may also comprise a friction pad that measures the surface friction coefficient to check for grease contamination.

Movement of the Pod(s)

Pod movement may be controlled. Control may be autonomous, semi-autonomous, user-controlled. Movement control may be to govern aspects of pod velocity, pitch and yaw.

Emergency Brake

Pods or track section sections may incorporate braking that is independent of the pod motor. In one embodiment, the pod brake may have a limiter configured to slow the pod in a controlled manner and avoid excessive forward swing of the pod that might cause the pod to strike the track on which the pod is conveyed. The emergency brake may have a force limiting feature such as a slip-clutch or slip-connection, set at a threshold braking force. The braking force may be actively or passively controlled. Pivoting motion between a trolley and pod may be controlled actively or passively. Control of the above aspects in an emergency brake scenario may be achieved for example using actuators, dampers, bias mechanisms, active counter weights/tuned mass damping, and combinations thereof.

Collision Avoidance

Active monitoring of adjacent pods and communication between adjacent pods may occur so that that a pod is self-controlled to prevents collision with an adjacent pod. Pods may also monitor the space ahead of the pod direction of travel for unanticipated objects occupying that space (a fallen tree, or an elevated work platform, or a flying kite).

An action may be taken in the even of a collision detection event. For example, the speed of the pod may be reduced to lower the speed of the pod to a safe speed; halting movement of the pod; raising an alert at a pod or wider system level for external intervention.

To achieve the above, the pod may comprise at least one sensor or machine vision. The wider transport system may use a predictive capability to identify moving objects coming from outside the travel space that may interfere/collide with a pod Rescue Pods to Collect Faulty Pods or Objects/Users from a Faulty Pod Rescue specific pods may be incorporated into the transport system. Rescue pods may have at least one attachment point to connect to a faulty pod to transport the faulty pod to a new location. For example, the rescue pod may move the faulty pod away from other pods or to a garage/workshop/charging station.

Stations

In a sixth aspect, there is provided at least one station within a transport system, the transport system substantially as hereinbefore described, the, or each station configured to be a point of transition for a pod or object conveyed by a pod or pods.

The point of transition may be:
a point at which the pods may stop or slow and collect or alight objects/cargo/people;
a point at which the pod detaches or attaches to a track;
a point at which alternate pod transport transfer occurs;
a point at which objects conveyed are transferred from the pod to other transport means;
and combinations of the above.

Stations may cater for single pods or multiple pods.

Stations may comprise a length of cable or track where a pod can be stopped or slowed to allow users or goods to move onto or off of the pod.

To avoid impeding the movement of other pods on the same stretch of track, a siding may be provided for the pod to move into whilst allowing other pods to continue on their journey unimpeded.

Stations may comprise a docking area that directs/supports the pod. Aspects of the docking area may comprise:
Pod movement side to side constraint as the pod enters a station;
Pod movement constraint about a stopped docking/alighting point;
A control mechanism reduces/halts unwanted movement of the pod or pod housing where it is at rest and may be being loaded or unloaded;
In use, where users enter or depart from a pod housing, there may be unwanted movement of the pod, such as swinging or rotation about the connection point(s) with the trolley. To prevent this the pod housing may be held, gripped or otherwise retained or prevented from moving while in the proximity of where a patron will enter/exit the pod to provide stability for safe movement of the patron and/or other objects loaded or unloaded from the pod;

Constraining means used above to constrain pod movement may be guide walls or bumpers, magnets and/or electro magnets, suction pads, clamps.

Electromagnets for example may be located on a structure adjacent where the pod stops/slows and at docking, the electromagnet is powered on and engages with a ferromagnetic member located at a corresponding position on the pod. Alternatively, the electromagnetic may be located on the pod and the pod is secured by engaging the electromagnet in a number of locations about a station area.

Guide member(s) if used may be located on the station floor or sides which align the pod into a docking configuration prior to the pod stopping. The guide member is shaped such that it is relatively wide at its pod-receiving end, and relatively narrow at the other end. The pod may be provided with a corresponding guide-engagement member which interacts with the guide member to bring the pod into a parking orientation. The guide and guide-engagement member may be of complimentary configurations.

There is no mechanical interlocking geometry which allows for improved reliability and minimises the need for precise alignment between the guide member and guide-engagement member.

Figure 3:
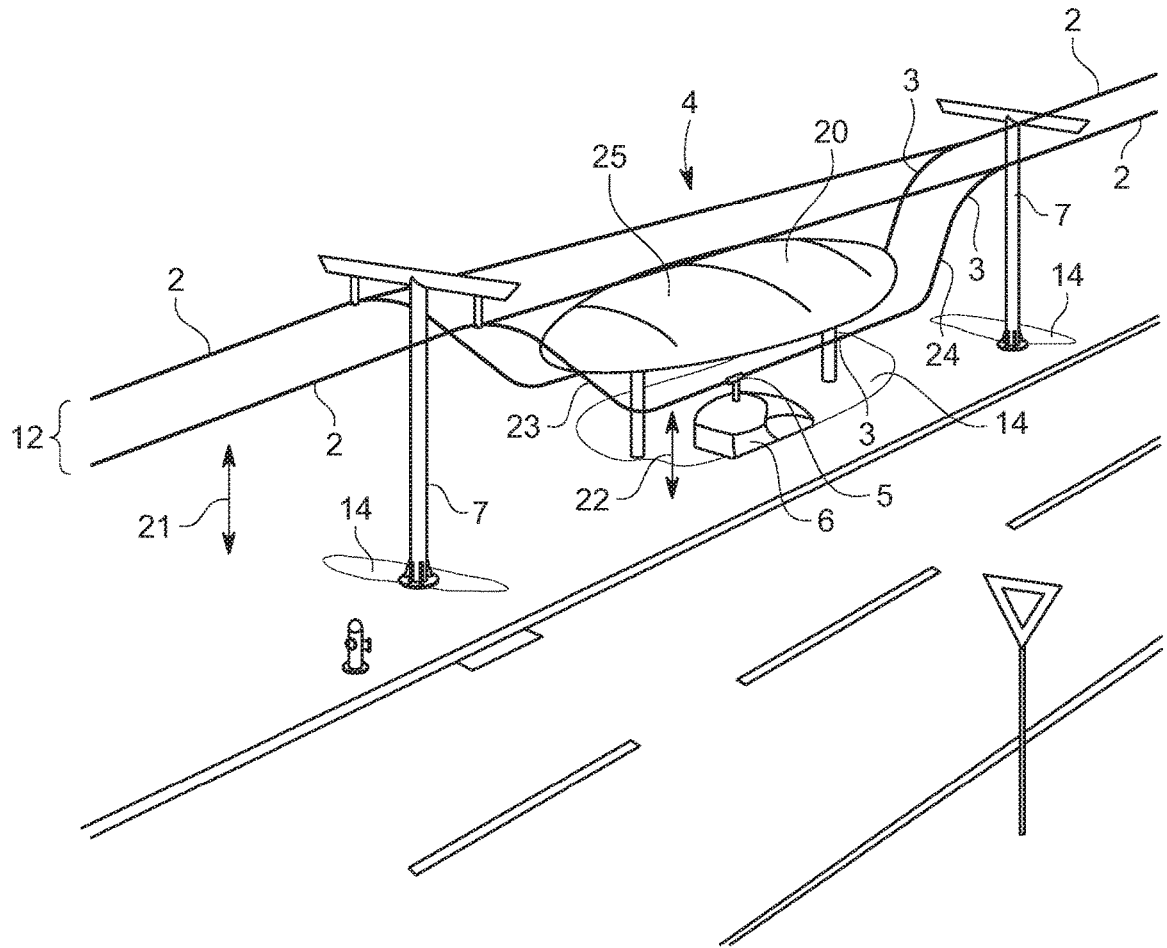
FIG. 3 illustrates a perspective view of an example station.
Figure 4:
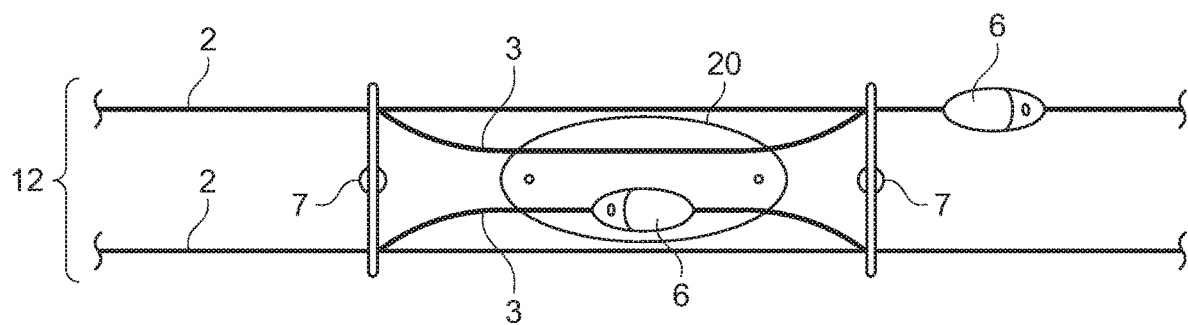
FIG. 4 illustrates a plan view of an example station.

FIG. 3 and FIG. 4 show a perspective view and plan view of an example station 4. In this example the station comprises a shelter 20 and the track 12 runs from an elevated position 21 to a lower position 22 beneath the shelter 20 and back up to an elevated position 21 again on exit from the station 4. The station 4 is at a lower level to allow users to easily enter or exit a pod at ground level 14. About a transition 23 from an elevated position 21 to a lower position 22, through the station 4 and for a transition 24 from a lower position 22 to an elevated position 21, the track 12 may be a section of rail 3. Cable sections 2 may extend to the transitions 23, 24. Support members 7 may be located about the transitions 23, 24. A pod 6 or pods 6 may transvers the track 12 through the station 4. The station 4 shelter 20 may comprise solar panels 25 to store and charge a pod 6 and/or trolley 5 motor (not shown).

Figure 20:
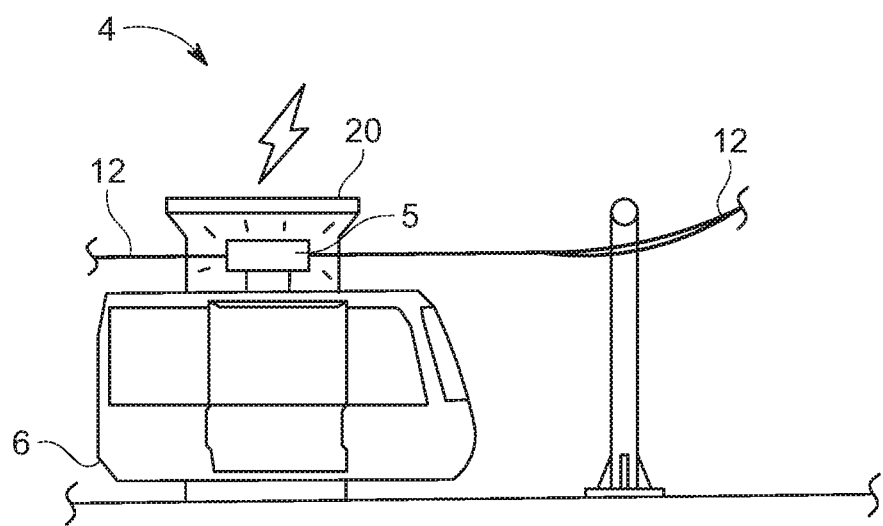
FIG. 20 illustrates a front elevation schematic view of a pod halted about a charging station.

FIG. 20 illustrates a front elevation schematic view of a pod 6 halted about a charging station. A charging station may be a loading/unloading station 4. Charging may be via induction between the shelter 20 and trolley 5.

Figure 7:
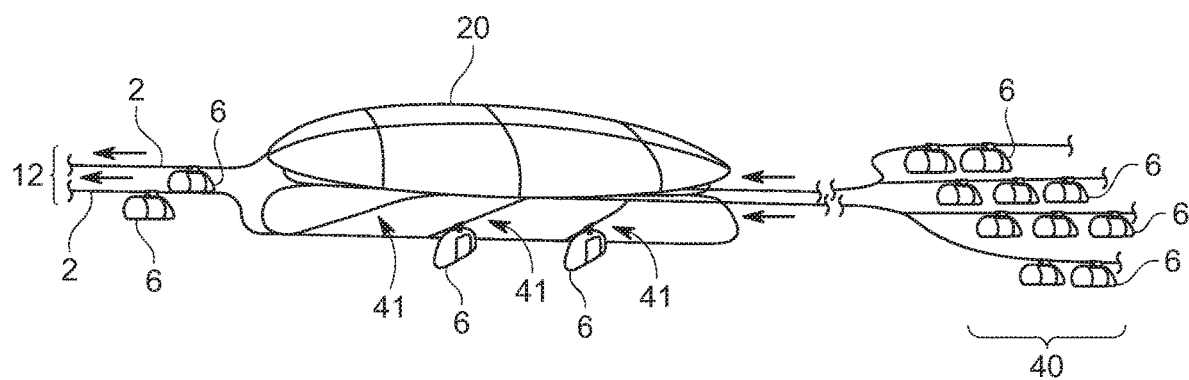
FIG. 7 illustrates a more elaborate station.

FIG. 7 illustrates a more elaborate station 4. The station 4 may be a transit point and comprises a pod 6 waiting area 40 and various boarding/loading zones 41 beneath a shelter 20.

Figure 8:
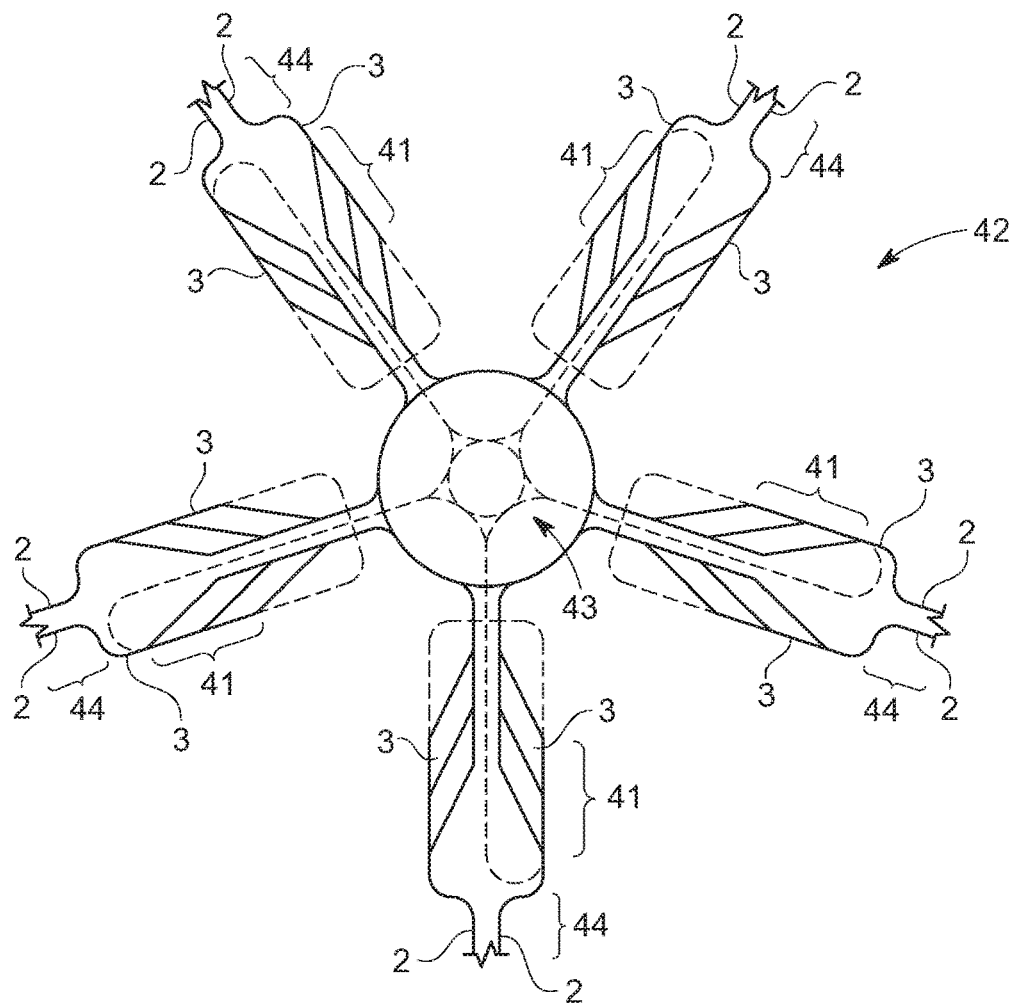
FIG. 8 illustrates a transit hub.
Figure 9:
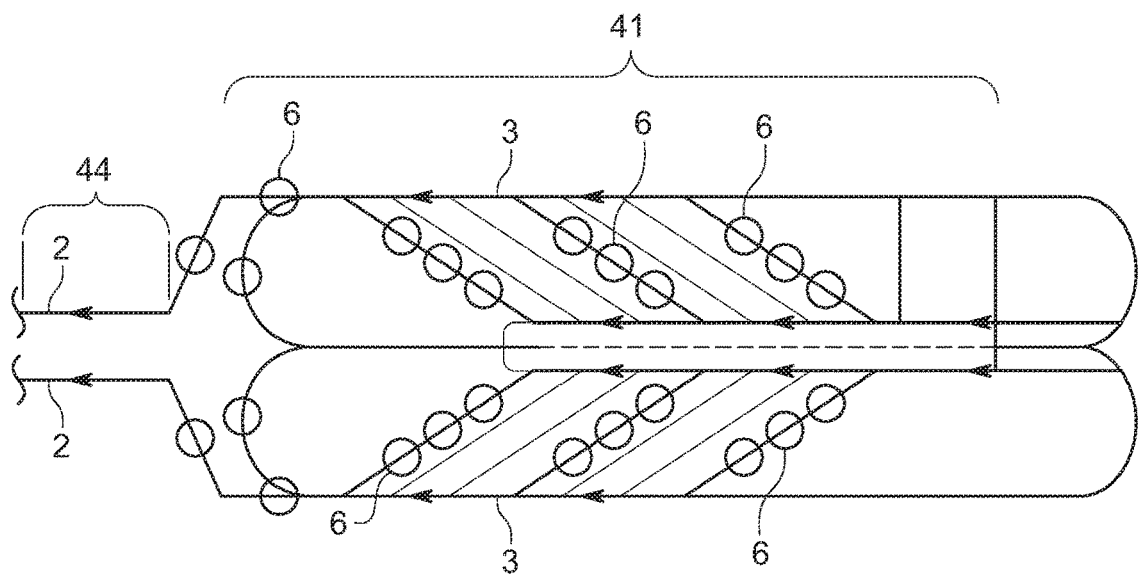
FIG. 9 illustrates a detail plan view of a departure/arrival zone.

FIG. 8 illustrates a transit hub 42 with loading/boarding zones 41, cables 2, rail sections 3, a junction area 43 for pods 6 to move between different departure and arrival zones 44. Pods 6 may enter one departure/arrival zone 44, disembark any passengers in the loading/boarding zone 41, proceed forwards into the junction area 43 and transfer to another departure/arrival area 44 and loading/boarding zone 41 before exiting the transit hub 42. FIG. 9 illustrates a detail plan view of a departure/arrival zone 44.

Stations may comprise a loading/unloading system where the loading/unloading of the object(s) occurs in motion, the pod moving along with the object(s), transfer of the object(s) occurring into the pod while in motion. In one embodiment this motive process may be achieved via:

The station comprising a mobile conveyor (magic carpet) that a person walks onto and they are then conveyed alongside a moving pod with little or no speed differential between the conveyor and the pod;

They enter (or exit) the pod in the same manner as if the pod were parked aside a stationary platform;

This method prevents connection of pods and people in a station by actively moving each through the station area while providing a loading/unloading experience of a stationary system with static platform.

The pod motor and track about a station may be configured to detach allowing the pod to move independently of a wider track and motor mounted thereon whilst about the station. For example, when a pod arrives at a station, a motor driving movement between the track and pod detaches from the pod with the pod remaining attached to a localised section of track about a station area. Alternatively, the pod is detached and retained about the station area via a retention means. Once the station activity is completed, the pod may be moved to the start of a wider track where the pod then attaches to a new trolley and motor or is otherwise re-engaged with a wider track network. The retention means may be a secondary support system in the form of a conveyor system located under the pod that the pod comes to rest on and the pod is manoeuvred within the station within the configuration of the conveyor. The conveyor system may be established to allow a pod to be moved between conveyor systems or between a stationary dock and a mobile conveyor. In providing this capability, the pods can be rearranged in order of travel outside the limitations of being constrained on an overhead track/cable system through the ability to be translated laterally as well as longitudinally (not possible on the cable/track. An alternative to the conveyor is having motored wheels on the base of the pod that bear on a roadway surface about the station, the pod wheels able to power and direct the pod on the plane of the roadway. The pod could manoeuvre itself to move ahead of an adjacent pod in an overtaking manoeuvre. The secondary support system may provide an additional degree of freedom (lateral, and possibly yaw rotation) that decouples the pod from a track network and enables more flexibility in moving pods in regions where loading and unloading of pods may be variable in duration, avoiding congestion.

Control System for the Object Transport System

In a seventh aspect there is provided a method or methods of communicating with a transportation system user, coordinating scheduling of individual transport elements, data collection and analysis of motion of individual transport elements (including the item or person travelling), prediction of travel schedule and coordination based on user demand, historical data analysis, and real time data metrics; and a means of communicating navigation instructions (if any) to the system user or navigated object/person. This aspect also includes methods of collaborating, and coordinating with personal and public planning data sources, for example personal calendar and scheduling applications and data bases, and a means of providing adaptive planning based on travel forecasting and planned arrival time.

It may be useful to provide a means of monitoring performance and operation of the system with sensor elements that report the condition or performance of chosen system components and parameters. Information from system sensors may be collected and reported to a human operator for example to communicate the operational condition of the associated element. This information may be reviewed and analysed by an operator to determine the need for intervention or interactions with the system.

Alternatively, the sensors may communicate with specific elements of the system directly, such as for example an actuator for braking, or for switching the position of elements within the system. The sensor or receiving element may perform modification of the communicated information to condition or analyse the sensor information.

In alternative configurations either or both the sensors or items responding to the sensed information may interact with elements outside of the transport system. An example of this may be where a cable monitoring sensor communicates with a gondola lift system passing under the cable. In this example the gondola may respond to the cable sensor in a manner that shuts down operation of the gondola if the overhead cable were to become detached at one end presenting a hazard to a moving gondola.

Further to that disclosed above, connection, conditioning, analysis, actioning, and storage of information may be achieved through connection to elements specifically established to perform such function. Such elements may be contained within the immediate sensor-actuator-control system, or may be external to the system, either in a single module, networked, or cloud based.

A control system as disclosed may communicate with specific systems the control the motion of trolleys, switching or positioning of cables and tracks to facilitate an automated operation of the overall cable-rail system. Control methodologies may be specific to operational safety, motion control of elements, coordination and control of users, switching of motion paths, or system optimisation.

Further to this a control system may communicate with other independent transport systems to coordinate operation of these systems for any number of reasons. An example of this is where a cable-rail system is established to operate alongside a monorail transport system. In such a system it may be desired that the cable-rail system has coordinated with the monorail system such that the cable-rail system positions several trolleys near the monorail terminus ready for use by passengers disembarking the monorail.

Further to the control of the system, there is provided a method or methods of communicating with a transportation system user, coordinating scheduling of individual transport elements, data collection and analysis of motion of individual transport elements (including the item or person travelling), prediction of travel schedule and coordination based on user demand, historical data analysis, and real time data metrics; and a means of communicating navigation instructions (if any) to the system user or navigated object/person. This aspect also includes methods of collaborating, and coordinating with personal and public planning data sources, for example personal calendar and scheduling applications and data bases, and a means of providing adaptive planning based on travel forecasting and planned arrival time.

Centralised Control

In an eighth aspect, there is provided a control system for an object transport system substantially as hereinbefore described, the control system comprising:

a central control station that receives all signal information from every pod on the transport system or a part thereof and which comprises a controller that receives and processes the sensed signals from the transport system and which actions pod movement or braking based on predetermined variables.

The control system may have oversight of a network of pods on the transport system. The central control station may receive all signal information from every pod on the network. Predetermined variables may be defined, examples including: user request for a pod at a certain location, user request to travel to a certain location, signals from damaged or faulty pods causing track blockage, emergency scenarios, rescue scenarios, directing of pod traffic to avoid a blockage or busy portion of track and combinations thereof.

The central control station may receive user requests, the central system processes the data and identifies the most effective manner to execute the orders.

Pods in this embodiment may still have limited independent control. For example, communication could still exist between pod and one or more of: charging bay, switch, station, maintenance system, rescue system, other network pods, the user. Pod control may be limited to functional communication as opposed to self-management.

Despite reference to a central control, multiple central control stations may be used, each central control being in control of a zone or section of a wider transport system.

Distributed Control

In a ninth aspect, there is provided a control system for an object transport system substantially as hereinbefore described, the control system comprising:

a distributed control station spread across all pods on the system or a system zone that receives signal information from the pod itself and optionally other pods or the transport system as a whole and which comprises a pod controller that receives and processes the sensed signals and which actions pod movement or braking based on predetermined variables.

In this embodiment a distributed control system is spread across all pods on the system or a system zone. Each pod may manage with autonomy, being able to access and understand the user demand. The network may act with a 'hive' mentality, each pod aware of their commonality and thinks/acts as a community through a process of sharing knowledge/thoughts/resource. This network configuration may see the pods communicating with all facets of the overall system, with the capacity to act independently network communication was temporarily lost.

Multiple distributed control systems in a zone of a wider transport system may also be used, some sections with full autonomy and some with feedback to a wider central control system.

Predetermined variables may be present in a distributed control system, examples being: user request for a pod at a certain location, user request to travel to a certain location, signals from damaged or faulty pods causing track blockage, emergency scenarios, rescue scenarios, directing of pod traffic to avoid a blockage or busy portion of track and combinations thereof.

As noted above, the pod may have limited control capability to command the movement of the pod on the route network. The control localised to the pod may be configured to for example, receive external commands, differentiate between a series of command types (examples not limited to: navigation, safety control, signal and user communication), respond to the command to perform the desired action. Specific to the navigation, the pod control may take the request to travel to a designated location and travel with a particular motion behaviour (profile of distance, velocity, and acceleration, jerk). The control system takes this navigation request and turns this request into a motion profile within the limits of the requested motion behaviour and any limits configured local to the pod. A motion controller takes the motion command and provides a request of a motor controller for motion. The system is configured with a feedback system, monitoring actual motion of the trolley and commanding motor control in response to the difference between the actual and commanded motion. Additionally, a secondary control mechanism may be configured to take the motor demand signal and control the motor with an appropriate control means. The control means may be a feedback control, and may employ any number of control methods/strategies (non-limiting examples are PID, fuzzy logic). For an electric motor, the motor command may be a demand for motor supply current. The control may have a control feedback loop by measuring current supplied to the motor.

The pod may transmit measures derived from sensors located on the pod, or calculated measures. These measures may communicate information specific to navigation of the pod such that a remote-control system can determine the location of the pod on a route and provide control commands and network scheduling accordingly. Such information may be measures such as distance travelled, location with respect to position markers, spatial positioning, and other non-limiting examples.

Communication may exist between a pod and a system remote to the pod that communicates information related to the following items; energy charging bay, switch, station, maintenance system, rescue system, other network pods, user commands (communication and travel request)—however this would be resigned to functional communication opposed to self-management.

A method of monitoring and intercepting user command information locally with the pod control may be employed to allow specific movement control of the pod commanded directly by the user inputs.

Such a use of this may be if there were a communication failure between the pod and remote control system and the pod needed to be moved to a different location. Such a reason may be to allow patrons to disembark from the pod safely until the communications are restored. This method would monitor the user inputs from the user interface and identify specific sequences of user input that activate a 'direct-control' mode of operation. In the direct-control operation, the user could interact with the user interface to directly control the motion of the pod to move it along the track.

The control system (central or distributed) may link the transport system to other modes of transportation e.g. land, sea, air, drone (ROV's).

The control system (central or distributed) may reroute traffic to prevent pod gridlock or avoid a collision.

The control system (central or distributed) may be configured to level a pod load across a transport system, the control system planning and scheduling pod routes on the transport system so that pod volume on the transport system is spread evenly to reduce congestion in intersections on the network. This control or governance may provide overall greater efficiency in travel time for patrons. For example, three different pods may set off from the same location for the same destination but each takes a different route to get there. This reduces the demand on any one intersection to ⅓ of that if all were going through the same junction and, say, ⅑ of the interactions if an equivalent other 3 pods were travelling through the same in the same manner.

The control system (central or distributed) may be predictive and is configured to sense network demands and direct pods to high demand locations/times. Prediction may be via monitoring of mobile phone location and density for example. Prediction may be personalised so that a pod is present for a user or object at a common location and time of departure. This may be a learnt function of mobile phone location and usage patterns. Prediction may utilise pod-to-patron matching to ensure sufficient battery (power type) energy reserve for a predicted journey.

So-called 'big data' collection may be exploited to pre-empt the daily routines of users, this would allow more dynamics and efficient use of resource. Automated rotation of pods through a scheduling cycle. Rotating pods through high use areas to even out wear. Transport velocity varied throughout day to meet capacity requirements, low velocity for better efficiency, high velocity for higher throughput at peak periods.

The control system (central or distributed) may detect an event where a pod does not have sufficient power for a planned journey and may then assign a new pod for the user to transfer to part-way.

The control system (central or distributed) may vary the pod velocity about the transport system e.g. to meet capacity requirements, low velocity for better efficiency, high velocity for higher throughput at peak periods, express track regions, slower speeds for changeover points.

Control System Communication Wireless or Via Track to Pod Connection

Pod and control system communication may be completed wirelessly. For example, communication over longer distances may be completed via methods selected from: a cellular network, a hard wire network, radio, laser, optical, GPS, and combinations thereof. Communication over shorter distances selected from: Bluetooth™, Wi-Fi™, RFID, cable embedded signals and combinations thereof.

Online/Algorithm/App/Fixed User Interface

The user or a control system may interact with the transport system via an online means that may rely on an algorithm, app, website or user interface. Reference is made hereafter to an app unless otherwise noted however, this should not be seen as limiting since as noted, other interfaces may be used.

For example, the user may use an app to navigate themselves to a waiting pod in a station of many pods.

The app may manage queuing and directing individual people to a pod or pods. Direction may for example be via artificial reality (AR) devices e.g. Google Glass (as example), the AR directs through arrows and highlighting specific pods (in the AR environment).

The app may provide an indication of when its time to disembark the pod and indicates from which side (if applicable).

The app may provide an alert to the user by indication from a smart phone—sound or vibration or visual alert, could be specific/unique to the pod transportation system for easy identification, or even unique to a particular station so that the patron can identify location.

The app may be used to summon a pod to a station or pick up point on the transport network.

A pod may be provided with the means for data and communication pairing of an electronic device to audio visual capability within the pod. An example of this may be where the pod is fitted with speakers and screens to provide audio visuals for use in a video call, or to interact with an ebook, social media or video streaming services. The content being consumed may be stored locally in the pod, or received from external transmissions from the pod, one example being media transmitted from a personal data device during personal transit in the pod.

There may be a means of having paid transport for users of a pod transport system where there is a method of payment that charges users directly and automatically for a journey in the pod. Such a system may have a method that interacts with a user's mobile data device to locate them with respect to the pod, and/or book a journey, and/or identify when the user is travelling and when the journey ends. Such a system may have a method of determining that the journey had started and/or finished and automatically take payment from the user by debiting a pre-credited account, or direct billing to a designated credit card.

Another application may be providing the ability to send goods or a package in an unmanned pod to a destination for collection or distribution. With this feature it may be desirable to provide security of the goods during and at the end of the transit. This feature may be configured to require a code to access the contents from the pod at the destination for collection of goods. Such a code could be provided through a service application, such as one that is accessed through a mobile data device. Direct code unlocking could be provided by near-field wireless communication (or similar), or by code scanning of a displayed unique code such as a bar-code or QR code, for example.

Similar to the ability to provide transport for goods, the pod network may provide the ability to send a pod to pick up people (children from school, or book a ride for someone who is unable to book their own, as examples) and transport them safely to a chosen destination. The pod could be secured for the duration of the ride for the safety of the people travelling in the pod.

The pod may be configured with an interface for users to instruct a particular action, or actions, of the pod in the event that the users determine there is an emergency situation. In one example, an emergency medical button could send users to a transit station nearest to a medical facility or be able to summon a first aid kit/defibrillator to a station in case of emergency. Such an action may signal any billing system to provide an alternative billing arrangement under the use of such function.

Figure 33:
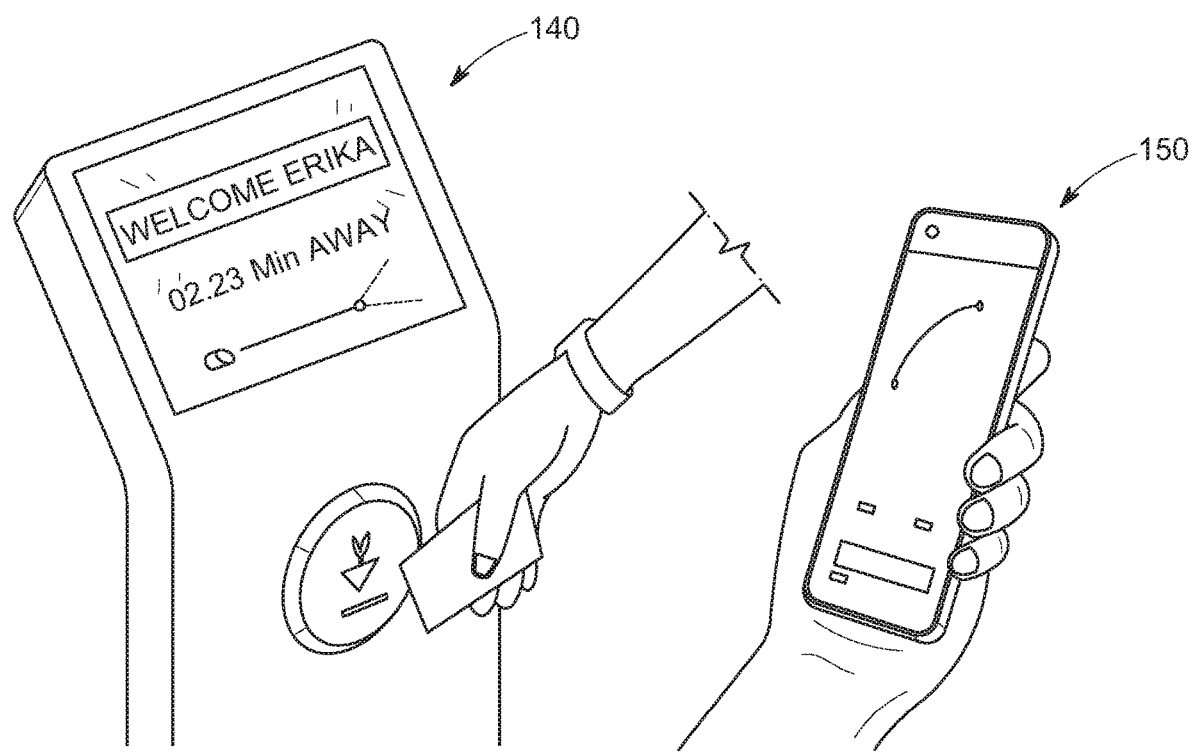
FIG. 33 illustrates schematically a person summoning a pod to a station.

FIG. 33 illustrates schematically a person summoning a pod to a station via a user interface 140 or phone 150.

The app may further be used to:
Hold a pod that is waiting at a station;
Book a ride for a given time in the future;
Manage subscription payment;
Manage payment/ticketing;
The ability to control a following luggage pod which may be required if a pod is at its weight limit due to rider occupancy or to convey an unusual load size or shape;
Book a ride for another person or object.

Method of Object Movement

In a tenth aspect, there is provided a method of transporting at least one object between locations, the method comprising the steps of:
providing a transport system substantially as hereinbefore described;
accessing a pod for the object or objects;
conveying the object or objects in the pod to a desired location
exiting the object or objects from the pod.

System and Method Applications

The system and methods described above may be used in an amusement ride system.

The system and methods described above may be used in a goods transport system.

The system and methods described above may be used in a transport system for human passengers.

Advantages of the above described transport system and methods of use are as noted above and more particularly may be one or more of the following:
The described transport system is useful for spanning difficult terrain without the need for large scale and expensive infrastructure development such as building of roads, highways or bridges.
Pods can be moved rapidly between locations
Personal transport with capacity to tailor the user experience to an individual's requests
Elevated above existing infrastructure
Comparatively low cost to manufacture and run
Based on the inventor's experience, maintenance costs should be no more than art methods of transport (most likely considerably less).
Flexibility in design means the transport system may be adapted to many environments and adapted even during a build to cater for unexpected design issues.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

Aspects of the transport system and method of transporting objects including people between locations have been described by way of example only and it should be appreciated that modifications and additions may be made thereto without departing from the scope of the claims herein.

What is claimed is:

1. An object transport system comprising:
a track, the track comprising:
one or more cable sections, the or each cable section comprising a cable;
one or more rail sections, the or each rail section comprising a rail; and
a track transition between one of the one or more cable sections and one of the one or more rail sections;
a junction or transition comprising an entry section of the track and two or more exit sections of the track;
a pod configured to traverse the track, the pod comprising a trolley and a supported or pendant pod housing,
wherein the trolley is a powered trolley configured to drive the pod along the track,
wherein the trolley is configured to traverse the or each of the cable sections by moving along the cable of said cable section, traverse the or each of the rail sections by moving along the rail of said rail section, and traverse the track transition to thereby move from the cable of the one of the cable sections to the rail of the one of the rail sections or from the rail of the one of the rail sections to the cable of the one of the cable sections,
wherein the junction or transition comprises a curved rail section, the curved rail section being curved horizontally such that the curved rail section is configured to, when the trolley passes through the junction or transition and traverses the curved rail section, cause a change in the direction of the trolley horizontally, and
wherein the pod housing is formed and arranged to contain, support or provide an enclosure for an object to be transported;
a station configured to be a point of transition for the pod and/or an object conveyed by the pod; and
switching apparatus configured to switch a pathway for the trolley traversing the entry section between the trolley exiting the junction or transition traversing a first one of the exit sections and the trolley exiting the junction or transition traversing a different one of the exit sections.

2. The object transport system as claimed in claim 1, wherein the station comprises a docking area that is configured to direct and support the pod so as to constrain:
pod movement side to side as the pod enters the station; and
pod movement about a stopped docking/alighting point;
wherein the pod housing is held, gripped or otherwise retained or prevented from moving while in the proximity of where the object conveyed will enter/exit the pod.

3. The object transport system as claimed in claim 1, further comprising constraining means used to constrain pod movement, the constraining means selected from: guide walls, bumpers, magnets, electromagnets, suction pads, clamps, or any combination thereof.

4. The object transport system as claimed in claim 1, further comprising:
one or more electromagnets located on a structure adjacent where the pod stops or slows; and
a ferromagnetic member located on the pod;
wherein the pod housing is constrained by the one or more electromagnets located on the structure adjacent where the pod stops or slows and, at docking in the station, the or each electromagnet is powered on and engages with the ferromagnetic member located at a corresponding position on the pod.

5. The object transport system as claimed in claim 1, further comprising:
a ferromagnetic member located on a structure adjacent where the pod stops or slows; and
one or more electromagnets located on the pods;
wherein the pod housing is constrained by the one or more electromagnets located on the pod and, at docking in the station, when the or each electromagnet is powered on, said electromagnet engages with the ferromagnetic member located on structure adjacent where the pod stops or slows.

6. The object transport system as claimed in claim 1, further comprising:
one or more guide members located on a floor of the station and/or a side of the station, the one or more guide members configured to align the pod into a docking configuration prior to the pod stopping.

7. The object transport system as claimed in claim 1, wherein the track runs from a first elevated position to a lower position on entry to the station and back up to a second elevated position on exit from the station.

8. The object transport system as claimed in claim 1, wherein, about a first transition from a first elevated position to a lower position, through the station, and about a second transition from the lower position to a second elevated position, the track is a section of rail.

9. The object transport system as claimed in claim 1, wherein the track comprises a main section and a siding section offset from the main section, and the pod is moveable between the main section and the siding section via the junction or transition.

10. The object transport system as claimed in claim 9, wherein the siding section is configured to store stacked pods awaiting users.

11. The object transport system as claimed in claim 9, wherein the station comprises the siding section.

12. The object transport system as claimed in claim 9, wherein the siding section is offset about a horizontal plane or a vertical plane from the track.

13. The object transport system as claimed in claim 9, wherein the siding section comprises a rail section of the one or more rail sections.

14. The object transport system as claimed in claim 1, further comprising a control system configured for monitoring performance and operation of the object transport system with sensor elements that report the condition or performance of chosen system components and parameters.

15. The object transport system as claimed in claim 14, wherein the control system comprises a central control station that receives all signal information from every pod on the object transport system or a part thereof and which comprises a controller that receives and processes the sensed signals from the object transport system and which actions pod movement or braking based on predetermined variables.

16. The object transport system as claimed in claim 14, wherein the control system comprises a distributed control station spread across all pods on the object transport system or a system zone that receives signal information from the pod and optionally other pods or the object transport system as a whole and which comprises a pod controller that receives and processes the sensed signals and which actions pod movement or braking based on predetermined variables.

17. The object transport system as claimed in claim 1, further comprising a winch mechanism configured for releasably attaching and detaching the pod from the object transport system to lower the pod to the ground.

18. The object transport system as claimed in claim 1, wherein the track extends upwards about a spiral incline.

19. The object transport system as claimed in claim 1, wherein the trolley comprises a primary wheel and a supplementary wheel, the primary and secondary wheels each being configured to engage the track, and wherein the trolley is configured to, when switching the pathway for the trolley from the entry section to a selected one of the exit sections via the junction or transition, and with one of the primary and supplementary wheels engaged with the selected one of the exit sections, disengage the other of the primary and secondary wheels from another one of the exit sections and engage the selected one of the exit sections with the other of the primary and secondary wheels.

20. The object transport system as claimed in claim 1, wherein the curved rail section is curved vertically such that the curved rail section is configured to, when the trolley passes through the junction or transition and traverses the curved rail section, cause a change in the direction of the trolley vertically.

21. A method of transporting at least one object between locations, the method comprising the steps of:
providing an object transport system, the object transport system comprising:
a track, the track comprising:
one or more cable sections, the or each cable section comprising a cable;
one or more rail sections, the or each rail section comprising a rail;
a track transition between one of the one or more cable sections and one of the one or more rail sections;
a junction or transition comprising an entry section of the track and two or more exit sections of the track;
a pod configured to traverse the track, the pod comprising a trolley and a supported or pendant pod housing,
wherein the trolley is a powered trolley configured to drive the pod along the track,
wherein the trolley is configured to traverse the or each of the cable sections by moving along the cable of said cable section, traverse the or each of the rail sections by moving along the rail of said rail section, and traverse the track transition to thereby move from the cable of the one of the cable sections to the rail of the one of the rail sections or from the rail of the one of the rail sections to the cable of the one of the cable sections,
wherein the junction or transition comprises a curved rail section, the curved rail section being curved horizontally such that the curved rail section is configured to, when the trolley passes through the junction or transition and traverses the curved rail section, cause a change in the direction of the trolley horizontally, and
wherein the pod housing is formed and arranged to contain, support or provide an enclosure for an object to be transported; and
a station configured to be a point of transition for the pod and/or an object conveyed by the pod; and
switching apparatus configured to switch a pathway for the trolley traversing the entry section between the trolley exiting the junction or transition traversing a first one of the exit sections and the trolley exiting the junction or transition traversing a different one of the exit sections;
accessing a pod for the at least one object;
conveying the at least one object in the pod to a desired location; and
exiting the at least one object from the pod.

* * * * *